(12) United States Patent
Yeager et al.

(10) Patent No.: US 7,571,938 B2
(45) Date of Patent: Aug. 11, 2009

(54) NON-LEAK POOL FIXTURE AND METHOD FOR IMPLEMENTING

(76) Inventors: Bryan Keith Yeager, 3400 Ashington La., Plano, TX (US) 75023; John Robert Scherler, 13795 Selma La., Forney, TX (US) 75126

( * ) Notice: Subject to any disclaimer, the term of this patent is extended or adjusted under 35 U.S.C. 154(b) by 741 days.

(21) Appl. No.: 10/973,971

(22) Filed: Oct. 26, 2004

(65) Prior Publication Data
US 2006/0087114 A1 Apr. 27, 2006

Related U.S. Application Data

(63) Continuation-in-part of application No. 10/949,983, filed on Sep. 24, 2004.

(51) Int. Cl.
*F16L 49/00* (2006.01)
(52) U.S. Cl. .......................... 285/230; 52/21
(58) Field of Classification Search ............... 285/230, 285/141.1, 139.2, 139.3; 52/21, 20
See application file for complete search history.

(56) References Cited

U.S. PATENT DOCUMENTS

| | | | | |
|---|---|---|---|---|
| 1,940,924 | A * | 12/1933 | Taylor | 428/74 |
| 3,516,541 | A * | 6/1970 | Hardingham | 210/164 |
| 3,556,993 | A * | 1/1971 | Persson | 210/164 |
| 3,621,623 | A * | 11/1971 | MacMillan | 404/25 |
| 3,629,981 | A * | 12/1971 | McCaffery | 52/19 |
| 4,071,267 | A * | 1/1978 | Davis | 285/64 |
| 4,075,796 | A * | 2/1978 | Cuozzo | 52/20 |
| 4,174,126 | A * | 11/1979 | Hauff | 285/136.1 |
| 4,194,750 | A | 3/1980 | Sovish et al. | |
| 4,268,041 | A | 5/1981 | Sovish et al. | |
| 4,479,656 | A | 10/1984 | Collins | |
| 4,488,388 | A * | 12/1984 | Schmidt | 52/220.8 |
| 4,608,787 | A * | 9/1986 | Carlson | 52/20 |
| 4,737,220 | A * | 4/1988 | Ditcher et al. | 156/218 |
| 4,805,920 | A * | 2/1989 | Gavin | 277/606 |
| 4,909,519 | A | 3/1990 | Anderson | |
| 4,918,761 | A * | 4/1990 | Harbeke | 4/252.4 |

(Continued)

OTHER PUBLICATIONS

Waterway "Waterstop" flyer sheet, Waterway corporation, Oxnard, CA.

*Primary Examiner*—David E Bochna
(74) *Attorney, Agent, or Firm*—Rudolph J. Buchel, Jr.

(57) ABSTRACT

An improved sidewall fitting is disclosed with a fitting body and one or more flanges disposed about the fitting body. Plaster catches disposed along a face of one flange and positioned approximately coextensively with the fitting body. The bodies of the plaster catches may be curvilinear-shaped, straight or concentric rings and the body portions may be of heights for aligned or off-setting configurations. The fitting is installed the plaster catches oriented directly below the body of the fitting, along a generally horizontal plane. Plaster is layered over the flange and plaster catches, and up to the opening in the fitting body. The plaster catches may be disposed along a posterior face of a flange, or simultaneously along the anterior and posterior faces. A second fitting type includes an extension surface for increased bonding with the plaster with additional surface area available for sealing with the plaster. Disposed onto the sealing surface is a leave-out strip, which protects the sealing surface during cementing. After removal of the leave-out strip, the sealing surface provides an uncontaminated surface on which a sealant may be liberally applied. Optionally, a seal may be provided on the sealing surface interposed between the leave-out strip.

21 Claims, 47 Drawing Sheets

U.S. PATENT DOCUMENTS

| | | | |
|---|---|---|---|
| 5,015,371 A * | 5/1991 | Webb | 210/164 |
| 5,060,986 A * | 10/1991 | Carter | 285/136.1 |
| 5,108,227 A * | 4/1992 | Bergey | 405/154.1 |
| 5,248,154 A * | 9/1993 | Westhoff et al. | 277/606 |
| 5,433,487 A * | 7/1995 | Kuhn et al. | 285/136.1 |
| 5,499,823 A | 3/1996 | Fukui | |
| 6,347,781 B1 * | 2/2002 | Trangsrud | 249/11 |
| 6,450,505 B1 * | 9/2002 | Gavin | 277/606 |
| 6,581,940 B2 * | 6/2003 | Dittel | 277/606 |
| 6,595,243 B2 | 7/2003 | Tarr | |
| 6,601,852 B1 | 8/2003 | Kogler et al. | |
| 7,028,972 B2 * | 4/2006 | Miller et al. | 249/63 |
| 7,080,486 B2 * | 7/2006 | Radke et al. | 52/98 |

* cited by examiner

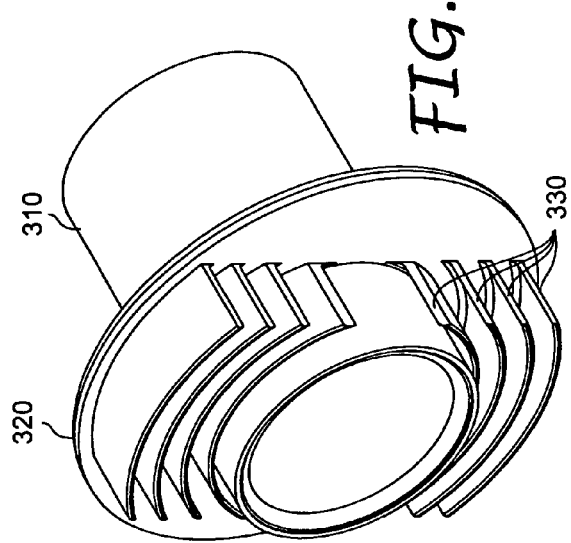
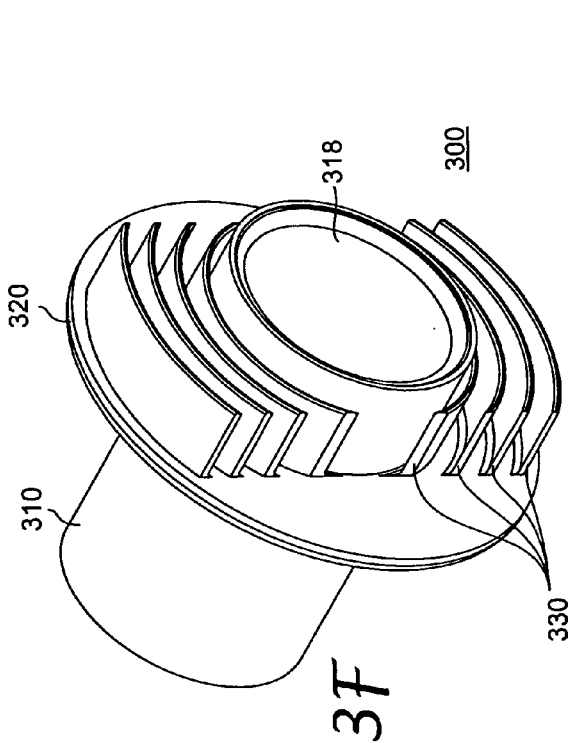
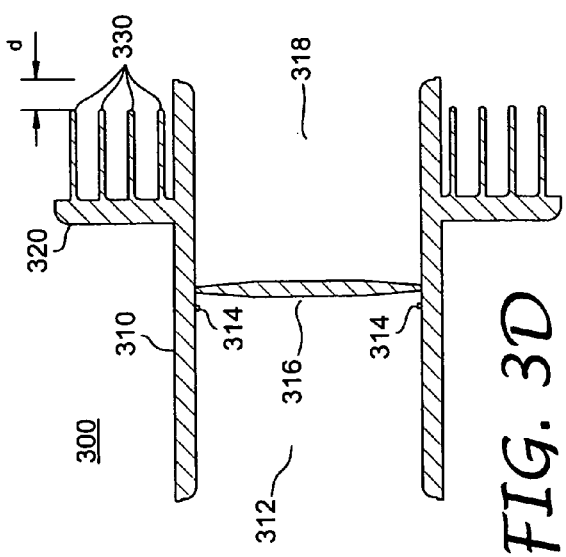
FIG. 3E
FIG. 3F
FIG. 3D

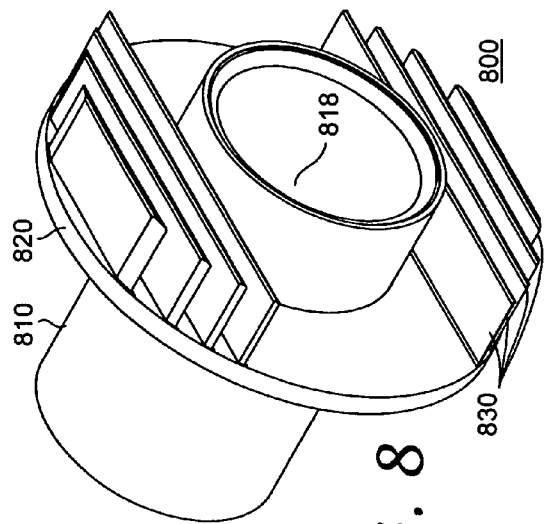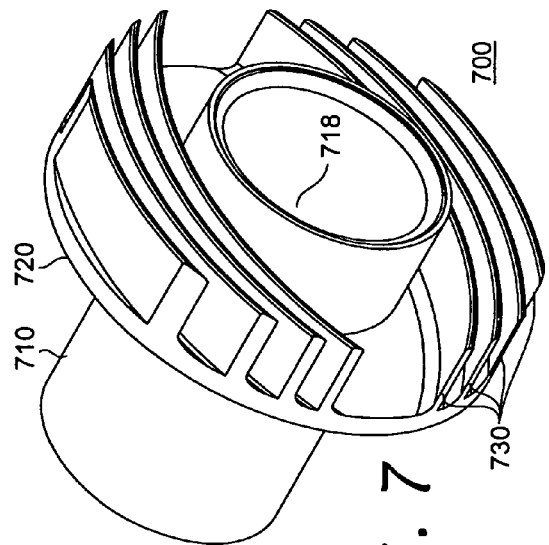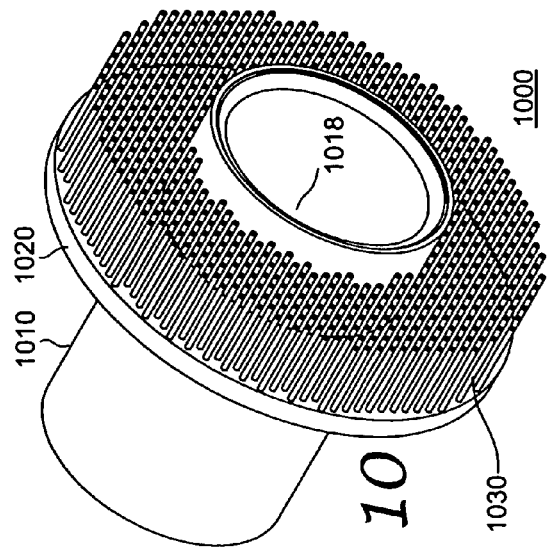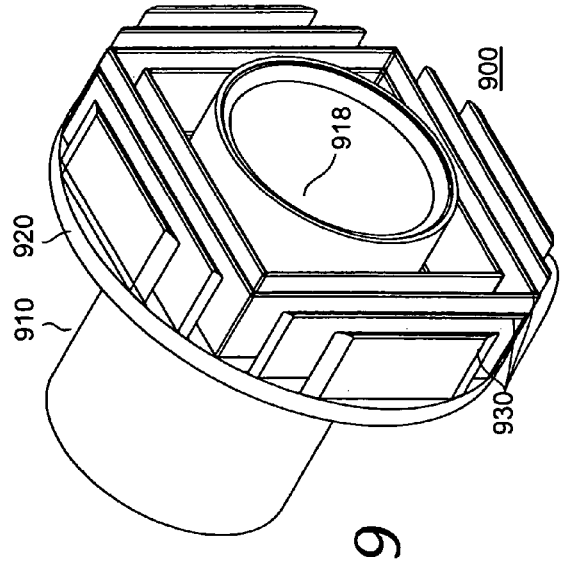

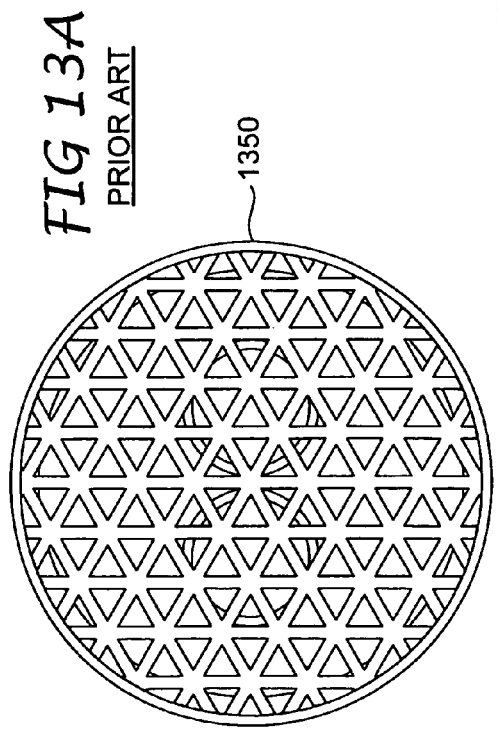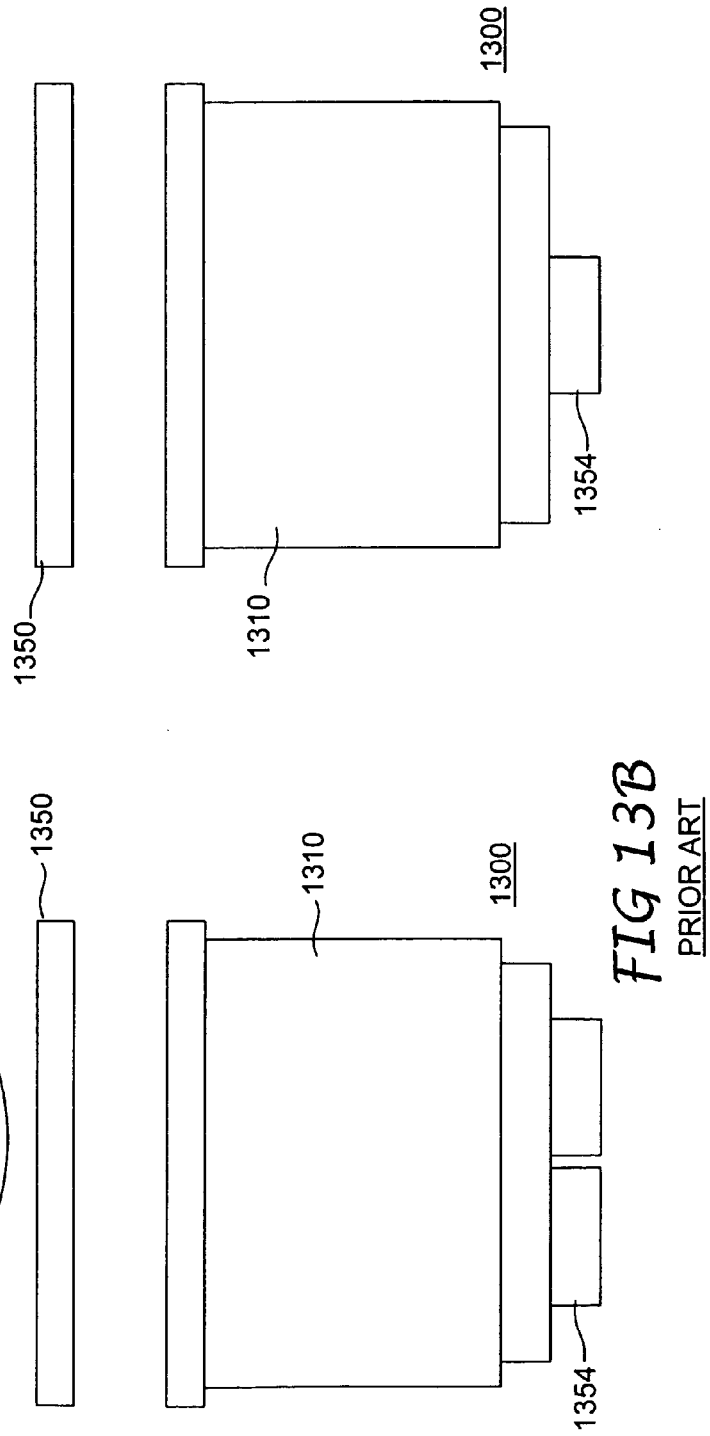
FIG 13A PRIOR ART
FIG 13B PRIOR ART
FIG 13C PRIOR ART

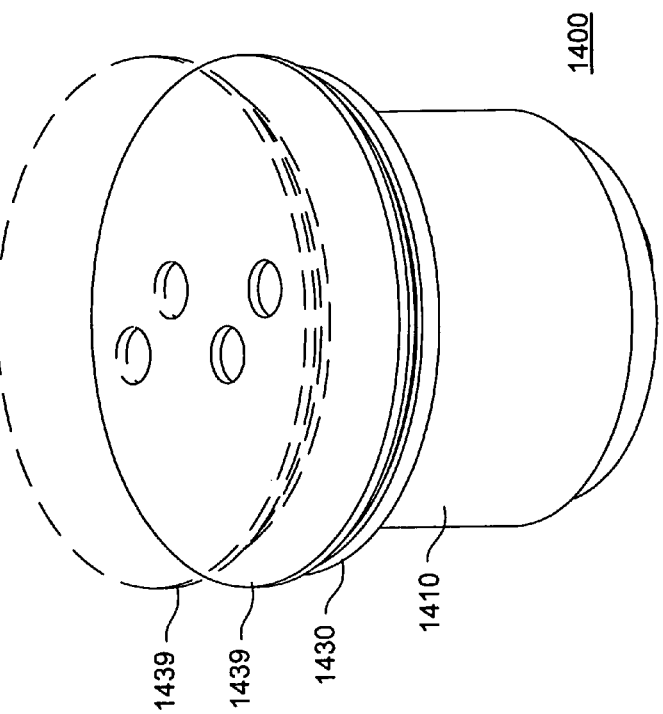
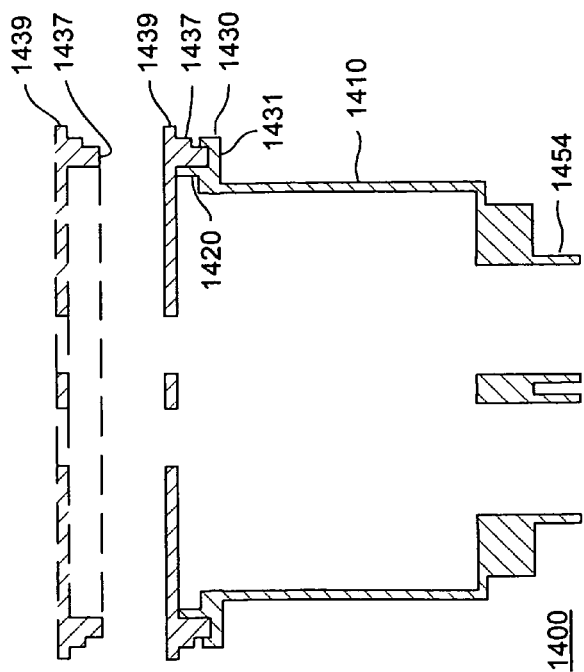

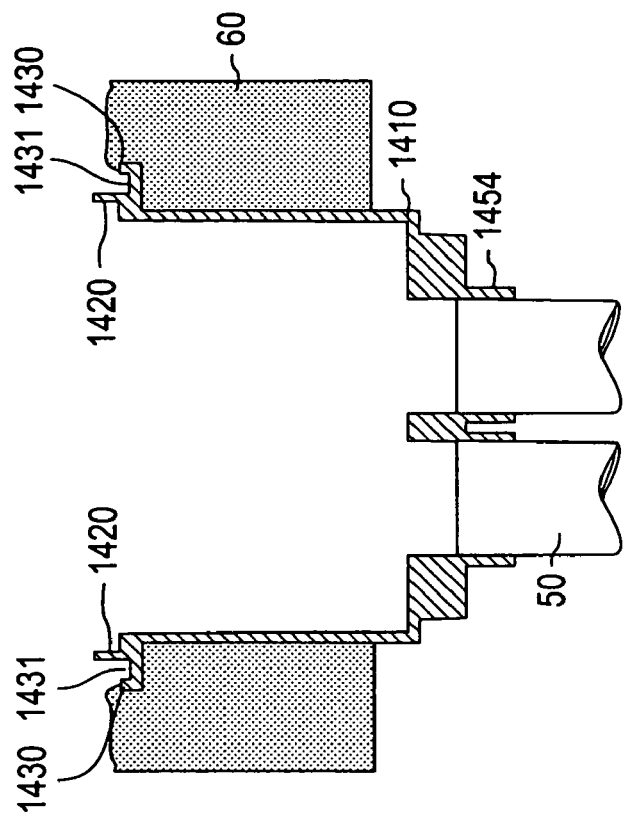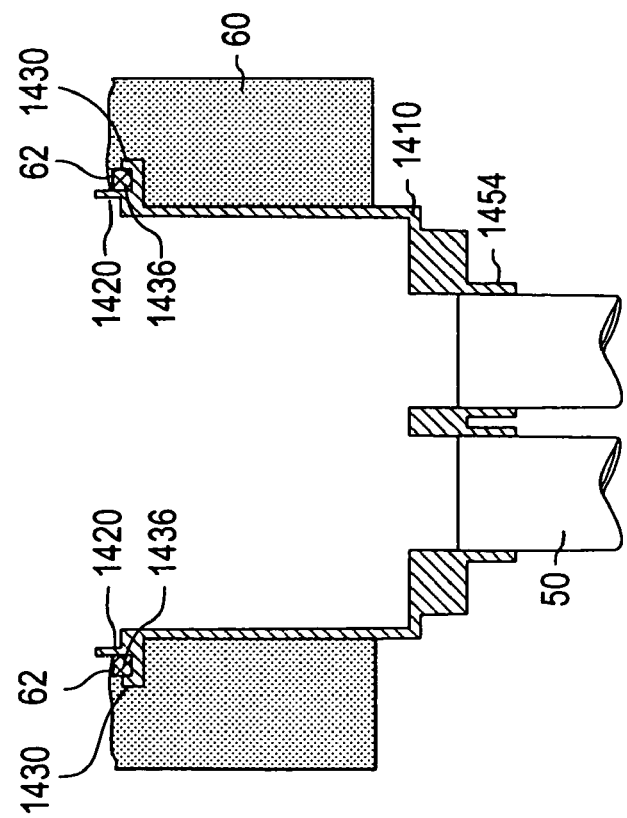

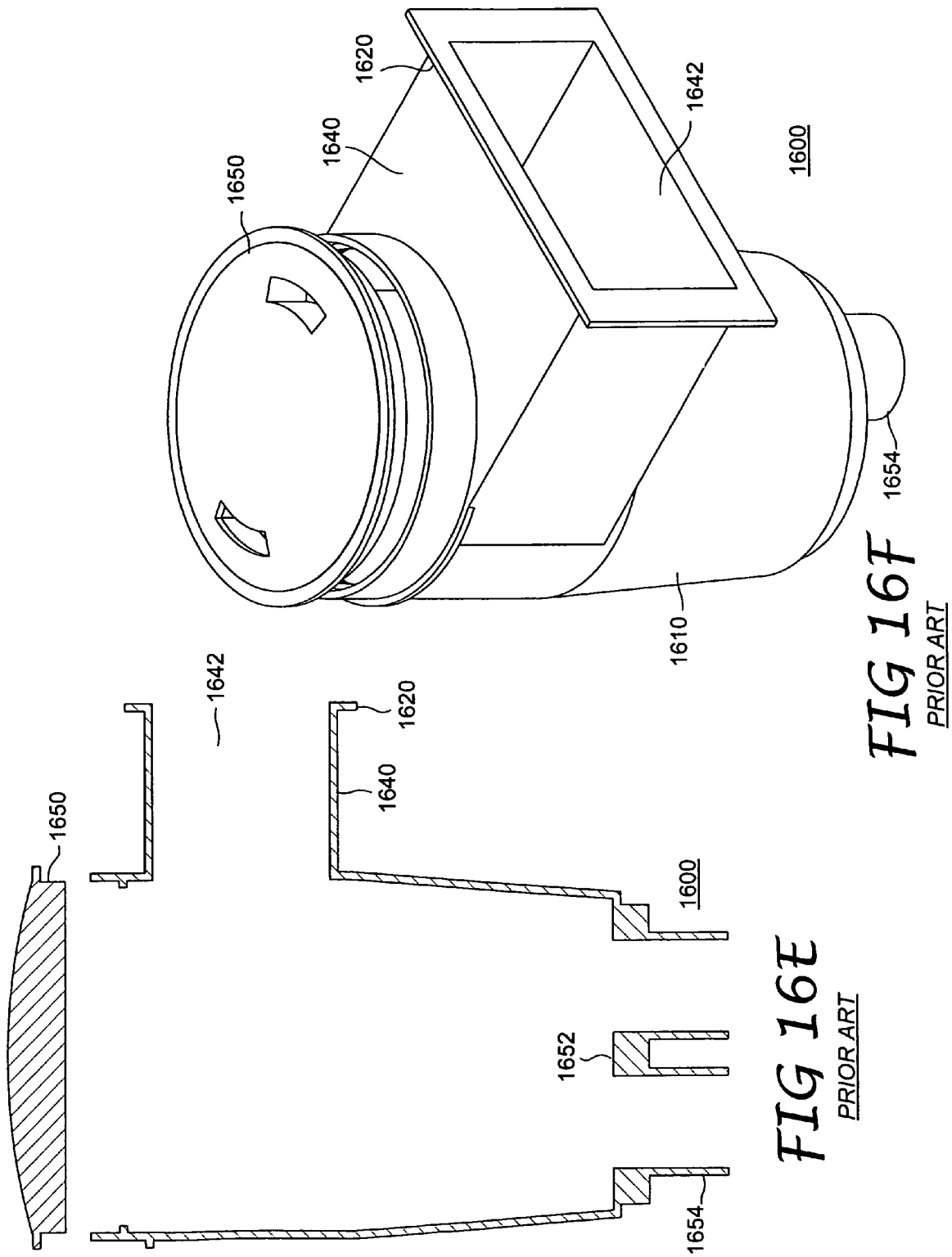

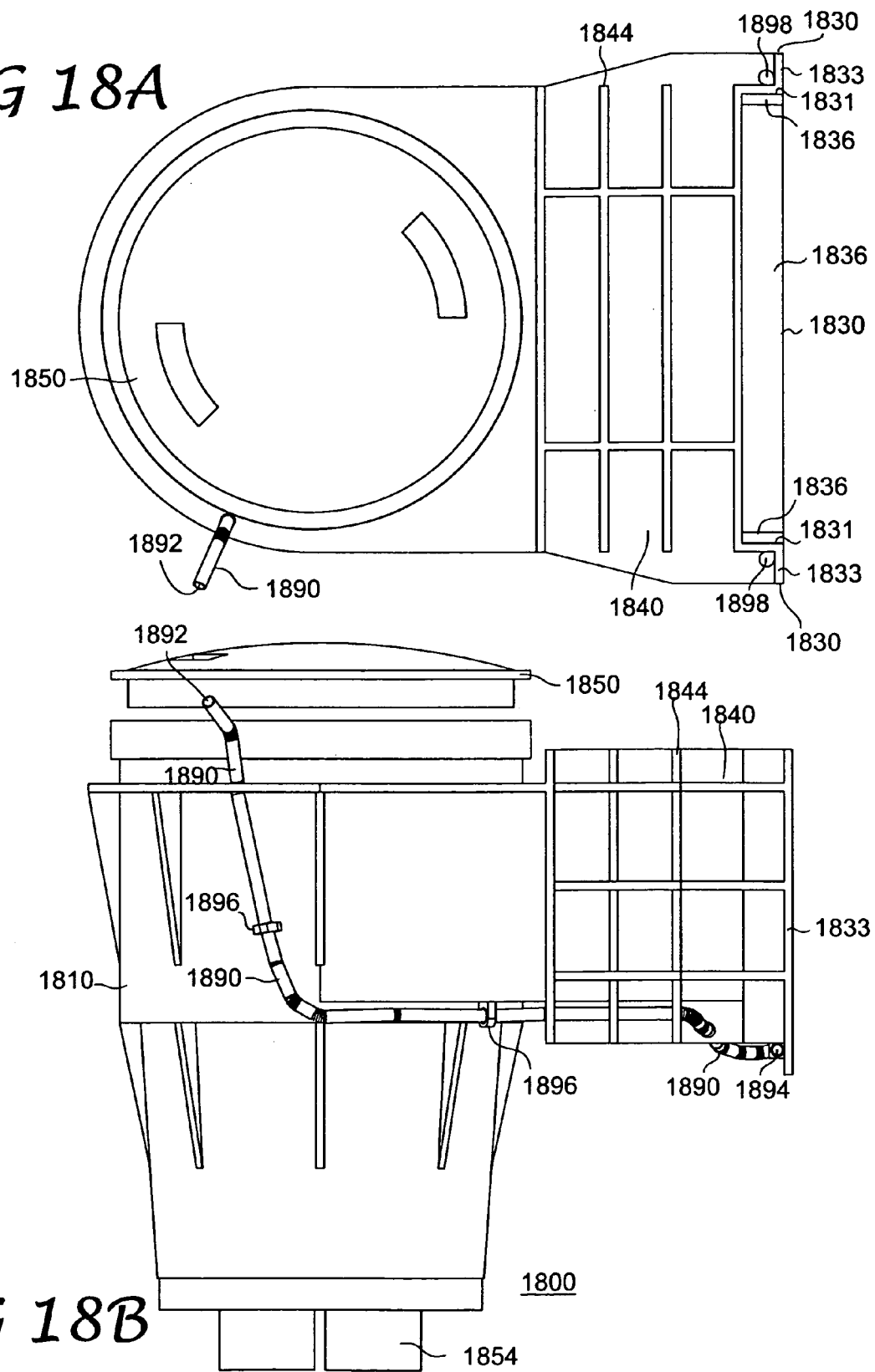

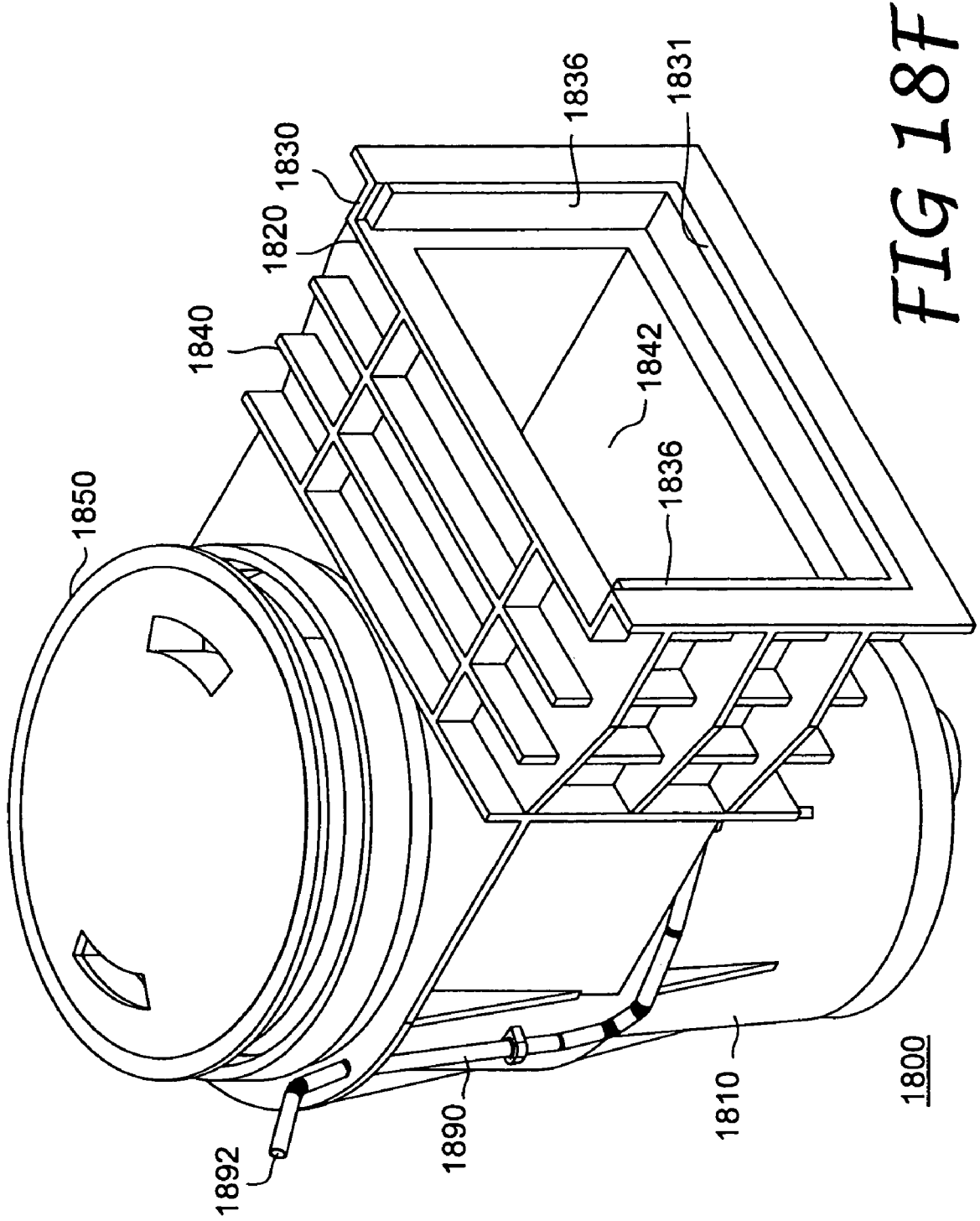

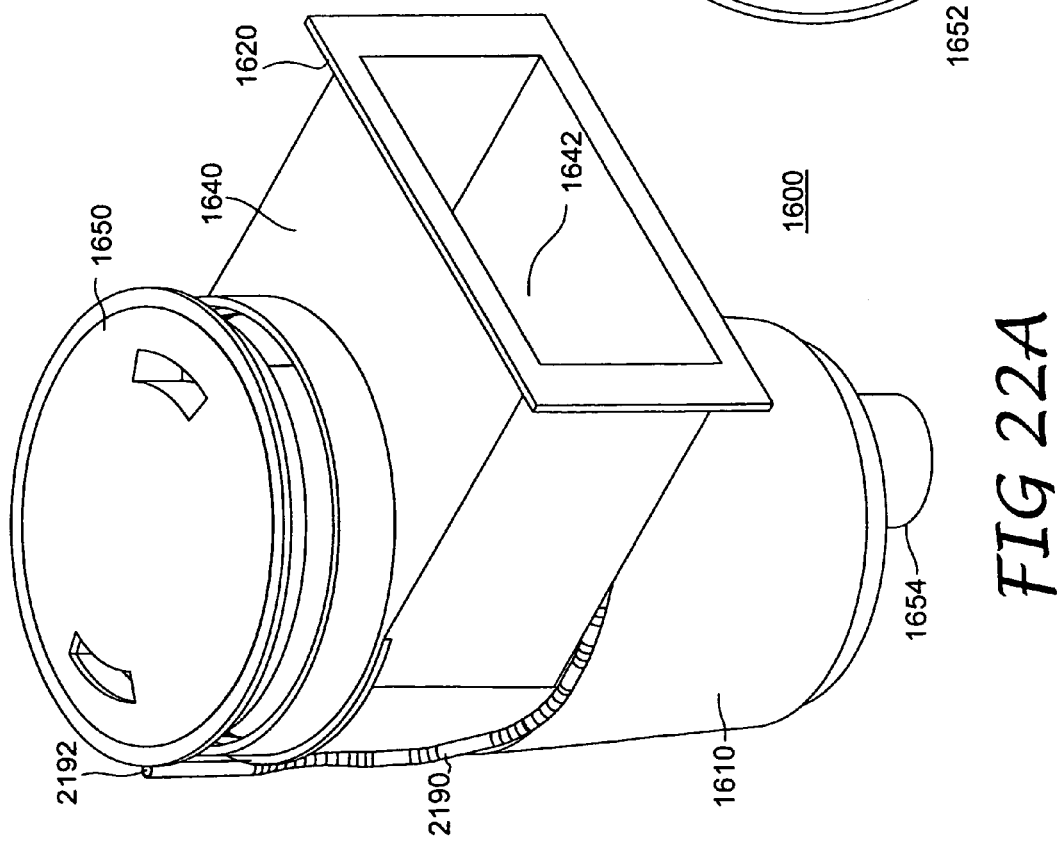
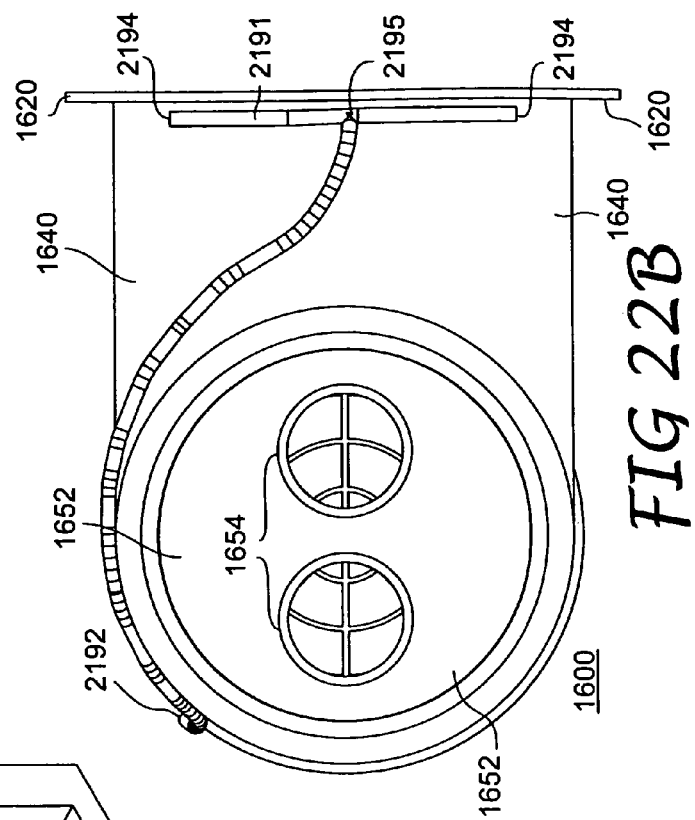
FIG 22A
FIG 22B

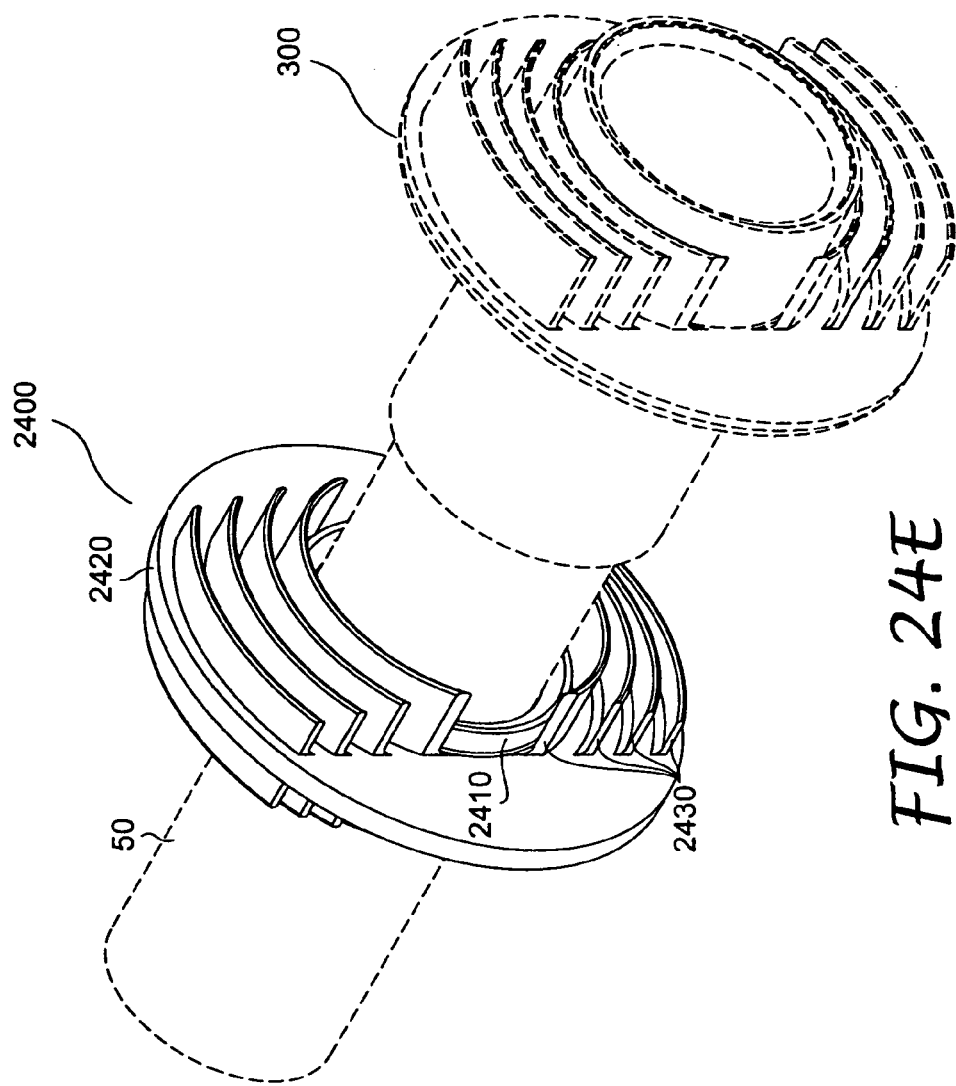
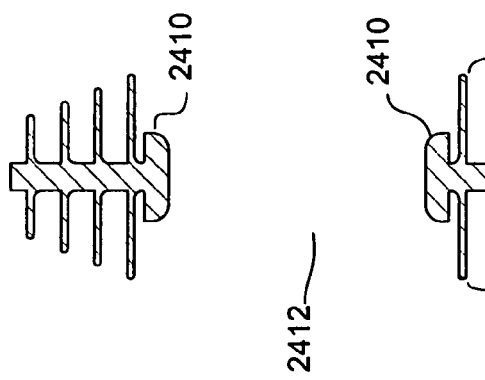
FIG. 24D
FIG. 24E

NON-LEAK POOL FIXTURE AND METHOD FOR IMPLEMENTING

RELATED APPLICATION

This application is a continuation-in-part of U.S. patent application Ser. No. 10/949,983; filed Sep. 24, 2004 entitled Non-Leak Pool Fixture and Method for Implementing. The aforementioned application is hereby incorporated by reference in its entirety.

BACKGROUND OF THE INVENTION

1. Field of the Invention

The present invention relates to wall fixtures for piping and the like. More particularly, the present invention relates to non-leak wall fixtures for installation in an aquatic environment such as pools, spas and the like. Even more particularly, the present invention relates to improved fitting designs which resist leaking and methods for installing the improved fitting designs. Still more particularly, the present invention relates to wall fittings and the like that rely on plaster for making a hydraulic seal and are typically installed with their bodies in a horizontal orientation and installation method for the fittings.

2. Description of Related Art

The construction of an in-ground pool (or spa) may be accomplished through the use of various construction platforms of which fiberglass, vinyl-liner pools and cement, are the most commonly used in inground pools. Fiberglass, or Kevlar (a registered trademark of the E. I. Du Pont De Nemours and Company Corporation, Wilmington, Del.), construction platforms make use of pool shells that are prefabricated off-site, with painted or epoxy-coated interior and then assembled on-site. Ports are provided in the fiberglass shell for the installation of water and light wall fittings. Typically, a hole is excavated in the ground, and then pipes are plumbed into positions corresponding to the ports. The vast majority of pool pipe and plumbing is manufactured from PVC (PolyVinyl Chloride) or ABS (Acrylonitrile Butadiene Styrene) plastics which are easily glued together to form rigid, watertight connections and able to withstand several hundred psi (pounds per square inch) internally, with even greater crush strengths. The fiberglass shell is disposed within the excavated volume and the plumbed piping is rigidly attached to the fiberglass body, thereby forming a positive hydraulic seal between the interior of the shell and the ground. Additional protection against leakage may be provided by installing gaskets or o-rings between the fiberglass shell and the pool fitting. The fiberglass shell may be installed from one or more separate component pieces which are fitted together with sealing gaskets in the excavation and then coupled to the pool plumbing. Level is maintained on the shell and dirt is backfilled around the fiberglass pool walls and plumbing. The fiberglass shell provides the structural support necessary for holding the pool water. Leakage around pool fittings in a fiberglass pool is uncommon, but any leaks which might develop are easily remedied by installing new o-rings or gaskets.

Vinyl liner pools are typically constructed from prefabricated wall panels that are fastened together and sit on a concrete foundation (or Vermiculite, mixtures of vermiculite and sand, Portland cement, and clay) in an excavated hole. The wall panels and foundation form the pool shell and provide the structural support for the pool liner, which contains the pool water. Prior to installation of the panels, the excavate volume is plumbed corresponding to ports provided in the panels for wall fitting placements. Dirt is backfilled around the wall panels and piping for lateral support. A liner, manufactured with exacting tolerances to fit the panel and foundation pool support configuration, is then disposed within the panels and on the foundation. Finally, holes are pierced in the vinyl liner corresponding to the position of plumbed ports (or the liner may have had the fitting holes precut) and the liner is coupled to the pool fittings and the wall panels and/or foundation. Because the fittings are designed to form a seal around both the wall panels and vinyl liner, leakage is fairly rare around the wall fitting. Gaskets or o-rings may also be installed to assure a hydraulic seal. Vinyl liner construction is generally not suitable for spas. Similar to the fiberglass pool platform construction, leakage around pool fittings in a vinyl liner is relatively uncommon, but any leaks which might develop are easily remedied by installing new o-rings or gaskets. Typically, when a leak develops in a vinyl liner, the leak must be repaired and the water trapped under the backside of the liner must be evacuated.

Probably the most popular type of in-ground pool construction platform is the cement shell type due primarily to its durability and infinite design configurability. Unlike fiberglass or vinyl liner pools, virtually the entire cement pool is fabricated on-site. The shape, size and placement of a cement pool does not depend on the prefabricated shape of a shell, wall panels or liner, and therefore it may be customized to fit a plethora of design and location choices. Another advantage to a cement pool construction platform is that the pool's dimensions may be designed to accommodate any shape or size yard, while complementing the existing landscape. Cement pools are also extremely adaptable to the owners' specific needs from fitness swimming to playing games.

Cement pool platforms require a much different construction approach than either fiberglass or vinyl liner pools because the waterproof pool shell is constructed on-site rather than being installed as a prefabricated unit. Additionally, a cement pool is typically more costly for the pool owner than the other pool types. Construction begins by excavating a volume of earth in accordance with the pool design. A steel cage of reinforcement bars (rebar) is assembled in the excavated volume. The tradesmen bend and tie steel rebar to form a grid-like pattern which is used to strengthen the pool's cement shell and provide rigidity. A wooden pool frame is typically constructed in conjunction with the pool cage and extends from the cage for delineating the upper wall edges, skimmer and spa transitions, steps, haul-outs and other above grade structures such as spas and spa walls, springs, waterfalls, etc. Input and return pipes are then plumbed and tied to the rebar cage as necessary. Each pipe end is designed to penetrate from the shell exterior to the pool's interior and terminate at an exact position on the shell. Certain fittings may require additional structural support from the main steel cage, such as skimmers, which are caged separately and then attached to the existing steel rebar cage of the pool shell. Pool fittings that are to be cemented in place are glued (or fitted) to the appropriate pipe ends, such as main drains (pool and spa), skimmer, light niches and the like. Other fittings, which are not intended to be cemented in place, are not installed. At this point, the plumbing is typically given an initial leak test (usually holding 20-50 psi for 8 to 24 hours depending on the construction code of the municipality), so all open pipes at the pump and pool ends are temporarily capped.

After passing the pressure test, the pool is ready for cementing. The cement products used in pool construction bare little resemblance to the conventional types of cement used in concrete construction. Typically, either "gunite" (Gunite or gunnite) or "shotcrete" is applied to the steel rebar cage and framing for creating a pool shell. Gunite is a trade name for concrete that is blown into place while shotcrete is the generic term used by the American Shotcrete Association. Both compounds are similar mixtures of water, Portland cement, calcium chloride (up to 20% for rapid mixing and curing), mason's sand and often very small pebbles and extra fly ash. The primary difference between gunite and shotcrete is the application of the cementation mixture; gunite is a "dry gunned" process while shotcrete is "wet gunned." Dry gun means the dry ingredients of cement and sand are injected into an air stream in the proper proportions, conveying them to the nozzle. The operator (nozzleman) controls the water-cement ratio by varying the amount of water added to the nozzle with a special water-ring. The integrity of the mixture depends entirely on the accuracy of the onsite workers who adjust the mixing volumes of the dry ingredients and the experience of the nozzleman. Inconsistencies in the mixture of dry ingredients' amounts, and the water-cement ratio result in decreased and erratic compressive strength ratings of cured product, sometimes less than 2,000 psi. Coring tests conducted on various parts of pool walls have confirmed that the compressive strength may vary by as much as 4,000 psi from one core to the next. Furthermore, the amount of rebound, or the waste created by sprayed concrete falling to the floor, is very high due to erratic and improper water-cement ratios. Inconsistencies in the dry mix ingredients and the water-cement ratio also contributes to poor bonding between the cured cement and the pool fixtures.

Shotcrete is the solution to the shortcomings of the dry gun gunite approach. Most of the inconsistencies of dry gunning are overcome by using a computer controlled mix design from a concrete batch plant. The shotcrete is manufactured using regulated and exacting standards and transported to the job site as a wet material (emulsion) which is then pumped through a hose to a nozzle with an air-ring, allowing it to adhere to vertical walls with less rebound. Because the dry ingredients are mixed together with the water at the cement plant using a computer controlled process, the slurry transported to the job site is a homogenous mixture yielding a consistent compressive strength of between 3,000 psi and 4,000 psi. While bonding between the cured cement and the pool fixtures does not suffer due to "dry spattering," as in the dry gun approach, bonding between the wet cement slurry and the pool fixtures is equally poor because during the initial curing stage water migrates from the mixture to the surface areas, thus forming a wet annulus between the pool fixtures and the curing cement.

Although the wet gun shotcrete approach seems far superior to the dry gun approach, pool contractors have been slow to embrace shotcrete due to its added cost over gunnite. Since shotcrete is a standardized mixture which is often regulated in its manufacture by state transportation and building agencies (notably California) due to its adoption for road and overpass construction, it is much more expensive for pool contractors. Independent tradesman often cannot justify the added expense of shotcrete over buying the dry ingredients for gunite separately and dry gunning the mixture.

In either case, during the pneumatic application of the cement, the entire rebar cage is covered, as is much of the exposed plumbing and fittings. Often the skimmer body and the steel cage surrounding it will be cemented in place with the pool shell. Spaces surrounding the temporarily capped pipe ends will then be troweled to form a space sufficient for receiving the fitting, most notably surrounding the side wall pipe ends in which conic-shaped indentation in the cement are troweled out for accepting the sidewall fitting. In so doing, the entire body of the fitting, up to the front opening, will reside behind the cement and plastered pool wall. Many cement manufacturers recommend to water cure the cement for 72 hours after hydration to slow and even out the drying times throughout the cement shell. Avoiding the uneven drying times increase the compressive strengths and reduces the likelihood of curing cracks.

Coping and ceramic is then installed on the cement pool wall. The skimmer throat flange is sealed now using a durable tile adhesive (a mastics adhesive or thin-set mortar), tile and grout. The remaining pool fittings (typically just the sidewall fittings) are installed by trimming the exposed pipe to the necessary length and gluing the sidewall fitting. Following the application of the pool tile, the exposed portion of the cement shell is plastered with a quarter inch deep layer of pre-blended pool plaster, often containing white marble (ground into small chips) for added luster. Also called white-coat or marcite, pool plaster is an age old process of finishing many structures. Used underwater, it provides the watertight seal that the more porous gunite or shotcrete beneath it cannot. Other exposed color aggregates are available such as 3M Colorquartz™ (available from the 3M company of St. Paul, Minn.), PEBBLE TEC®, Durozzo and Hydrazzo which are each pool finish which incorporates larger aggregate (pebbles) than the marble chips in marcite, the pebbles are typically selected by their color.

While cement constructed pools are extremely popular with owners, fabricating the entire pool on-site has significant drawbacks which are not typically found with fiberglass or vinyl liner pool constructions where the manufacturing tolerances can be controlled through off-site manufacturing. Principal among these drawbacks is pool water leakage into the ground, especially proximate to wall fitting positions. Additionally, costs to homeowners and the environment are pollutive costs, as chlorine and other chemicals in pool water migrating into ecosystems, groundwater and municipal water can change these fragile environments.

The leakage of pool water into the ground (or in some cases the groundwater entering the pool and mixing with pool water) poses a significant problem for pool owners. Aside from the ever-increasing costs of replenishing the fresh pool water, leakage has other detrimental effects. For instance, over time a significant pool leak may excavate a large volume of earth adjacent to the pool shell and under the apron causing a loss of structural integrity to both the pool wall and the deck. Furthermore, the cost for detecting and repairing pool leaks by professionals are substantial and can cost many times more than the amount of the lost water. Some leaks can be repaired by injecting hydrobaric foams (such as HYPOL (Hydrophilic Polyurethane Prepolyers) a trademark of and available from The Dow Chemical Company of Midland, Mich.) which expand to many times their original volume when exposed to water. This class of polymers has some very important properties for sealing water leaks. First, generally the foams in this class cure rapidly to a slightly ductile texture which bonds, in standing water, to virtually every type of surface (including cement, plaster, PVC and ABS plastics, brass, bronze, stainless steel and chrome). Another important property inherent in hydrobaric foams is that before curing, they react with water and expand. This reaction to water actually causes the foam to migrate, or expand, toward water filled cracks and crevices in a substrate making it a very effective leak treatment. Because of this attribute, the use of hydrobaric foams is typically limited to applications in which the foam can be injected above the water line.

In other situations, the pool must be drained to a level beneath the level of the leak, the plaster surrounding the leaking fitting removed and then the entire fitting re-plastered. The repair of leaking main drains often necessitates emptying the entire volume of the pool for proper repair. This underscores another concern. Some municipalities do not allow pool water to be discharged onto land, waterways and canals or roadways as it may contain high levels of chlorine, bromine and other chemicals. Still others have mandated that pool water cannot be discharged into public sewer systems to protect the aerobic and anaerobic bacterial processes in the treatment plants from algaecides and antiseptics in the pool water. Thus in some municipalities, repairing leaks is even more expensive for the pool owner because of the added expenses for water removal and/or retention.

SUMMARY OF THE INVENTION

The present invention is directed to leak resistant fittings and methods for installing same. It has long been understood that prior art fittings commonly used in cement shell type pools, ponds and spas are susceptive to premature leakage. The causes have largely gone undiscovered and thus improvements to these fittings that might prevent or resist leakage has eluded the prior art. The invention disclosed herein presents an eloquent solution to the shortcomings of prior art fittings in an economical and easily implemented form.

One embodiment addresses the shortcoming of prior art sidewall fittings such as pool jets, aerators, sidewall drains, light niches, anchors, re-circulators and the like. Premature leaks commonly occur in those fittings along the lower edge of an exposed beauty ring. The reason for the leakage is substantially due to uncured plaster migration. During installation, uncured plaster behind the fitting siphons down the cement shell wall and away from the sidewall creating a cavity void of plaster behind the fitting. The plaster siphoning is largely undetected by the plasterer. Although a cavity is formed behind the fitting, generally the fitting achieves a hydraulically seal from the ground surrounding the cement shell, at least temporarily. The seal eventually fails due to water seepage around the beauty ring and into the cavity, resulting in an expensive repair for the owner.

In accordance with one exemplary embodiment of the present invention a sidewall fitting is disclosed with aligned, curvilinear-shaped plaster catches disposed along an anterior face of a flange and positioned approximately coextensively with, and concave to the fitting body. During installation, the fitting is oriented with the plaster catches directly below the body of the fitting, along a generally horizontal plane. Plaster is layered over the flange and plaster catches, and up to the opening in the fitting body. The plaster catches serve three primary functions. First, they resist the gravitational migration of the plaster (siphoning), thereby eliminating cavity formation behind the flange, or at least lessening the size of any cavity that might form. They also provide a larger surface area for the plaster to adhere to and thus promote improved plaster bonding to the fitting. Finally, the catches dramatically increase the path length that any water seep path must traverse in order to communicate with the cavity and/or the ground outside the cement shell.

In accordance with other embodiments, the plaster catches are disposed along a posterior face of a flange, or simultaneously along the anterior and posterior faces. The catches can be aligned with the plaster surface of the inner shell wall or offset with inner catches closer to the pool wall and outer catches further away. Offsetting the catches can be accomplished by varying the height of the plaster catches, taller catches positioned closer to the fitting body, or by changing the shape of the generally planar flange to a conical-shape. The extent of plaster catches may reach beyond the diameter of the fitting body and in accordance with some embodiments, cover the extent of the flange's face. The shape of the plaster catches may be curvilinear, straight or a combination and they may be disposed at one position on the flange's face, in opposing sets positioned at opposite ends of the flange's face, or at right angles to the neighboring set of catches. Added protection against plaster siphoning may be accomplished by disposing additional sets linear (straight) plaster catches on the face of the flange, positioned laterally with the fitting body.

In accordance with still another exemplary embodiment of the present invention, the fitting may have disposed thereon, two flanges. Plaster catches are disposed along an anterior face of one flange, or simultaneously along the anterior and posterior faces.

In accordance with still another exemplary embodiment of the present invention, a fitting intended for being cemented in position is disclosed such as main drains and light niches. Provided on this inventive fitting is an extension surface for increased bonding with the plaster with additional surface area available for sealing with the plaster. Protecting this sealing surface is a leave-out strip, which protects the sealing surface during cementing. After removal of the leave-out strip, the sealing surface provides an uncontaminated surface on which a sealant may be liberally applied. The sealant should be of a type that bonds well to both plaster and fitting (i.e., the sealing surface). Optionally, a seal may be provided by the fitting manufacturer, with the protecting leave-out strip.

In accordance with still another exemplary embodiment of the present invention, a fitting intended for being cemented in position is disclosed such as a water skimmer. Generally a skimmer has an attached inlet box that must be plastered (or tiled) to a cement shell wall, thereby forming a hydraulic seal, where leakage frequently occurs. Provided on the inlet box of this inventive fitting is an extension surface for increased surface area bonding with the plaster. Protecting this sealing surface is a leave-out strip, which protects the sealing surface of the inlet box during cementing. After removal of the leave-out strip, the sealing surface provides an uncontaminated surface on which a sealant may be applied. In accordance with still another exemplary embodiment, an injection tube is also provided to facilitate sealing or for remedial leak repairs. The injection port opening is located in a position above the level that any cement might enter, either from cementing the shell or subsequent decking, and left accessible if intended for repairing leaks in the future. The outlet opening(s) is positioned proximate to the skimmer in an area of the cement in which leakage will likely occur. Leak repairing is therefore accomplished by merely injecting a sealant, such as a hydrobaric foam, into the exposed injection port, which is routed to the leak site by the tubing.

BRIEF DESCRIPTION OF THE DRAWINGS

The novel features believed characteristic of the present invention are set forth in the appended claims. The invention itself, however, as well as a preferred mode of use, further objectives and advantages thereof, will be best understood by reference to the following detailed description of an illustrative embodiment when read in conjunction with the accompanying drawings wherein:

FIGS. 3A-3F depict an embodiment of a sidewall fitting with aligned, curvilinear-shaped plaster catches disposed along an anterior face of a flange and positioned approximately coextensively with, and concave to the fitting body in accordance with an exemplary embodiment of the present invention;

FIG. 7 depicts an embodiment of a sidewall fitting with aligned, curvilinear-shaped plaster catches disposed approximately coextensively along an anterior face of a flange and concave to the fitting body in accordance with an exemplary embodiment of the present invention;

FIG. 8 depicts an embodiment of a sidewall fitting with aligned, linear (straight) plaster catches disposed approximately coextensively along an anterior face of a flange in accordance with an exemplary embodiment of the present invention;

FIG. 9 depicts an embodiment of a sidewall fitting with sets of aligned, linear (straight) plaster catches disposed approximately coextensively along an anterior face of a flange at right angle orientations, one set to an adjacent set, in accordance with an exemplary embodiment of the present invention;

FIG. 10 depicts an embodiment of a sidewall fitting with a plurality of aligned pin-shaped plaster catches disposed approximately along an anterior face of a flange in accordance with an exemplary embodiment of the present invention;

FIGS. 13A-13E depict an exemplary prior art main drain as applicable for pools and spas;

FIGS. 14A-14D depict exemplary embodiments of a drain fitting with a sealing surface and leave-out strip for protecting the sealing surface during cementing in accordance with an exemplary embodiment of the present invention;

FIGS. 15A-15D depict exemplary embodiments of a drain fitting during stages of installation in accordance with an exemplary embodiment of the present invention;

FIGS. 16A-16F depict an exemplary embodiment of a prior art skimmer as applicable for pools and spas;

FIGS. 18A-18F depict exemplary embodiments of a skimmer fitting with a sealing surface and leave-out strip for protecting the sealing surface during cementing and an injection tube for delivering sealing foam after installation in accordance with an exemplary embodiment of the present invention;

FIGS. 22A-22B depict exemplary embodiments of a prior art skimmer fitting retrofitted with an injection tube for delivering sealing foam after installation in accordance with an exemplary embodiment of the present invention;

FIGS. 24A-23E depict an embodiment of an in-wall fitting with off-set curvilinear-shaped plaster catches disposed along a anterior and posterior faces of a flange, and concave to the filling body which has an opening sufficiently large to accept a pipe in accordance with an exemplary embodiment of the present invention;

FIGS. 29A-28C depict an embodiment of a sidewall fitting with offset, curvilinear-shaped plaster catches disposed along the anterior and the posterior faces of a planar flange, the catches being concave to, and coaxial with, the fitting body in accordance with an exemplary embodiment of the present invention.

Figure 1B:
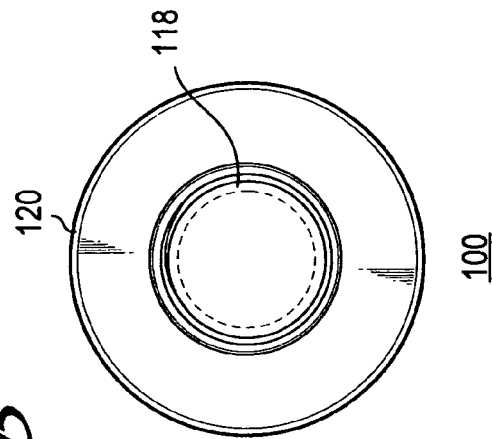
FIGS. 1A-1C depict an exemplary prior art sidewall fitting used in pool and spa construction.

Other features of the present invention will be apparent from the accompanying drawings and from the following detailed description.

DETAILED DESCRIPTION OF THE INVENTION

Wall fittings, for the purposes for describing the present invention, include any class of fixtures which traverse a wall or floor of a pool, spa or the like and terminates within an interior, or couples to a conduit which, in turn, traverses a wall or floor. Examples of pool fittings include sidewall body fittings such as inlet jets or aerators (directional such as eyeball wall inlet fitting or non-directional), sidewall returns, drains or suction fittings, rope anchors, light niches, suction strainers, swivel mounts, skimmers and other gravity assisted fittings such as overfill drains, main floor drains and the like. Fittings may be fabricated from PVC or ABS plastics, stainless steel, bronze, chrome or any other material that tends to resists the affects of the chemicals in the pool water and exposure to UV (ultraviolet) sun rays. For the purposes herein, a fitting may be further categorized as by whether or nor the fitting is cemented in position. Furthermore, the term "pool" will be used generically herein to refer to any man-made reservoir for retaining water which is, at least partially, constructed using a plaster over cement shell technique described above. "Pool," as a generic term, may refer to, for example, a swimming, diving, wading, reflecting, fountain or play pool, spa, spring, bath or retention pond (a non-exclusive list). Similarly, the term "plaster" will be used synonymously with whitecoat, sealer, thin-set, mastic or any one of the many trademarked marble, quartz, pebble or aggregate blend sealants.

Prior art pool fittings and fixtures suffer from various shortcomings primarily due to the fact that the materials from which the fixtures are fabricated do not bond well to most cements and plasters. Applicants have discovered several reasons for these shortcomings. Initially, applicants have discovered that plaster is typically the most effective material commonly used in pool construction for sealing fixtures, and cement is very ineffective. With respect to either material, the heat generated during the curing process by the material exacerbates the bonding problems, when the material surrounds a fitting. As cement or plaster cures it generates excess heat that is transferred into the fixture, causing the fixture to expand slightly. Simultaneously, water from the curing material migrates into an interface formed between the fixture and forms a thin, insulating layer which inhibits the bonding between the cement and/or plaster and the fitting. As the fitting expands, it forces the water layer and curing material to be displaced radially outward and away from the fixture. This deformation is most pronounced for fixtures with long linear surfaces such as skimmer throats. Subsequent to curing, the fixture cools and it contracts back into original shape. Since the bond between the fixtures and cement is weak, the contracting fixture pulls away from the cured material, leaving a slight gap or micro-annulus around the fixture. Consequently, a micro annulus is formed around virtually every type of pool fitting and pipe surrounded by cement or plaster.

Nevertheless, in all but the most extreme cases, the annular space around most fixtures is not sufficiently wide enough to overcome the capillary effect that resists the flow of pool water to the soil behind the cement pool shell. Thus, while a micro-annulus may exist, the capillary forces provide a sufficient hydraulic resistance to seal the flow water. However, this micro-annular area between the fitting and cement and/or plaster provides a water seep with a path. The seep path is important for the following reasons. Applicants further recognize that calcium phosphate and calcium carbonate (two abundant materials in both plaster and cement) each have a pH of about 12.5, while "balanced" pool water has a pH approximately around 7.5. Over a period of time pool water dissolves the calcium compounds contained in the pool plaster. Because a seep water path generally exists around every type of pool wall fitting due to poor bonding and the resulting formation of the micro-annulus, the plaster adjacent and behind the fitting, and eventually the cement behind the plaster, will be gradually etched away by the low pH fresh pool water. Eventually the seep path (annulus) will widen until the hydraulic seal is lost and the fitting leaks. Furthermore, applicants also recognize that the water proximate to most wall fittings is not placid, but usually exists in more turbid state due to the water flowing through the fitting. The water flow results in mini-vortexes forming in and around the seep paths in the micro-annulus, which siphon calcium laden water from the seep path and replace it with fresher water having a lower pH, thereby accelerating the calcium etching process.

Figure 1C:
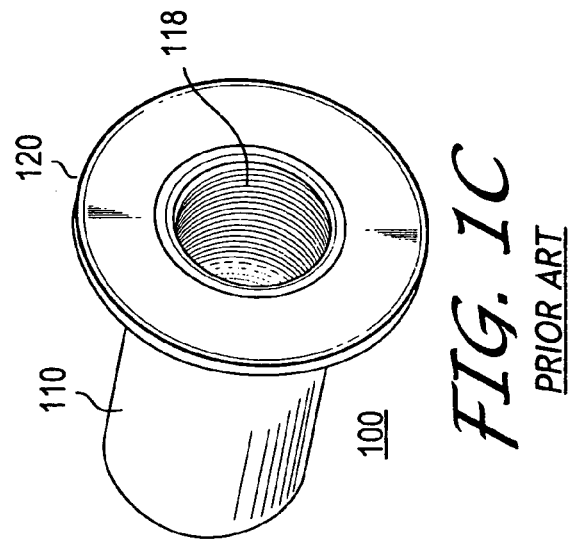
Figure 1A:
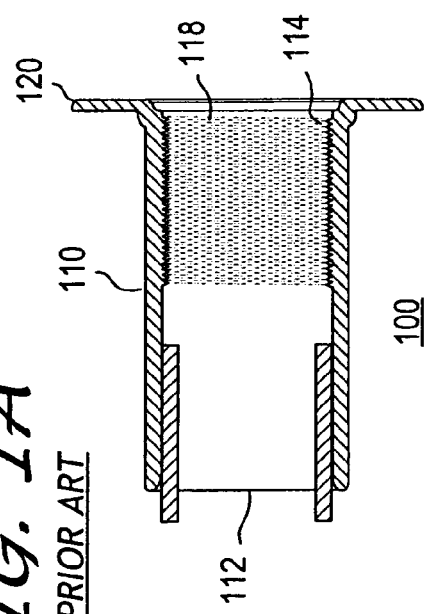

Additionally, applicants have discovered heretofore unknown factors which contribute significantly to the high failure rate of prior art sidewall fittings. Sidewall fittings generally fit in the category of fittings which are not cemented in place, but instead are usually installed after the pool shell has been formed. An exemplary prior art sidewall fitting is shown in FIGS. 1A-1C and will be described. For clarity and simplifying the description of the invention, in each of the following figures, analogous feature elements will be designated with corresponding element numbers. FIG. 1A is a cross-sectional view, FIG. 1B is a front view and FIG. 1C is an orthogonal view. Wall fitting 100 is comprised of two major structural elements, body 110 and flange or face 120 disposed at one end of body 110. When installed, body 110 traverses the pool wall horizontally with face 120 oriented vertically and positioned approximately coplanar with the exposed surface of the plaster. Connection opening 112 is formed at the opposing end of body 110 from face 120 and opening 118 is substantially adjacent to face 120. The interior of body 110 proximate to connection opening 112 may be configured as a slip joint for coupling to a PVC pipe (as depicted in the figure) or any other type of joint coupling (threaded, J-latch coupling or the like). Opening 118 faces the pool's (or spa's) interior and the interior of that portion of body 110 may be configured as a threaded joint (as depicted in the figure) or any other type of joint coupling (slip, screw, threaded, J-latch coupling, a special purpose coupling for adapting to pool equipment, or the like).

Figure 2A:
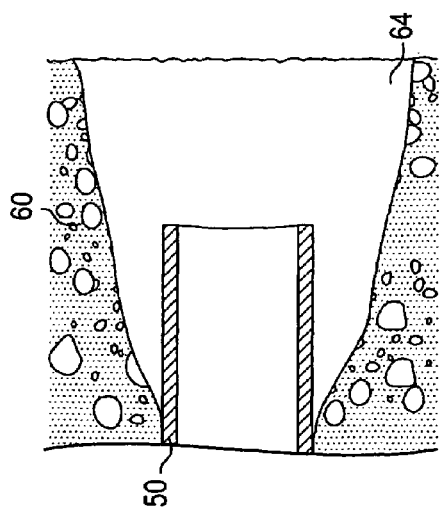
FIGS. 2A-2F are cross-sectional views of a prior art fitting, which graphically represent the discrete stages of installing the prior art fitting.
Figure 2B:
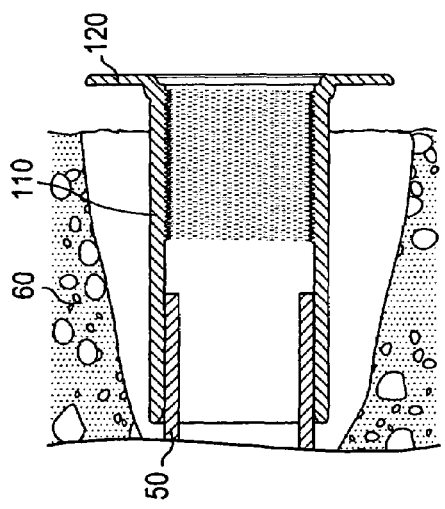
Figure 2C:
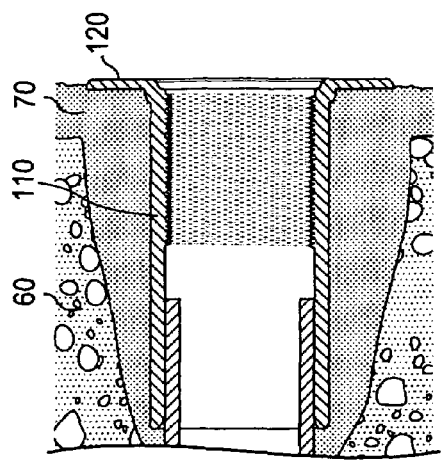
Figure 2D:
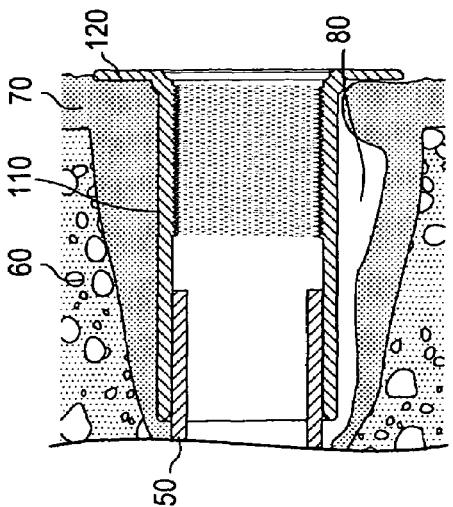
Figure 2E:
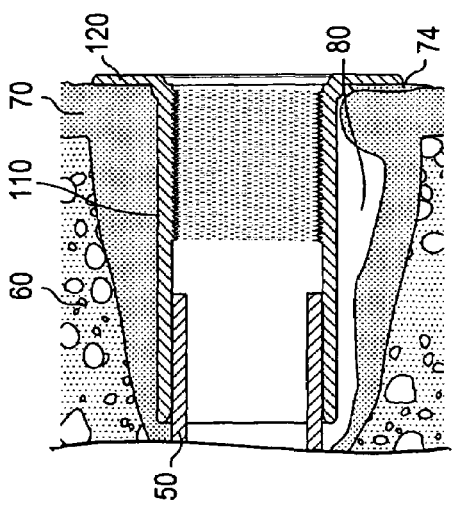
Figure 2F:
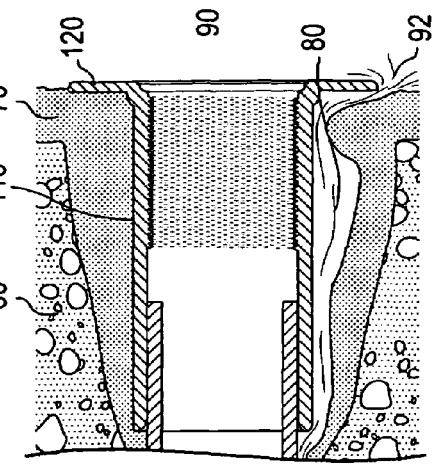
Figure 3A:
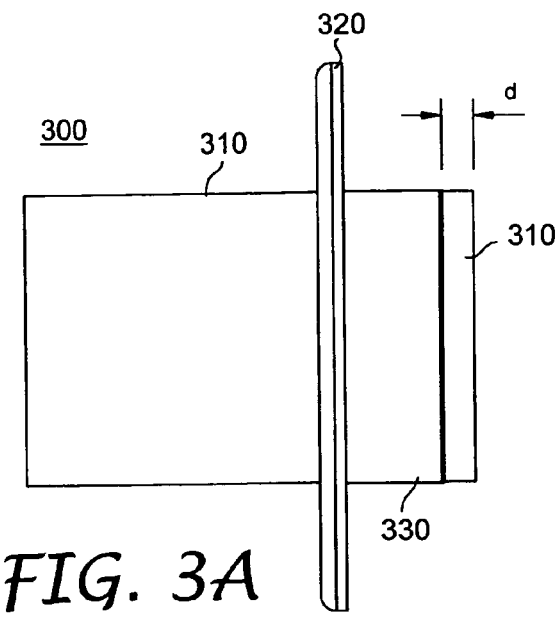
Figure 3B:
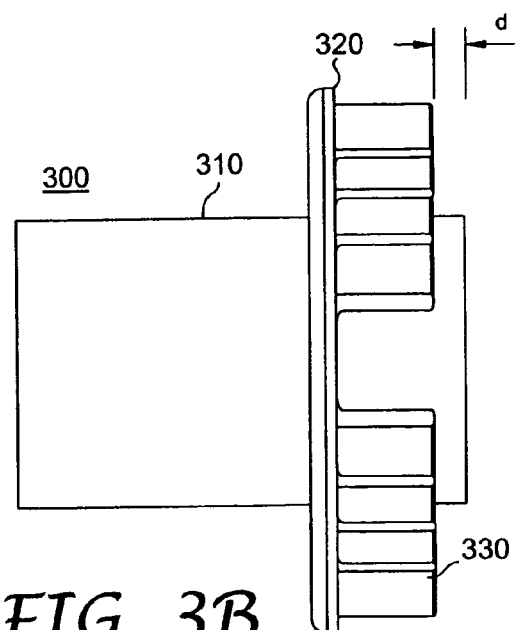
Figure 3C:
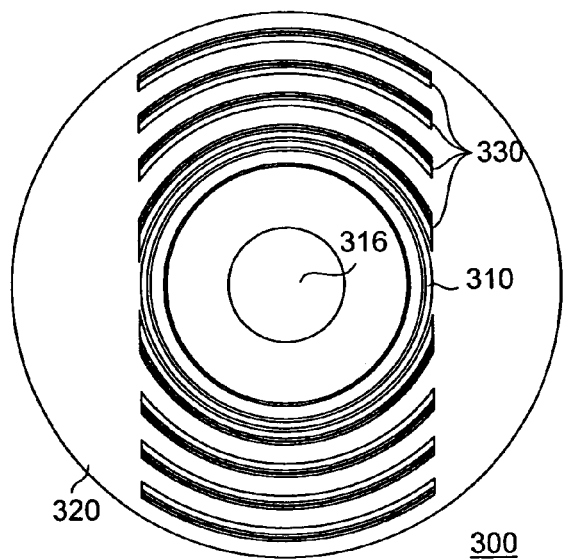

FIGS. 2A-2F are cross-sectional views of a prior art fitting, which graphically represent the discrete stages in the installation of prior art fitting 100 and the factors contributing to leakage discovered by applicants. As discussed in greater specificity above, FIG. 2A depicts a stage during pool construction PVC pipe 50 is surrounded by cement 60 which is prepared with conical depression 64 being hollowed out around pipe 50. Conical depression 64 is formed having a sufficient volume and dimensions for receiving fitting 100. In general, cement 60 is not intended to hydraulically seal conical depression 64 from the ground behind the pool wall, and usually it does not. FIG. 2B depicts a stage after pressure testing in which fitting 100 is attached to pipe 50 with, for example, PVC cement. Next, FIG. 2C shows the application of plaster 70 to depression 64 and around body 110 and behind and adjacent to face 120 of fitting 100. A plasterer trowels smooth the exterior surface of plaster 70 while plaster 70 is fluid and attempts to completely fill conical depression 64 with plaster. Because face 120 protrudes about conical depression 64, the plasterer relies on feel rather than sight for confirmation. Unbeknownst to the plasterer, plaster 70, in its fluid state, is continually migrating slowly downward along the pool wall. Because the coat of plaster is relatively thin it cures rather quickly and the migration ceases before cement 60 is exposed. However, as depicted in FIG. 2D, the plaster filling in conical depression 64 cures slower than the thinner plaster layer and siphons down the pool wall between cement 60 and the exterior face of plaster 70 forming cavity 80. Often cavity 80 will form an opening in the exterior face of plaster 70 under face 120, which is visible to the plasterer. The opening is filled with repair daub 74 of fresh plaster, however cavity 80 remains as an open void behind face 120, as depicted in FIG. 2E. Subsequent to curing, the pool is filled with water 90 and repair daub 74 seemingly holds back pool water 90. Nevertheless, as discussed above, plaster does not bond well to most fittings and seep 92 forms adjacent to face 120. As time progresses, seep 92 dissolves more and more calcium in plaster 70 until a channel communicates with cavity 80 and the hydraulic seal from the ground is lost as shown in FIG. 2F.

As applicants have examined many pool wall fitting leaks, it has been discovered that the vast majority of leaks occur along face 120 (or beauty ring), and below body 110 of fitting 100 (oriented substantially between 4 and 8 o'clock along face 120). It is postulated that seepage between plaster 70 and face 120 occurs on a more or less equal rate at any orientation, but leakage occurs in only the lower portion of fitting 100. Since the distance that a seep must traverse to connect to the porous cement located behind opening 112 is approximately equal at any orientation about face 120, the most significant factors contributing to inside wall leakage are the existence of cavity 80 and its proximity to the anterior of face 120. Thus, the primary factor for leaks developing at these orientations is the formation of cavity 80 during plastering. Applicants have developed an effective and inexpensive fitting which overcomes the shortcomings of the prior art and resists leakage heretofore unknown in the industry.

FIGS. 3-9 depict sidewall fittings in accordance with exemplary embodiments of the present invention. FIGS. 3A-3F depict sidewall fitting 300 in FIG. 3A as a plan view, in FIG. 3B as a side view, in FIG. 3C as a front view, in FIG. 3D as a cross-sectional view, in FIG. 3E as a right orthogonal view and in FIG. 3F as a left orthogonal view. Fitting 300 is similar to the prior art in that it has body 310, with opening 312 and 318 at opposite ends, and flange 320. Notice however, flange 320 is affixed to body 310 in a position substantially behind opening 318. Also depicted in pipe stop 314 for positioning the PVC at the proper depth and knock-out 316, which eliminated the necessity for installing a cap when pressure testing and can be easily knocked-out afterward.

Also notice a plurality of plaster catches 330 disposed on the anterior face of flange 320 in positions substantially in line with body 310. While FIG. 3 depicts fitting 300 as having two opposing sets of four aligned plaster catches 330, oriented approximately 180 degrees from each other on flange 320, this is merely an exemplary depiction. Fitting 300 should have at least one plaster catch, which during installation fitting 300 is oriented with plaster catch 330 directly below body 310 (oriented substantially between 4 and 8 o'clock along face 320). Having two opposing sets of catches reduces the maximum amount of rotation necessary for position plaster catch 330 directly below body 310 to 90 degrees (this is more important for fittings which attach to the pipe using a threaded coupling than for a slip joint coupling). Alternatively, fitting 300 may instead have four opposing sets of plaster catches 330, oriented approximately 90 degrees from each other on flange 320, thereby lessening the maximum amount of rotation necessary for position plaster catch 330 directly below body 310 to 45 degrees.

In accordance with one exemplary embodiment of the present invention, each of plaster catches 330 has first and second ends with a curvilinear catch body between the ends. The body portion of catches 330 extends generally laterally along the anterior face of flange 320 and is generally convex to body 310. In accordance to one exemplary embodiment, the extent of body portion of catches 330 is at least equivalent to the diameter of body 310, however, it is expected that improved leakage prevention may be achieved even if the body portion of catches 330 is somewhat shorter than the diameter of body 310 (not depicted in the figures). Alternatively, the body portion of catches 330 may extend laterally across the entire anterior face of flange 320 (not shown, depicted below with regard to FIGS. 11 and 12). Each of catches 330 has a height that is somewhat greater than flange 320 is thick (e.g., with regard to an exemplary fitting for coupling to a 2 inch PVC pipe, the diameter of body 310 is approximately 2.75 inches, the diameter of flange 320 is generally over 4.0 inches, and approximately 0.25 inches thick, and the lateral extent of catches 330 is over 2.75 inches, also the height of catches 330 is approximately 0.75 inches compared to the 0.25 inch thickness of flange 320).

In operation, fitting 300 is installed on pipe 50 in the manner described directly above, but with catches 330 oriented directly below body 310 (between 4 and 8 o'clock on face 320). The plaster catches provide multiple benefits not known in the prior art. First, catches 330 inhibit the gravitational migration of the plaster, thereby reducing the likelihood for a cavity forming behind flange 320. They also form a barrier which is oriented perpendicular to the shortest possible seep path thereby creating a substantially longer path for any seeps to traverse to reach the porous cement behind fitting 300.

As depicted, each of the plurality of plaster catches 330 are aligned with one another at a position d distance from opening 318. It is intended that plaster covers each of catches 330, flange 320 and body 310, leaving only a thin ring of body 310 and opening 318 exposed through the plaster (e.g., with regard to the exemplary fitting described above for coupling to a 2 inch PVC pipe, the anterior face of flange 320 is set back from opening 318 by approximately 1.0 inch, with d being approximately 0.25 inches, resulting in the surface of the plaster covering plaster catches 330 by 0.1 to 0.22 inches (0.85 to 0.97 inches from the anterior face of flange 320).

It is further expected that the rate seepage will continue between the plaster and body 310 at approximately the same rate as the prior art. However, any seepage which occurs must traverse along the forward portion of body 310, the anterior face, lateral edges and posterior face of flange 320 and then along the rear portion of body 310 before reaching the porous cement behind fitting 300. This path represents a significantly longer travel distance than for a prior art fitting. Furthermore, even supposing a cavity were to form behind face 320 and below body 310, plaster catches 330 would inhibit communication to the cavity in two ways. First the catches would act as a physical obstruction to the seep. Second, plaster catches 330 would substantially increase the path length for any seep to communicate with the cavity. In other words, any seeps which might form between the 4 and 8 o'clock orientations on flange 320 would have to go around each plaster catch that obstructs it in order to connect to the cavity. The shortest possible seep path would be increased by a distance approximately equivalent to twice the height of a plaster catch, for each catch disposed on flange 320.

The present invention has an additional advantage over the prior art, albeit aesthetic. Applicants have recognized that over a period of time, e.g., 2 to 4 years, all plastic fittings discolor from a vibrant white to a dingy yellow, brown or even darker. The discolored beauty rings of the prior art wall fitting detract from the natural reflective ambiance of light reflecting off the crushed marble plaster of the pool. By eliminating the permanently exposed beauty ring with the thin exposed ring portion of body 310, as discussed above, less plastic is exposed to the pool water to discolor. Moreover, the exposed portion of body 310 is commonly covered by a plumbing implement such as a directional jet eyeball, grate, J-coupling adapter, or even a false beauty ring. Importantly, while each of these plumbing implements will also discolor, they are easily replaced by the pool owner at a fraction of the cost of replacing a discolored prior art fitting.

The present invention represents a significant improvement in leakage prevention over fittings known in the prior art. Furthermore, the present configuration is economical to manufacture. Because the applicants have extensive experience in the leak detection and repair industry, the precise causes of premature leakage and fitting failure have been identified and the improvement directed to rectifying the identified shortcomings. For instance, it has been discovered that the vast majority of leaks on wall fittings occur between the 4 and 8 o'clock positions on the beauty ring of a prior art fitting and, also, that a substantial cavity usually exists under the body and behind the beauty ring. That cavity may already be in communication with the soil when a pool seep communicates with the cavity, thereby significantly decreasing the time for a leak to develop and communicate with the outer soil. The solution disclosed herein in the present invention particularly targets the identified short-coming thereby reducing the cost associated with implementing the solution. In one example, a single plaster catch fabricated on the face of a fitting's flange need only extend laterally a distance approximately equivalent to the diameter or the body of the fitting, thereby reducing material costs associated with manufacturing. In accordance with other exemplary embodiments disclosed herein, sets of multiple catches are disposed on the flange, but provide additional benefit while still reducing the material costs associated with manufacturing large quantities of fittings. Still other features provide savings in installation, such as providing multiple opposing sets of catches and providing a knock-out disk for pressure testing without the need for plugging the fitting.

It should be understood that wall fitting 300 is merely an exemplary wall fitting used for describing aspects of the present invention. Those of ordinary skill in the art will readily recognized that fitting 300 may be configured with two or more connection openings 312 for coupling to two or more pipes as is common in spa construction applications. Additionally, and also common in spa applications, wall fitting 300 may be configured with one or more aeration ports for jetting air into the water stream. Still further, those ordinarily skilled artisans will also recognize that wall fitting 300 may not be coupled to a conduit for water, but may instead be coupled to an electrical conduit and body 310 serves as a light niche. Still another embodiment which is not inconsistent with the present invention is wall fitting 300 being adapted as a rope anchor, coupled to a tie-bar, fastened to the steel rebar cage and exiting out of the cement shell and anchored to the outer shell wall. Still other embodiments of the present fitting invention will be readily apparent to those having an ordinary level of skill in the relevant industries.

Figure 4A:
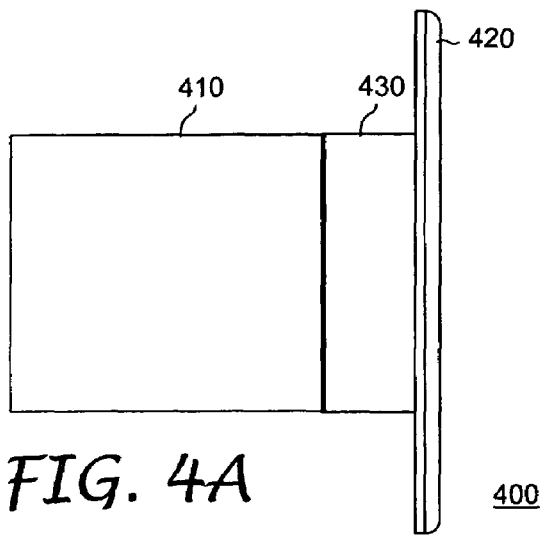
FIGS. 4A-4F depict an embodiment of a sidewall fitting with aligned, curvilinear-shaped plaster catches disposed along a posterior face of a flange and positioned approximately coextensively with, and concave to the fitting body, wherein the flange is positioned on the body as a beauty ring in accordance with an exemplary embodiment of the present invention.
Figure 4B:
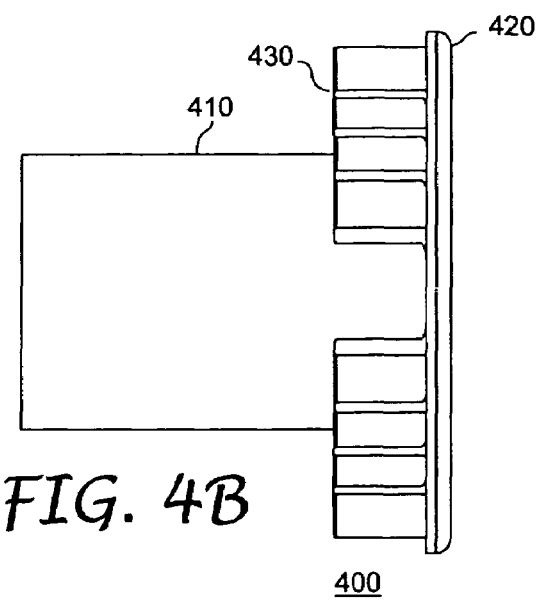
Figure 4C:
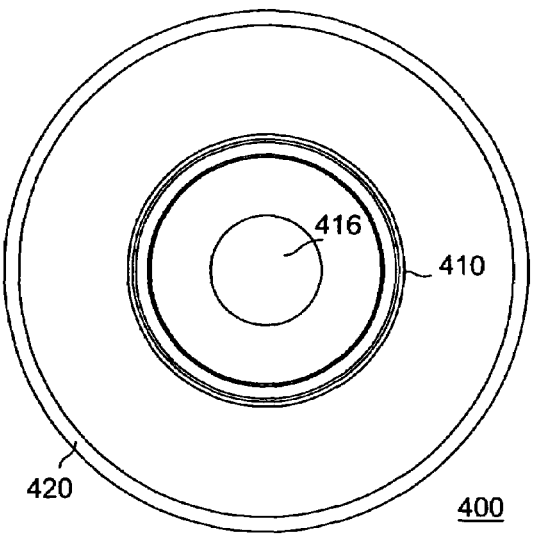
Figure 4E:
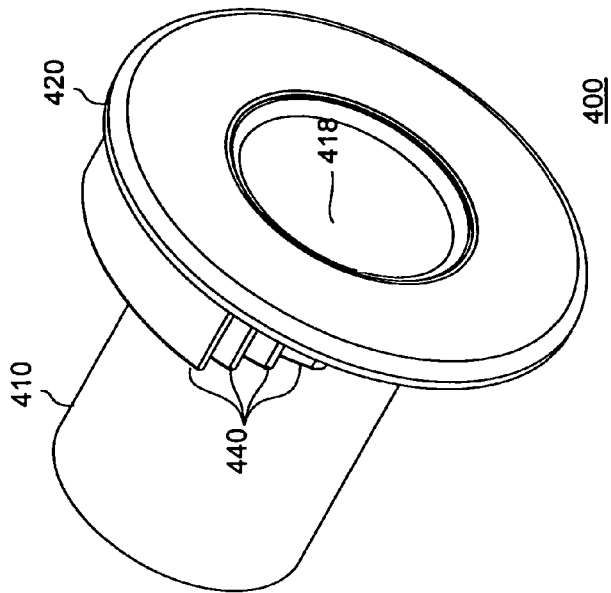
Figure 4D:
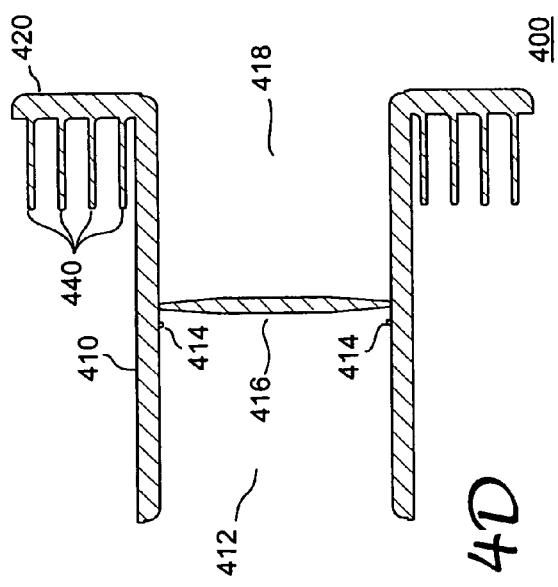
Figure 4F:
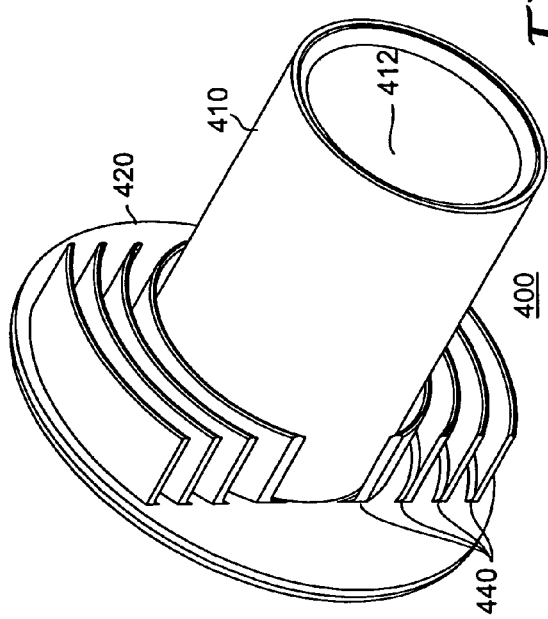

FIGS. 4A-4F depict sidewall fitting 400 with a flange/beauty ring in accordance with an exemplary embodiment of the present invention. FIG. 4A depicts the fitting in a plan view, FIG. 4B in a side view, FIG. 4C in a front view, FIG. 4D in a cross-sectional view, FIG. 4E in a right orthogonal view and FIG. 4F in a left orthogonal view. Here, rather than flange 420 being disposed along body 410 in a setback position substantially behind opening 418, it is positioned proximate to opening 418 as a beauty ring in a manner suggestive of the prior art. Notice, however, that a plurality of aligned plaster catches 440 are disposed on the posterior face of flange 420, but still in positions substantially in line with body 410. In accordance with this embodiment, flange 420 is plastered in place as an exposed beauty ring, but here again plaster catches 440 inhibit the gravitational migration of the plaster. In accordance with this exemplary embodiment, plaster catches 440 directly impede the migration of the plaster behind flange 420 which is the likely source to form a cavity. In addition, the catches form a barrier which is oriented perpendicular to the shortest possible seep path thereby creating a substantially longer path for any seeps to traverse to reach the porous cement behind fitting 400.

Figure 5A:
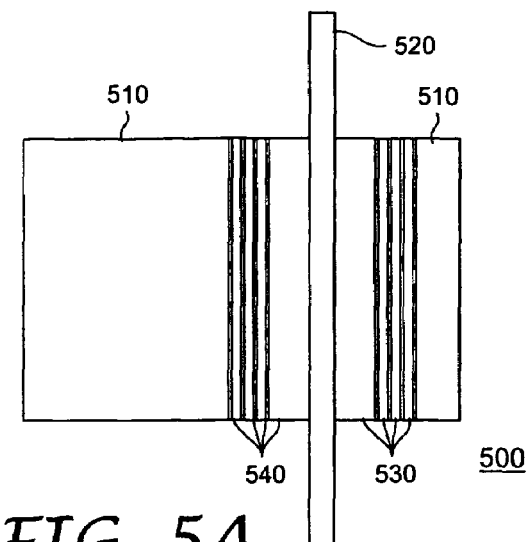
FIGS. 5A-5F depict an embodiment of a sidewall fitting with offset, curvilinear-shaped plaster catches disposed along anterior and posterior faces of a flange and positioned approximately coextensively with, and concave to the fitting body in accordance with an exemplary embodiment of the present invention.
Figure 5B:
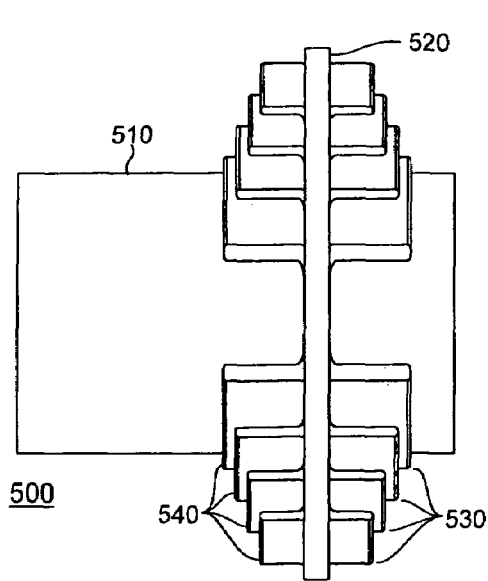
Figure 5C:
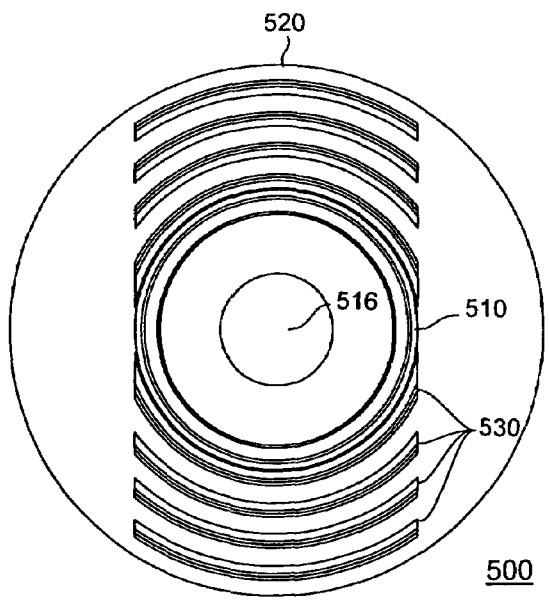
Figure 5E:
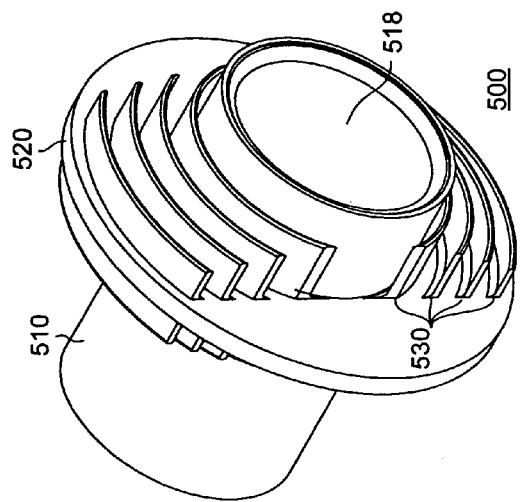
Figure 5D:
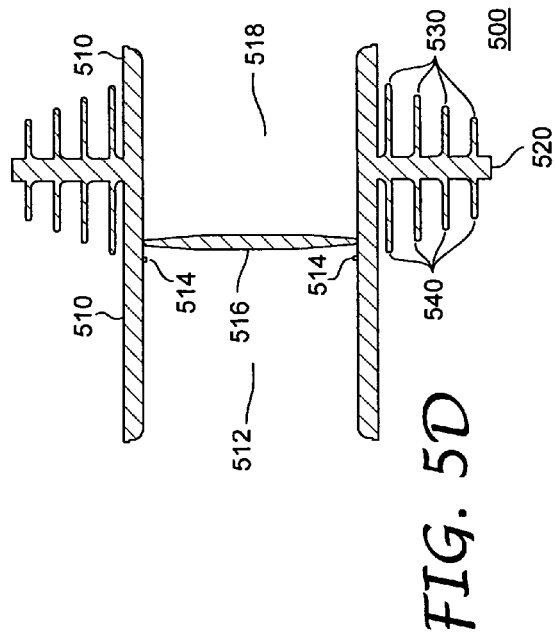
Figure 5F:
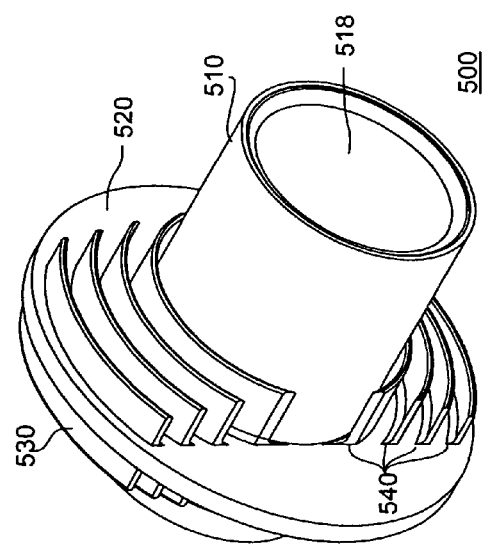
Figure 6A:
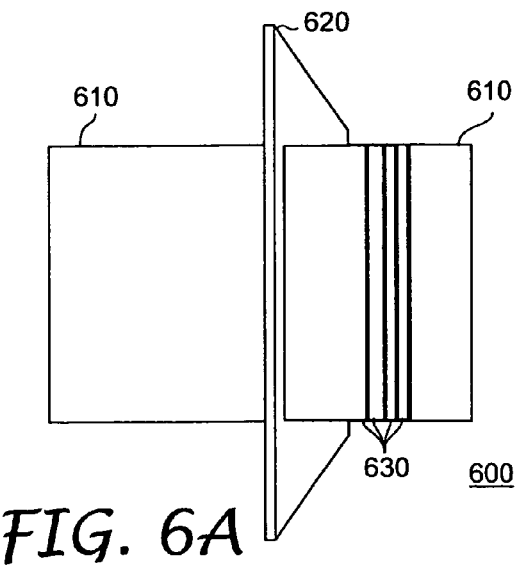
FIGS. 6A-6E depict an embodiment of a sidewall fitting with curvilinear-shaped plaster catches disposed along an anterior face of a swept back, conical-shaped flange, thereby offsetting the position of the plaster catches, and positioned approximately coextensively with, and concave to the fitting body in accordance with an exemplary embodiment of the present invention.
Figure 6B:
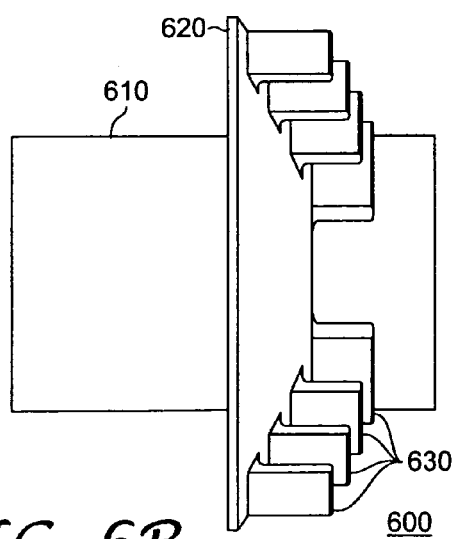
Figure 6C:
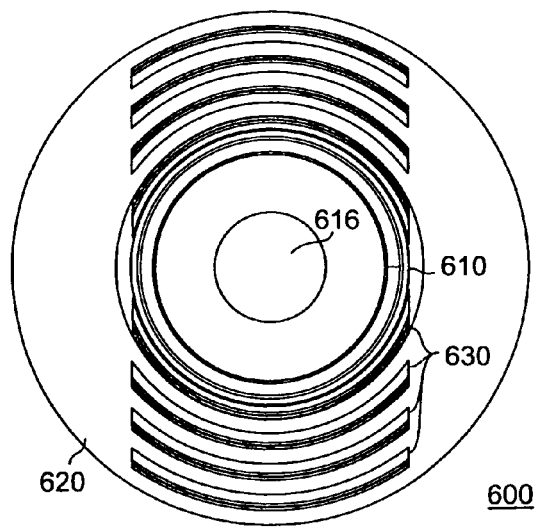
Figure 6E:
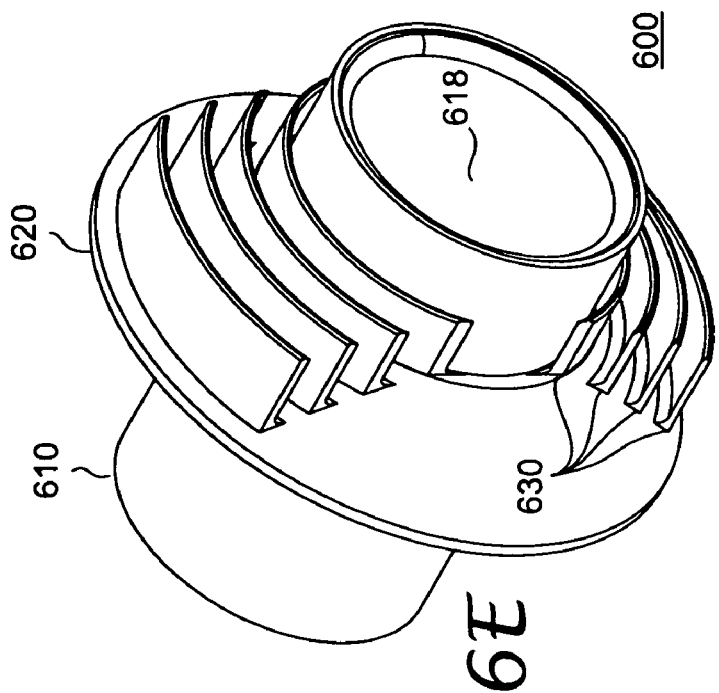
Figure 6D:
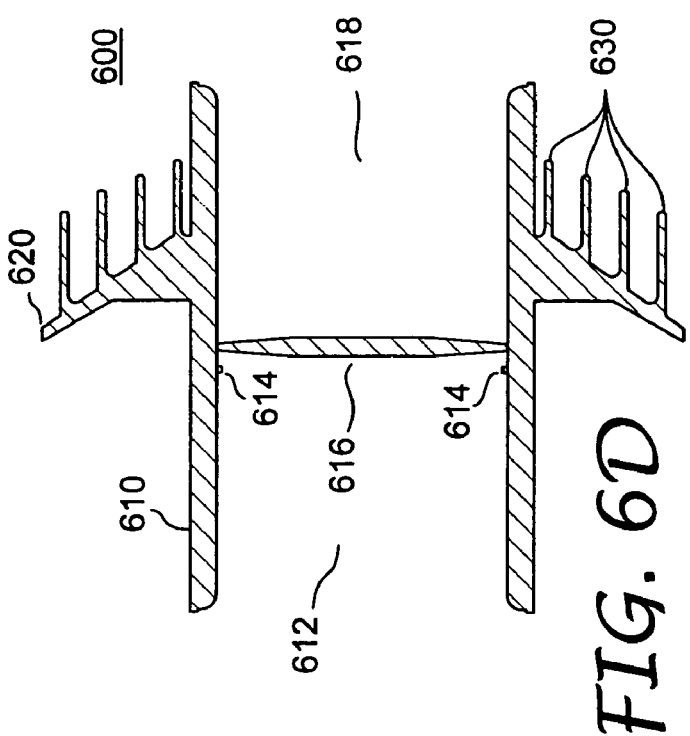

FIGS. 5A-5F depict sidewall fitting 500 in accordance with an exemplary embodiment of the present invention. FIG. 5A depicts the fitting in a plan view, FIG. 5B in a side view, FIG. 5C in a front view, FIG. 5D in a cross-sectional view, FIG. 5E in a right orthogonal view and FIG. 5F in a left orthogonal view. Wall fitting 500 differs from fitting 300, depicted in FIG. 3 and 400, depicted in FIG. 4, by the arrangement and alignment of the catches. Notice that similar to fitting 300, fitting 500 has disposed on the anterior face of flange 520 a plurality of plaster catches 530. Notice also that similar to fitting 400, fitting 500 has disposed on the posterior face of flange 520 a plurality of plaster catches 540. Additional attention is drawn to the distinction that neither set of plaster catches 530 or 540 are aligned with each other in the manner shown in FIGS. 3 and 4, but are instead offset to one another. Notice that catches positioned close to body 510 are taller than those further removed from body 510. Applicants have recognized that a certain proportion of premature leaks are attributable to poor craftsmanship in plastering. It is expected that the presently described invention will present the plasterer with a slightly more difficult shape for plastering, therefore plaster catches 530 and 540 are offset for more trouble-free plastering.

FIGS. 6A-6E depict sidewall fitting 600 in accordance with an exemplary embodiment of the present invention. In accordance with this exemplary embodiment, flange 620 is swept back rather than toward opening 612 and away from front opening 618. The plurality of plaster catches 630 disposed on the anterior face of flange 620 are offset to one another, thereby simplifying plastering, but are approximately the same height. Aspects of the present exemplary embodiment depicted as a plan view in FIG. 6A, as a side view in FIG. 6B, as a front view in FIG. 6C, as a cross-sectional view in FIG. 6D and a right orthogonal view in FIG. 6E. It should be understood the embodiments described immediately above are presented herein only to illustrate the lateral plaster catch feature and the novel features described above may be combined in a manner not explicitly disclosed. For example, either of the straight or curvilinear plaster catches may be disposed on the anterior or posterior surfaces of the flange, in an aligned of off-set configuration. Furthermore, the plaster catches need not be off-set with a conical-shaped flange, nor must they be exclusively placed on the anterior surface.

FIG. 7 through FIG. 9 are right orthogonal views of wall fittings having various catch configurations and placements in accordance with exemplary embodiments of the present invention. Improperly mixing the water-plaster ratio may sometimes contribute to the downward migration of the plaster or increase the volume of a cavity. It has been speculated that under certain conditions the surface of the plaster hardens too fast while the deeper plaster remains much less viscous. Under these conditions, the plaster behind the flange may be siphoned from around the body of the fitting and down the shell wall. This siphoning condition may be counteracted by increasing the lateral extent of the plaster catches.

Fitting 700 depicted in FIG. 7 is similar to fitting 300 disclosed in FIG. 3 except that the plurality of aligned plaster catches 730 disposed on the anterior face of flange 720 covering the lateral extent of the anterior face of flange 720 rather than merely being positioned substantially in line with body 710. Fitting 800 depicted in FIG. 8 shows aligned plaster catches 830 disposed on the anterior face of flange 820 covering the lateral extent of the anterior face of flange 820, but rather than being curvilinear, catches 830 are straight. Fitting 800 is shown with two sets of opposing plaster catches 830 oriented approximately 180 degrees from each other on flange 820, while fitting 900 instead shows four sets of opposing plaster catches 930, oriented approximately 90 degrees from each other on flange 920 in FIG. 9. As discussed above, the additional sets of catches reduce the maximum amount of rotation necessary for positioning (orienting) plaster catch 930 directly below body 910 to, at most, an eighth of a turn (45 degrees).

Fitting 1000 depicted in FIG. 10 represents a departure from the previous embodiment in that plaster catches 1030 have first and second ends with relatively short bodies, to the degree that they form small pins. As can be seen, there is no continual horizontal barriers under body 1010 by catches 1030 to resist the gravitational migration of the plaster as in the previously disclosed embodiments. However, by placing the individual pin catches 1030 in close proximity to one another, a capillary effect may be created that resists both gravity and siphoning. The closer the spacing the greater the capillary effect, but plastering may become more difficult.

Figure 11:
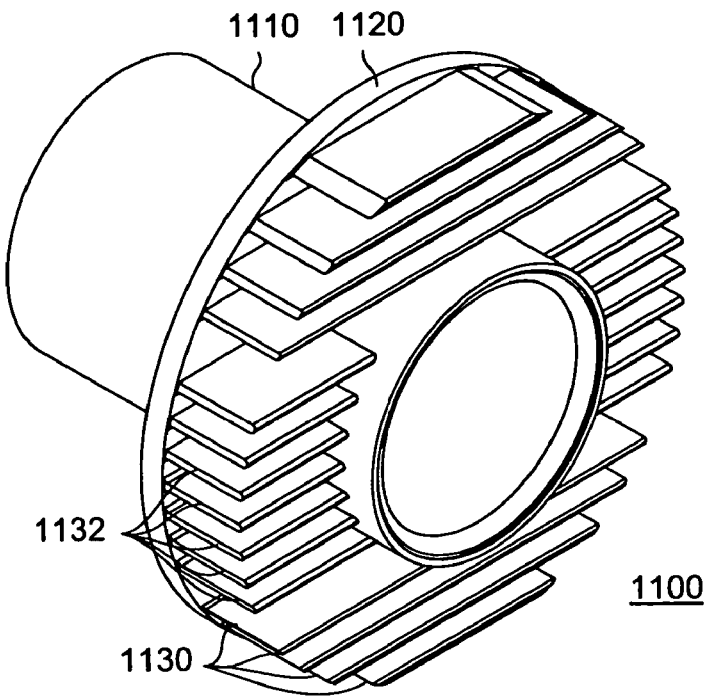
FIG. 11 depicts an embodiment of a sidewall fitting with an aligned set of curvilinear-shaped plaster catches disposed along an anterior face of a flange and positioned approximately coextensively with, and concave to the fitting body and a set of linear (straight) plaster catches disposed along the anterior face of a flange and positioned approximately lateral to the fitting body in accordance with an exemplary embodiment of the present invention.
Figure 12:
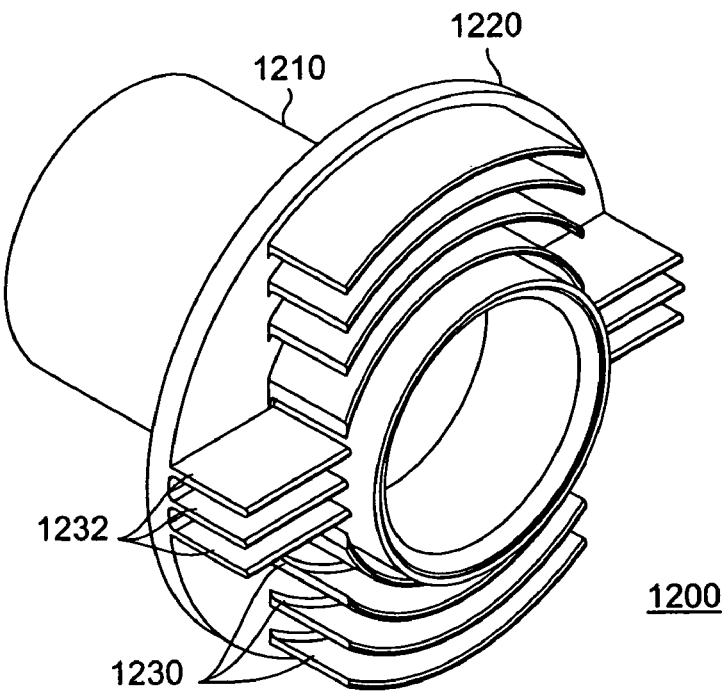
FIG. 12 depicts an embodiment of a sidewall fitting with an aligned set of linear (straight) plaster catches disposed along an anterior face of a flange and positioned approximately coextensively with the fitting body and a set of linear (straight) plaster catches disposed along the anterior face of a flange and positioned approximately lateral to the fitting body in accordance with an exemplary embodiment of the present invention.

Another mechanism for resisting both the gravitational migration and siphoning of the plaster, as well as counteracting low viscosity plasters is by including additional plaster catches arranged laterally across the face of the flange. FIGS. 11 and 12 graphically illustrate two exemplary configurations of plaster catches arranged laterally in accordance with exemplary embodiments of the present invention. FIG. 11 is a right orthogonal view of wall fitting 1100 having two sets of opposing linear catches 1130 and a set of lateral plaster catches 1132 on the anterior face of flange 1120 and arranged on the side of body 1110. Plaster catches 1130 are identical to those depicted in FIG. 9. When lateral plaster catches are employed, such as fitting 1100, the fitting can be installed in one of two orientations, each of which has provided lateral plaster catches 1132 oriented horizontally. FIG. 12 is a right orthogonal view of wall fitting 1200 having two sets of opposing curvilinear catches 1230 and a set of lateral plaster catches 1232 on the anterior face of flange 1220 and arranged on the side of body 1210. Here again, plaster catches 1230 are identical to those depicted in FIG. 3. It should be understood the embodiments described immediately above are presented herein only to illustrate the lateral plaster catch feature and may be combined with any type of plaster catch discussed above, and/or configured differently. For example, the lateral catches may be offset rather than aligned, and may not be coextensive with the flange and disposed on the anterior and/or posterior surface.

Figure 23A:
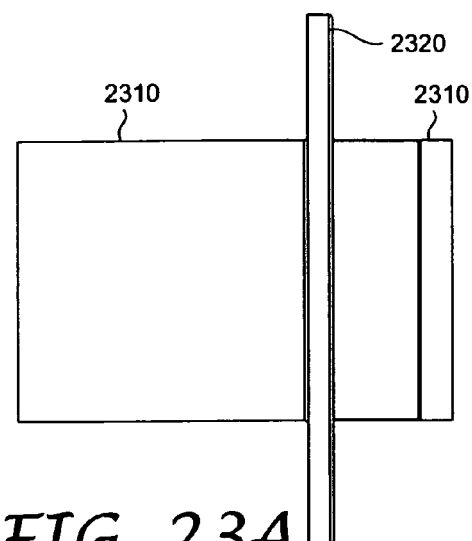
FIGS. 23A-23E depict an embodiment of a sidewall fitting with aligned, curvilinear-shaped plaster catches disposed along an anterior face of a flange and skewed, or tilted inward toward, and concave to the fitting body in accordance with an exemplary embodiment of the present invention.
Figure 23B:
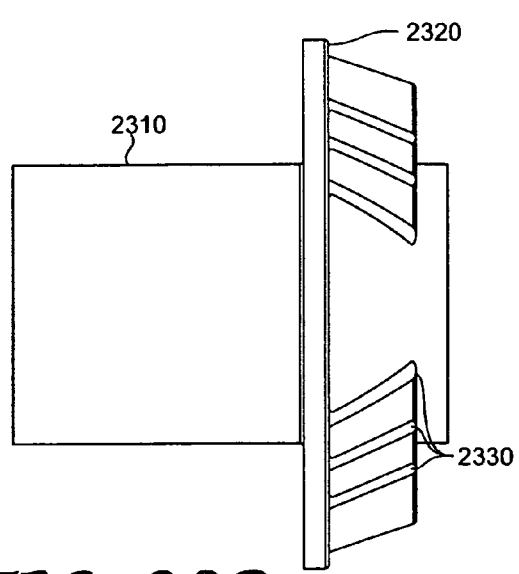
Figure 23C:
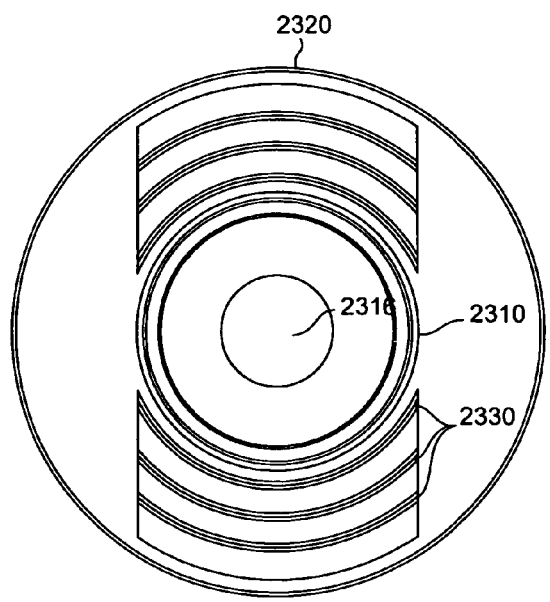
Figure 23E:
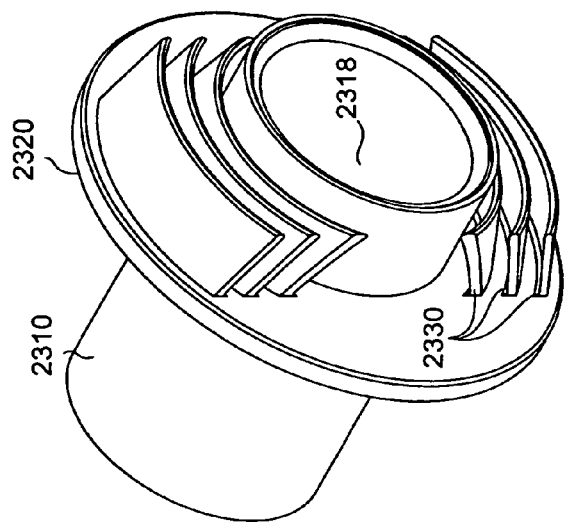
Figure 23D:
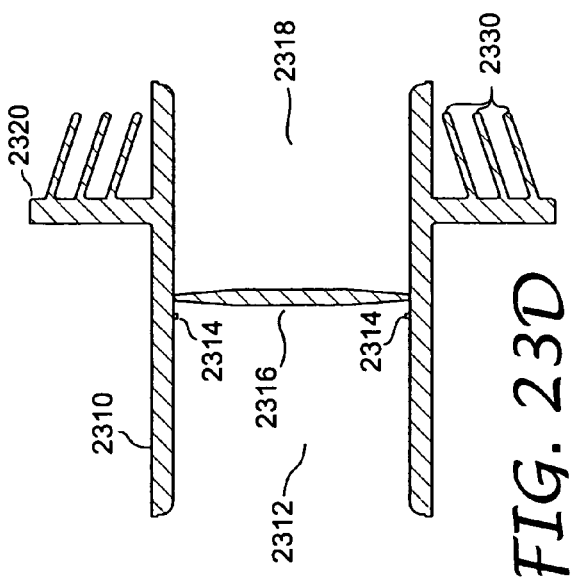

FIGS. 23A-23E depict sidewall fitting 2300 in accordance with still another exemplary embodiment of the present invention. FIG. 23A depicts the fitting in a plan view, FIG. 23B in a side view, FIG. 23C in a front view, FIG. 23D in a cross-sectional view and FIG. 23E in an orthogonal view. Wall fitting 2300 depicted in FIG. 23 is similar to fitting 300 disclosed in FIG. 3. Both fitting have disposed thereon a plurality of aligned, curvilinear-shaped plaster catches disposed along an anterior face of flange 2320 and positioned approximately coextensively with, and concave to fitting body 2310. However, the body portions plaster catches 2330 are not generally parallel with body 2310 as in fitting 300. Instead, catches 2330 tilt slightly inward toward body 2310, askew to body 2310. This increases the resistance to the gradational flow of the plaster. Recall that one purpose for disposing the plaster catches on flange 3320 is to provide a structure that inhibits the downward migration of the plaster. In the present configuration, the inner surfaces of catches 2330 cooperate with flange 3320 to create a sump to trap the flowing plaster. By configuring catches 2330 tilted inward, with large openings at the anterior end, plaster can be completely filled in between catches 2330, without leaving air pockets, yet the wet plaster will be trapped is the sump area between inner surfaces of catches 2330 cooperate with flange 3320. Thus, the uncured plaster cannot flow out of the sump, even though the plaster may be quite fluid. It should be understood that catches 2330 are presented herein only to illustrate the tilted feature body, and the structure of the catches may be different than that shown in the figure. For example, the catches may be straight, rather than curvilinear, offset rather than aligned, and may be coextensive with flange 2320 on the anterior and/or posterior surface.

As discussed elsewhere above, the present invention discloses a sidewall fitting with at least one plaster catch, which, during installation of the sidewall fitting, the plaster catch is oriented directly below the body of the sidewall fitting (oriented substantially between 4 and 8 o'clock along the flange face). Another feature disclosed herein is the ability of the sidewall fitting to cooperate with specialized and non-specialized pool and spa equipment, fitting and nozzles. FIGS. 25A-25E depict sidewall fitting 2500 in accordance with those exemplary embodiments of the present invention.

Figure 25A:
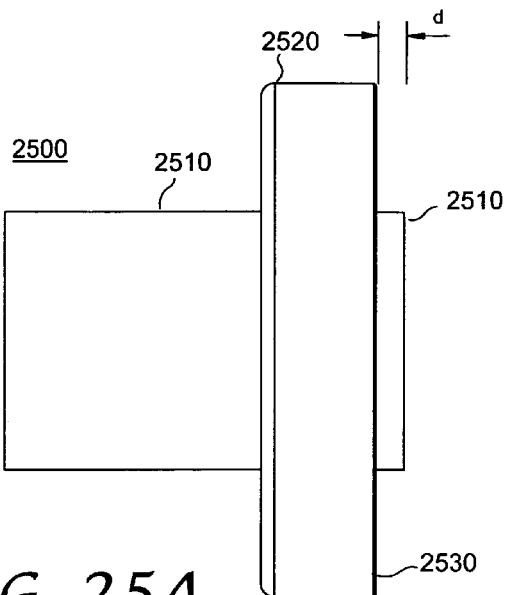
FIGS. 25A-25E depict an embodiment of a sidewall fitting with aligned, curvilinear-shaped plaster catches disposed along the anterior face of a flange and concave to the fitting body in accordance with an exemplary embodiment of the present invention.
Figure 25B:
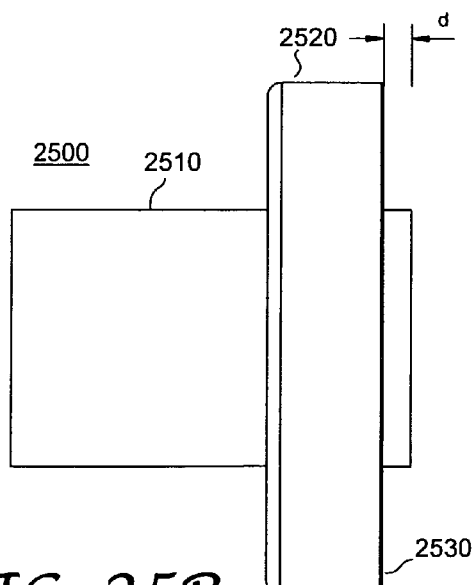
Figure 25C:
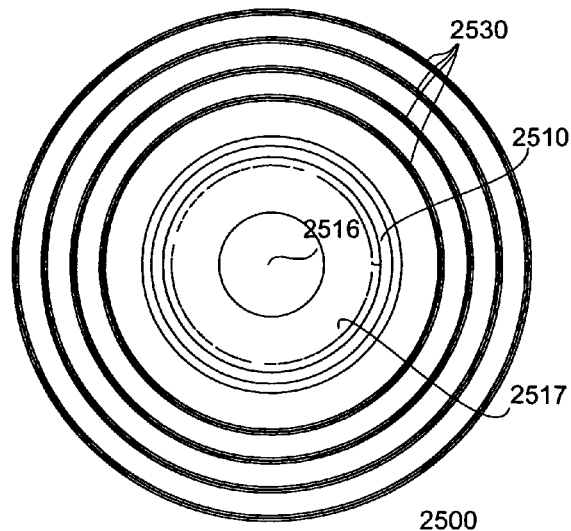
Figure 25E:
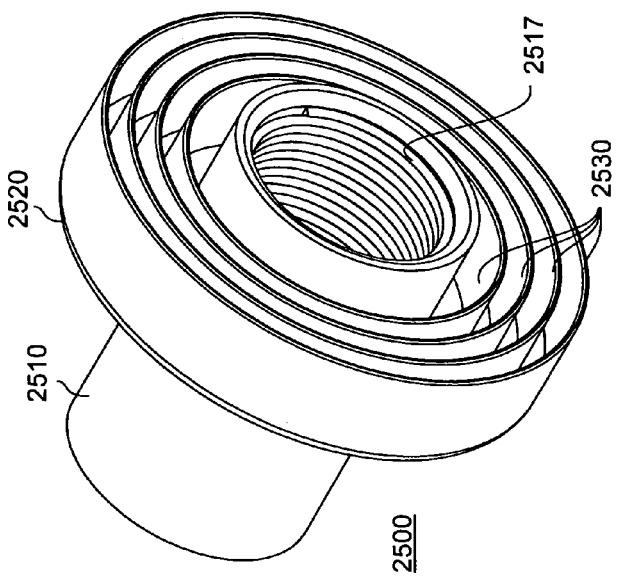
Figure 25D:
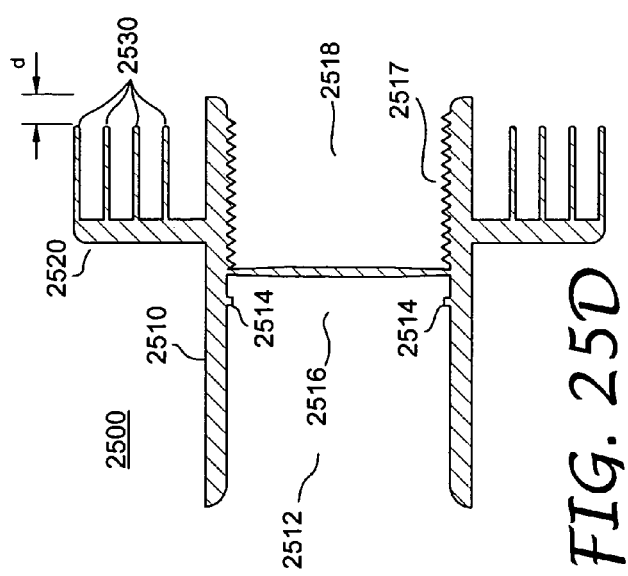

FIG. 25A depicts the fitting in a plan view, FIG. 25B in a side view, FIG. 25C in a front view, FIG. 25D in an orthogonal view and FIG. 25E in a cross-sectional view. Wall fitting 2500 depicted in FIG. 25 is similar to fitting 300 disclosed in FIG. 3. Both fitting have disposed thereon a plurality of aligned, curvilinear-shaped plaster catches disposed along an anterior face of flange 2520 and positioned approximately coextensively with, and concave to fitting body 2510. However, the ends of the body portions of aligned, curvilinear-shaped plaster catches 2530 are joined to form a continuous catch wall substantially surrounding and generally parallel to the outer surface of body 2510 in a manner consistent with those depicted in FIG. 9. Fitting 2500 is depicted with a plurality (four) of catches 2530 disposed on the anterior face of flange 2520, but this is merely exemplary. Flange 2520 may have a single catch or a plurality of concentrically arranged catches 2530 as depicted in FIG. 9 and described elsewhere above.

Furthermore, with respect to the presently described embodiments, body 2510 is subdivided into to separate portions; the anterior opening 2512 and posterior opening 2518 portions, each separately configured for coupling. Anterior opening 2518 faces the pool's (or spa's) interior and the interior of that portion of body 2510 may be configured as threaded joint 2517 for cooperating with specialized and non-specialized pool and spa equipment, fitting and nozzles. Alternatively, another type of joint coupling (slip, screw, threaded, J-latch coupling, a special purpose coupling for adapting to pool equipment, or the like) may be fashioned onto anterior opening 2518 of body 2510. It should be understood that catches 2530 are presented herein only to illustrate the contiguous wall body feature, and the structure of the catches may be different than that shown in the figure. For example, the catches may be straight, rather than curvilinear, offset rather than aligned, and may or may not be coextensive with flange 2520 on the anterior and/or posterior surface.

Figure 26A:
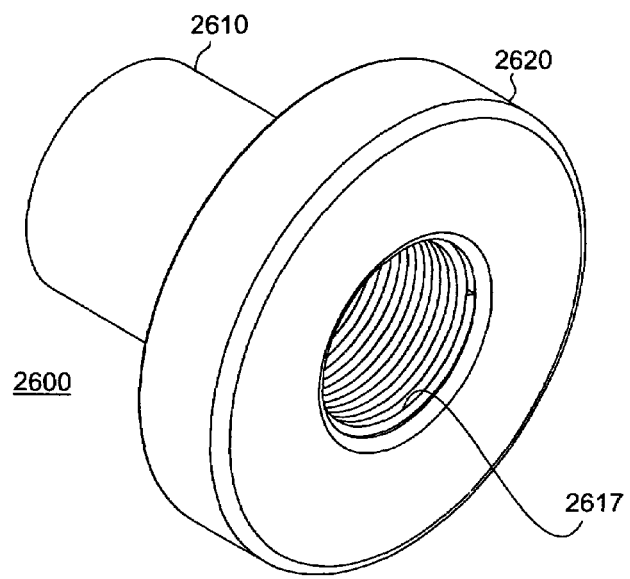
FIGS. 26A-26C depict an embodiment of a sidewall fitting with aligned, curvilinear-shaped plaster catches disposed along the posterior face of a flange, the catches being concave to, and coaxial with, the fitting body in accordance with an exemplary embodiment of the present invention.
Figure 26B:
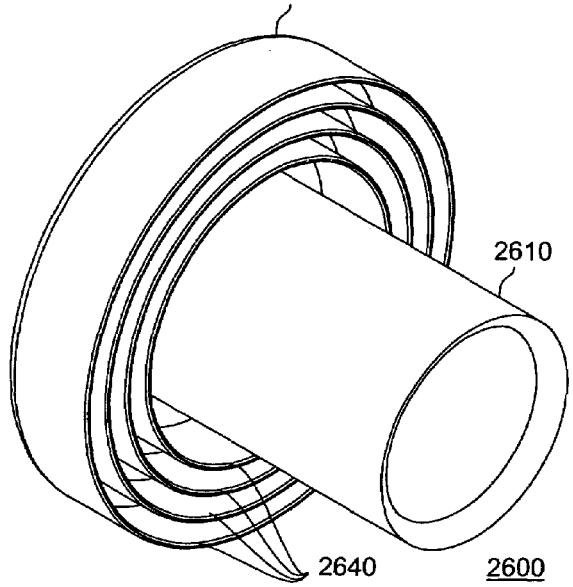
Figure 26C:
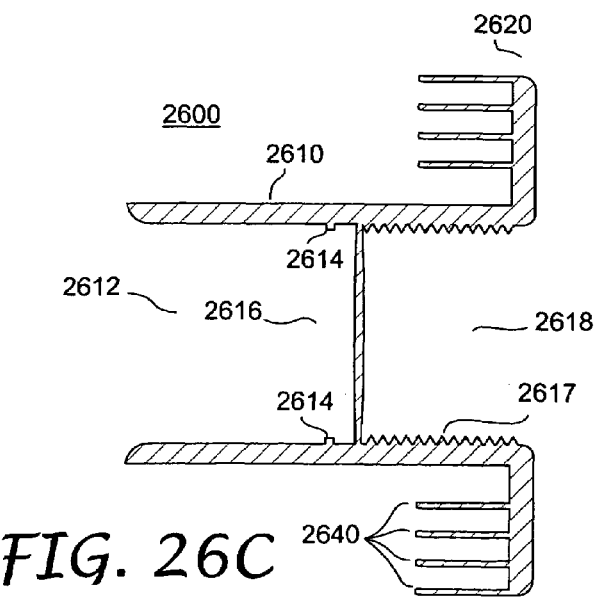
Figure 27A:
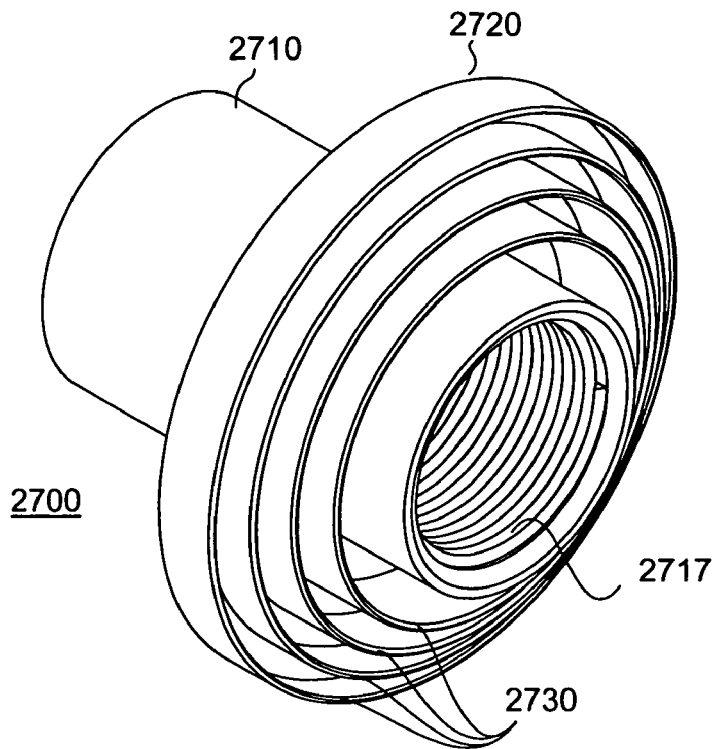
FIGS. 27A and 27B depict an embodiment of a sidewall fitting with offset, curvilinear-shaped plaster catches disposed along the anterior face of a planar flange, the catches being concave to, and coaxial with, the fitting body in accordance with an exemplary embodiment of the present invention.
Figure 27B:
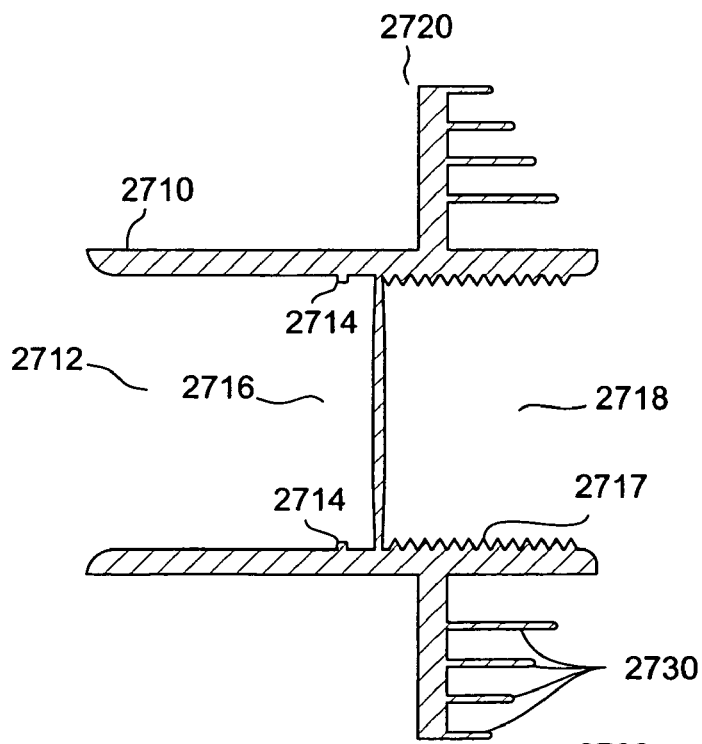
Figure 28A:
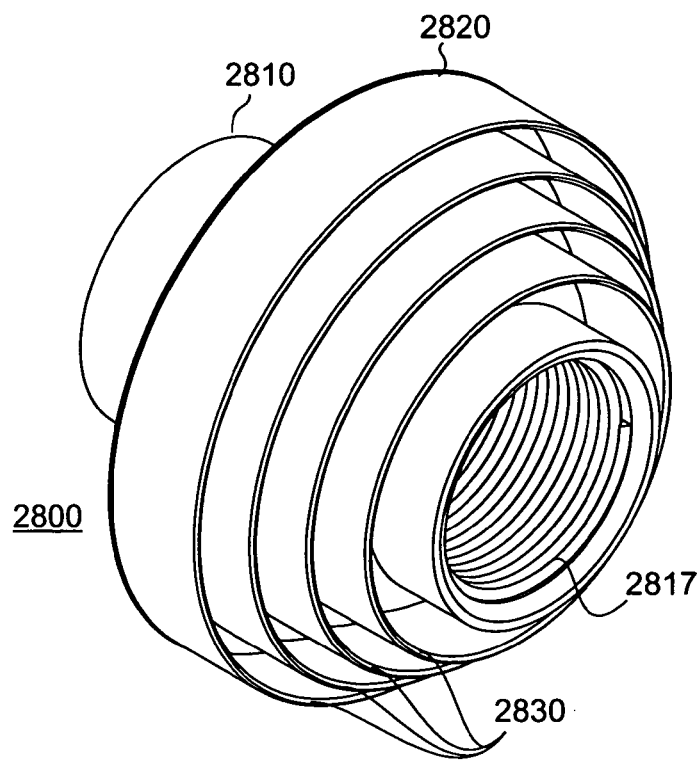
FIGS. 28A and 28B depict an embodiment of a sidewall fitting with offset, curvilinear-shaped plaster catches disposed along the anterior face of a non-planar (conical-shaped) flange, the catches being concave to, and coaxial with, the fitting body in accordance with an exemplary embodiment of the present invention.
Figure 28B:
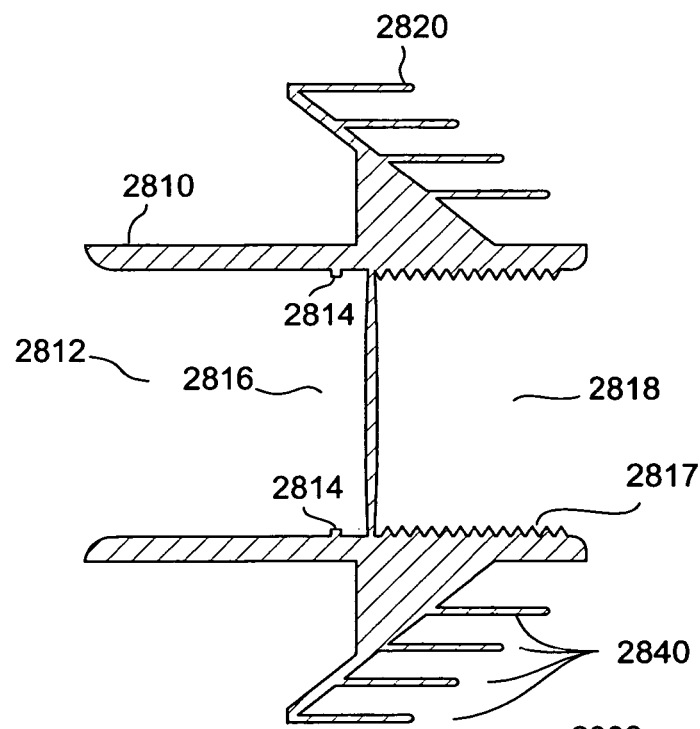

As also discussed above with regard to FIGS. 4A-4F, the catches may be disposed on the posterior face of flange as depicted in FIGS. 26A-26C. There, sidewall fitting 2600 is depicted with a flange/beauty ring in accordance with an exemplary embodiment of the present invention. FIG. 26A depicts the fitting in a right orthogonal view, FIG. 26B in a left orthogonal view and FIG. 26C depicts fitting 2600 in a cross-sectional view. Here, rather than flange 2620 being disposed along body 2610 in a setback position substantially behind opening 2618, it is positioned proximate to anterior opening 2618 as a beauty ring in a manner suggestive of the prior art. Notice, however, that a plurality of aligned plaster catches 2640 are disposed on the posterior face of flange 2620, but still in positions substantially in line with body 2610 and the interior of the anterior portion of body 2610 is configured with threads 2617 for cooperating with specialized and non-specialized pool and spa equipment, fitting and nozzles.

FIGS. 27A and 27B and FIGS. 28A and 28B depict alternatives for achieving an offset catch alignment with continuous walled catches that substantially surrounding and are generally parallel to the outer surface of the fitting body. In accordance with one exemplary embodiment, depicted in FIGS. 27A and 27B, flange 2720 is substantially planar and oriented perpendicularly to the axis of body 2710. A plurality of catches 2730 are arranges on the anterior face of flange 2720. However, the wall height of each of the plurality of catches 2730 is unique, having the taller catches arranged closer to body 2710. Taller catches arranged closer to the body allows for less complicated plastering and more trouble free results. The offset effect can also be achieved with a plurality of catches having identical wall heights by disposing the catches along a conical-shaped flange as depicted by fitting 2800 in FIGS. 28A and 28B. Notice that although the wall height of each of the plurality of catches 2830 is identical to each other of the plurality of catches 2830, they are offset with respect to each other due to non-planar shape of flange 2820 (the conical-shaped flange).

Figure 29A:
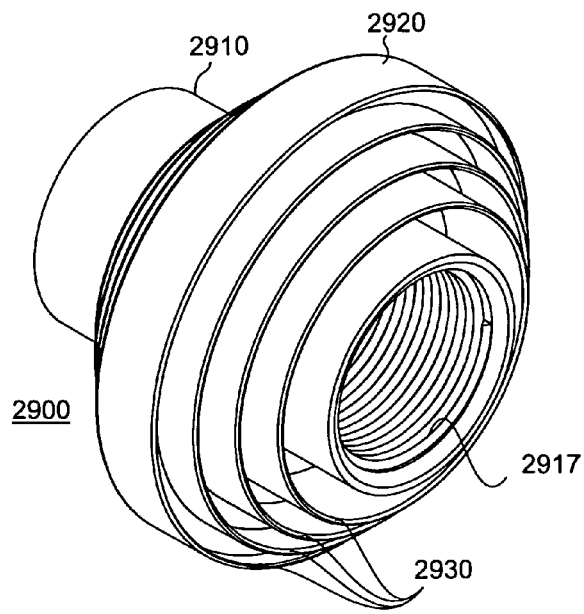
Figure 29B:
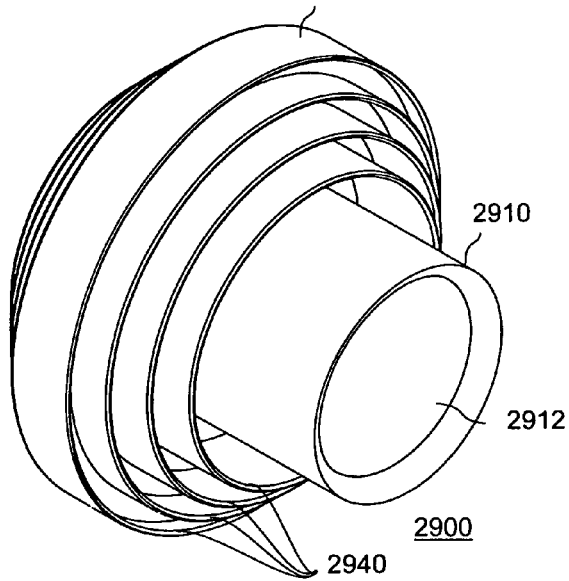
Figure 29C:
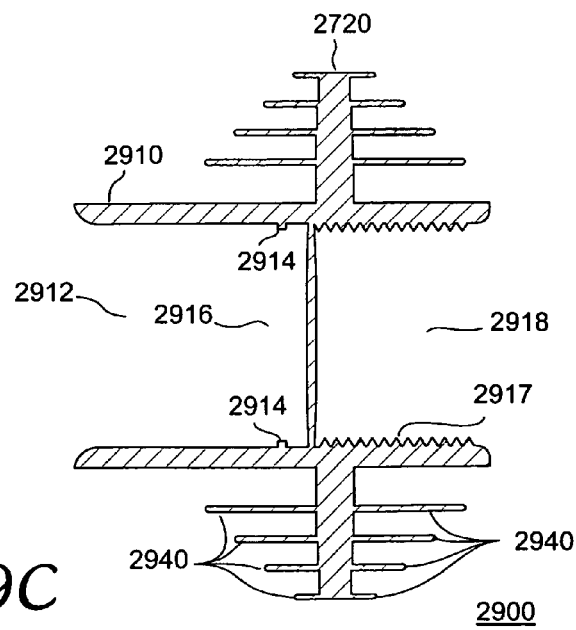

FIGS. 29A-29C depict sidewall fitting 2900 in accordance with an exemplary embodiment of the present invention. FIG. 29A depicts fitting 2900 in a right orthogonal view, FIG. 29B in a left orthogonal view and FIG. 29C shows fitting 2900 in a cross-sectional view. Wall fitting 2900 differs from fitting 2500, depicted in FIG. 25 and 2600, depicted in FIG. 26, by the arrangement and alignment of the catches. Notice that similar to fitting 2500, fitting 2900 has disposed on the anterior face of flange 2920 a plurality of plaster catches 2930. Notice also that similar to fitting 2600, fitting 2900 has disposed on the posterior face of flange 2920 a plurality of plaster catches 2940. Also, catches 2930 and 2940 are configured in an offset manner similar to catches 2730 shown in FIG. 27 and with the interior of the anterior portion of body 2910 is configured with threads 2917 for cooperating with specialized and non-specialized pool and spa equipment, fitting and nozzles.

With regard to still another exemplary embodiment of the present invention, a second flange may be incorporated for providing an additional migration barrier and for supplementing the generally horizontal barriers formed by the catches. As discussed above, typically a water seep will migrate along a path below the body of the fitting and connect with an already existing cavity in the plaster formed below the fitting. While the catches act as a barrier to the seep path and reduce the likelihood of cavity formation, any seep attempting to migrate along the flange body is aided by gravity. This is so in cases where the catches are disposed on the anterior face of the flange because water seep downward from the fitting body onto the flange (gravity will inhibit the formation of a seep path on the posterior face of the flange and any catches disposed on the posterior face). By including one or more additional flange positioned forward of the original flange and catches, any seep must migrate up a path on the forward flange and against the force of gravity prior to reaching the original flange and catches.

Figure 30A:
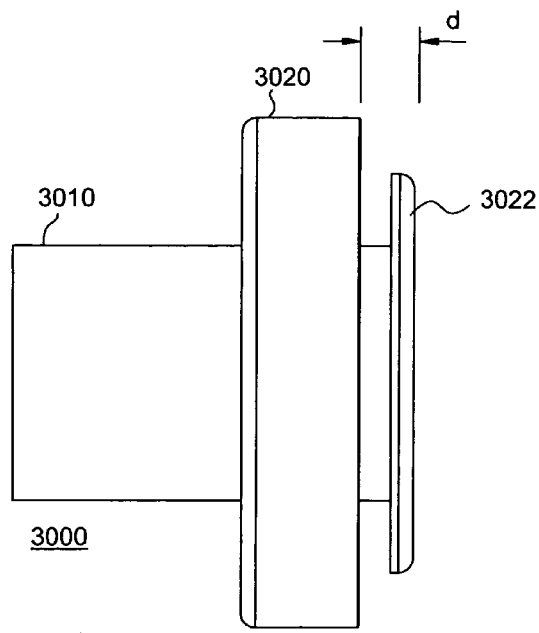
FIGS. 30A-30E depict an embodiment of a sidewall fitting with two flanges, one flange having curvilinear-shaped plaster catches disposed along the anterior face and being concave to, and coaxial with, the fitting body in accordance with an exemplary embodiment of the present invention.
Figure 30B:
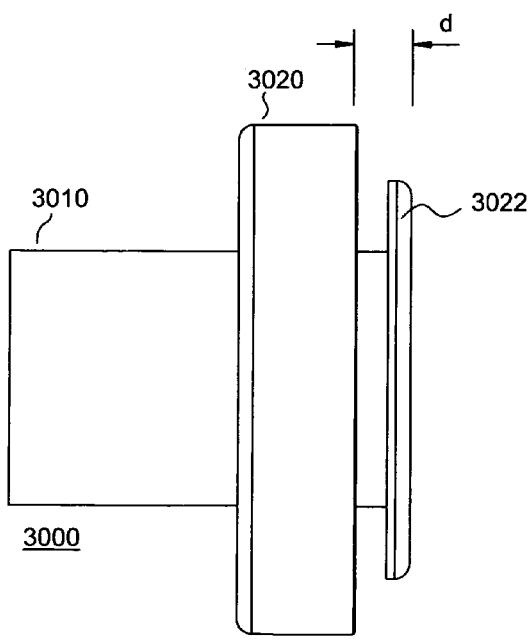
Figure 30C:
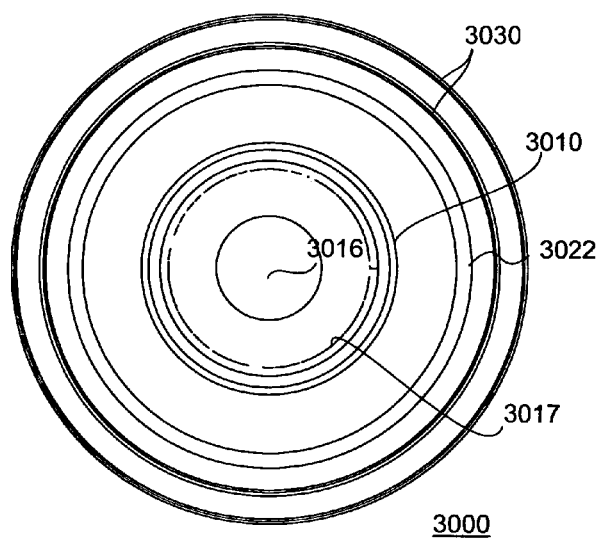
Figure 30D:
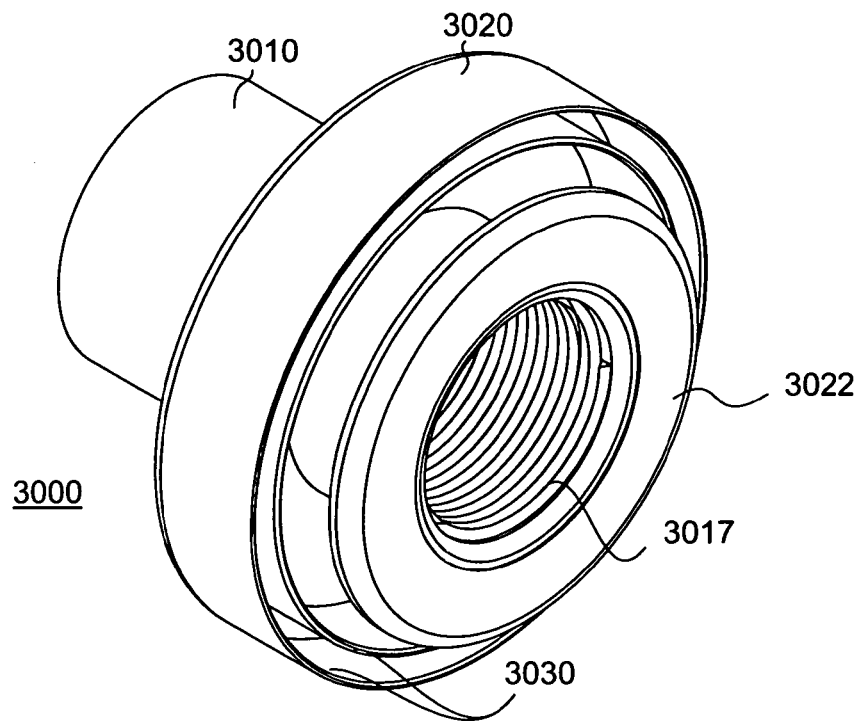
Figure 30E:
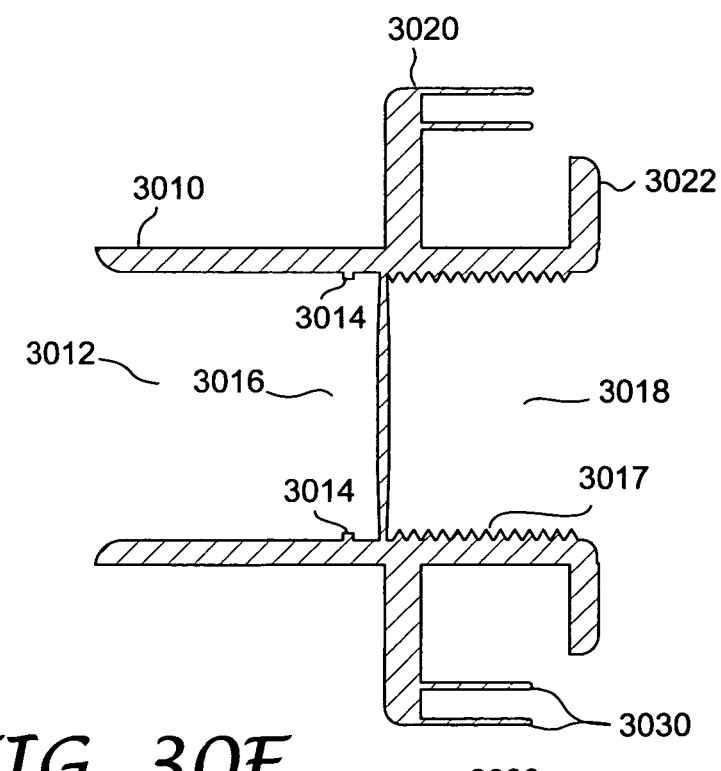

FIGS. 30A-30E depict sidewall fitting 3000 in accordance with still another exemplary embodiment of the present invention having a plurality of flanges disposed along the fitting body. FIG. 30A depicts the fitting in a plan view, FIG. 30B in a side view, FIG. 30C in a front view, FIG. 30D in an orthogonal view and FIG. 30E in a cross-sectional view. Here fitting 3000 is configured with a pair of flanges, original flange 3020 and forward flange 3022. Forward flange 3022 provides an extra measure of protection against leakages by providing an additional obstruction to seep formation and a longer seep path for those that do form. Fitting 3000 is depicted with in accordance with aligned, curvilinear-shaped plaster catches 3030, the ends of which are joined to form a continuous catch wall substantially surrounding and generally parallel to the outer surface of body 3010 and with threads 3017 in anterior opening 3018 of body 3010. Alternatively, the catches may be configured similar to any of those disclosed above and anterior opening 3018 of body 3010 may be fashioned with another type of joint coupling (slip, screw, threaded, J-latch coupling, a special purpose coupling for adapting to pool equipment, or the like). Also, although fitting 3000 is depicted with flange 3022 aligned with anterior opening 3018 of body 3010, flange 3022 may be set back from the opening. However, ample clearance should be provided for applying plaster between the original flange 3020 and forward flange 3022, and also for applying plaster between catches 3030. It is expected that one of more of the innermost catches should be omitted for facilitating the application of plaster in a smooth and continuous coat without voids.

Figure 24A:
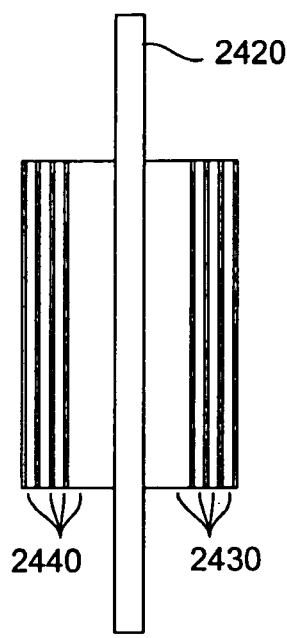
Figure 24B:
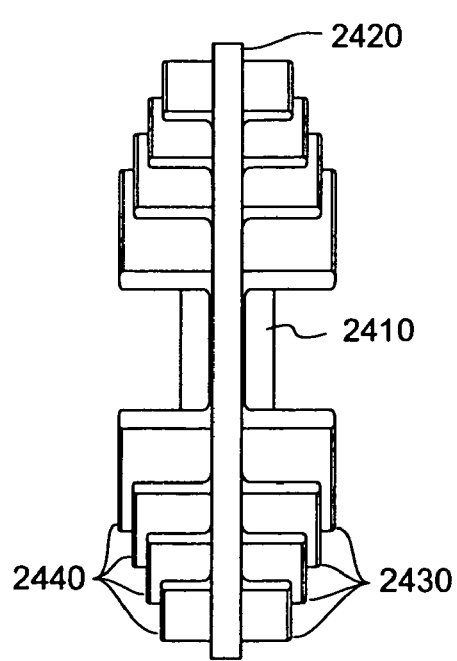
Figure 24C:
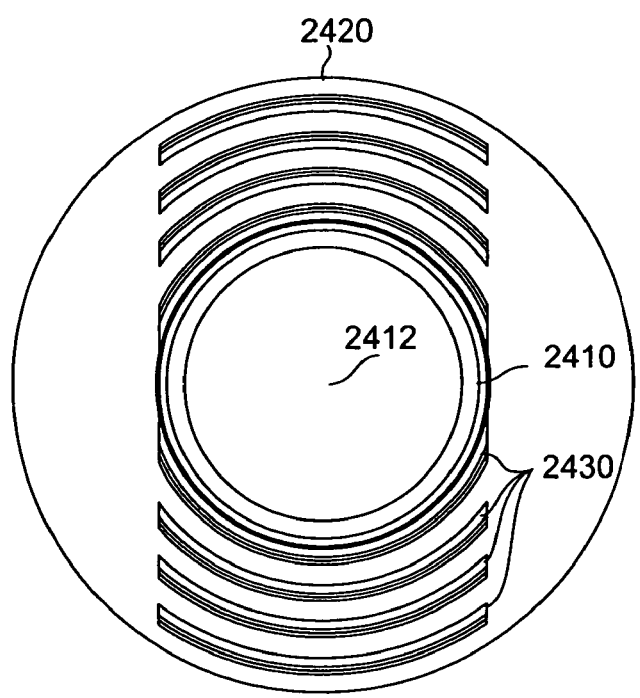

FIGS. 24A-24E depict still another sidewall fitting embodiment for hydraulically sealing a cement shell, such as for a pool or spa. The improved designs of previously disclosed sidewall fitting embodiments have supposed that the plaster will provide the primary basis for making the hydraulic seal. Although it is understood that the gunite will provide the structural integrity for the shell, along with the steel reinforced rebar cage, the gunite (cement) forms a very weak, or non-existent, bond with the plumbing pipes and conduits that traverses the shell and is therefore is high susceptible to leakage. As discussed elsewhere above, two factors contribute to the poor hydraulic sealing ability of concrete. First, although the cement is highly viscous, the sheer mass of the cement in the shell's sidewall causes some gravitational migration. Second is simply due to the uneven cement application that is common when cement is shot and spattered into a form. Additionally, the gunite is much more porous than most conventional plasters. Therefore, in a further effort to overcome the shortcomings of the prior art and provide leak resistant plumbing and conduit, in-wall fitting 2400 is disclosed herein which is secured of a pipe, prior to cementing (shooting) the pipe in place, and before attaching a sidewall fitting thereon. FIG. 24A depicts exemplary in-wall fitting 2400 in a plan view, FIG. 24B in a side view, FIG. 24C in a front view, FIG. 24D in a cross-sectional view and FIG. 24E depicts in-wall fitting 2400 in an orthogonal view, as would installed on a pipe with a sidewall fitting. In-wall fitting 2400 depicted in FIG. 24, as shown, is similar to fitting 500 disclosed in FIG. 5, with offset, curvilinear-shaped catches 2430 disposed along an anterior and posterior face of flange 2420 and positioned approximately coextensively with, and concave to fitting body 2410. It should be understood the catches 2430 are presented herein only to illustrate the in-wall feature of the fitting and therefore, the structure of the catches may be different than that shown in the figure. For example, the catches may be straight, rather than curvilinear, aligned rather than offset, and may be coextensive with flange 2420 solely on one of the anterior or posterior faces of the flange. Furthermore, because the cementing material contains larger aggregate, the spacing between the catches 2430 should allow for the increased aggregate size.

Notice, however, that fitting body 2310 is somewhat shorter than those described above. Attention is also directed to interior opening 2412 of fitting body 2310, wherein the inner surface is clean, i.e., absent of a pipe stop for positioning the PVC and a knock-out for pressure checking. The shorter body with the clean interior surface walls allows in-wall fitting 2400 to be completely slipped over a pool pipe prior to cementing. In practice the pool shell is constructed as discussed elsewhere above with a steel rebar cage fashioned within an excavated hole. Plumbing pipes for water inlets and outlets, along with pool equipment and lighting, are then installed. Typically a plumber routes the piping, usually PVC or ABS plastic, around and through the steel cage and ties off the pipe to the steel cage with wire ties. The ends are then capped for an initial pressure test. According to one exemplary embodiment of the present invention, after the pipes are tied off in-wall fittings 2400 are installed over pipes that will be subsequently connected sidewall fitting (i.e., those that will protrude through the shell and into the pool area). Here the plumber merely spreads PVC cement (glue) over the exposed pipe at a position on the pipe where in-wall fitting 2400 will be seated, e.g., proximate to the wire-tie which secures the pie to the rebar cage (see FIG. 24E). In-wall fitting 2400 is then slid over the wet PVC cement. Care must be taken to orient at least one set of catches 2430 under the exposed pipe 50. The result can be seen in FIG. 24E in which pipe 50 and sidewall fitting 300 are depicted (cement and plaster not shown).

The second category of fitting is the type which is, at least partially, cemented in place during the shell cementing operation. This category of fittings includes skimmers, light niches, floor fixture, such as main drains, overfill drains and the like. Unlike installing fittings in the first category, such as sidewall fittings, the cement is formed directly around this type fitting leaving only enough space at the surface for grout and tile and/or plaster. Since a conical depression is not formed behind this type of fitting, leakage is generally not attributable to the same causes as sidewall fittings. FIGS. 13A-13E generally depict a prior art fitting in the second category, a main drain.

Figure 13E:
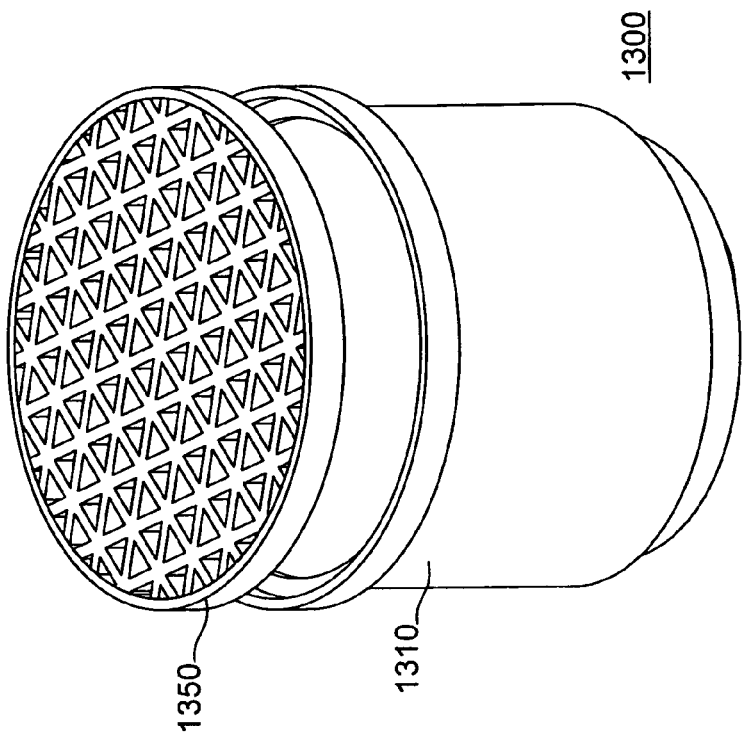
Figure 13D:
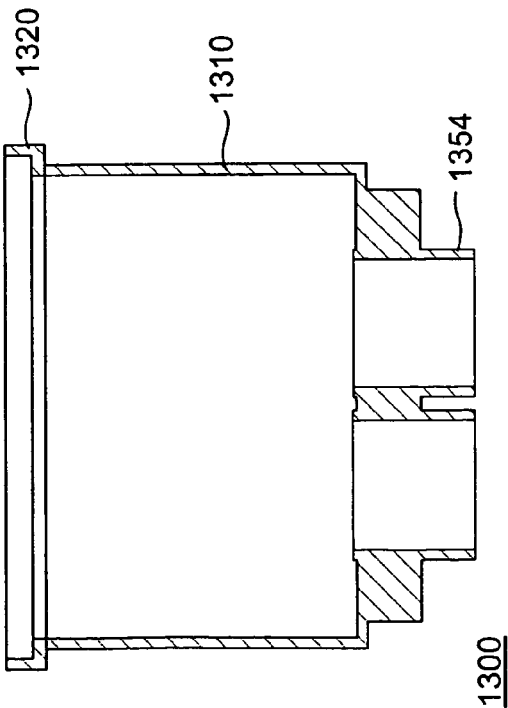

FIG. 13A depicts main drain in a plan view, FIG. 13B in a side view, FIG. 13C in a front view, FIG. 13C in a cross-sectional view and FIG. 13E in an orthogonal view. Main drain 1300 comprises generally cylindrically shaped body 1310, including seating ring 1320 for receiving strainer lid 1350 and a pair of outlet couplings 1354 for coupling to outlet pipes connected to the pool's pump. Conventionally, fitting main drain 1300 is installed by securing body 1310 to the inlet pipes and shooting the cement around the body to a level approximately 0.5 inch to 1.0 inch below the top of seating ring 1320. After curing, plaster is smoothed over the cement to about 0.125 inches from the top. For the reasons discussed above, it is expected that the hydraulic seal necessary for keeping water in the pool shell is provided by the plaster bond to body 1310 and seating ring 1320, rather than the cement bond. Leakage around main drain 1300 might be the most costly type of pool leak due to the increased pressure because of the location of the drain, at the pool's depth, and because often the entire pool must be drained to permanently stop the leakage.

Figure 14B:
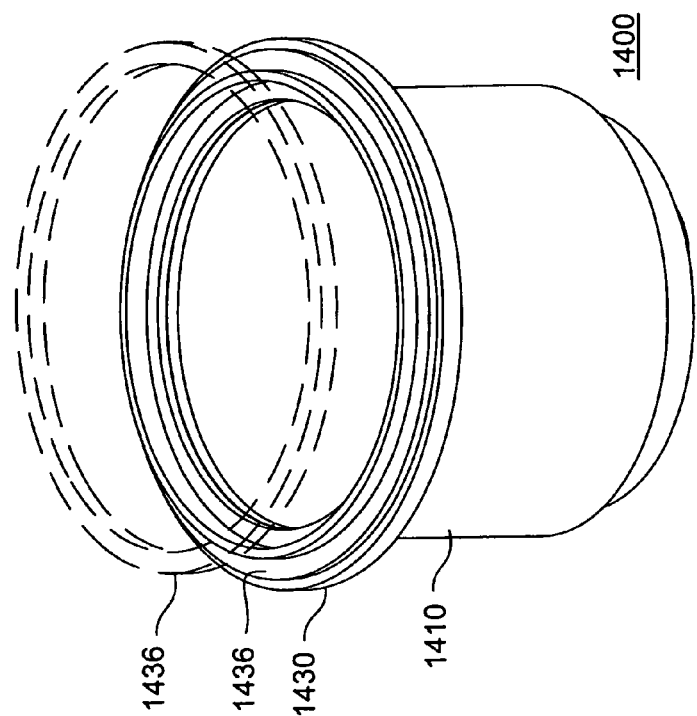
Figure 14A:
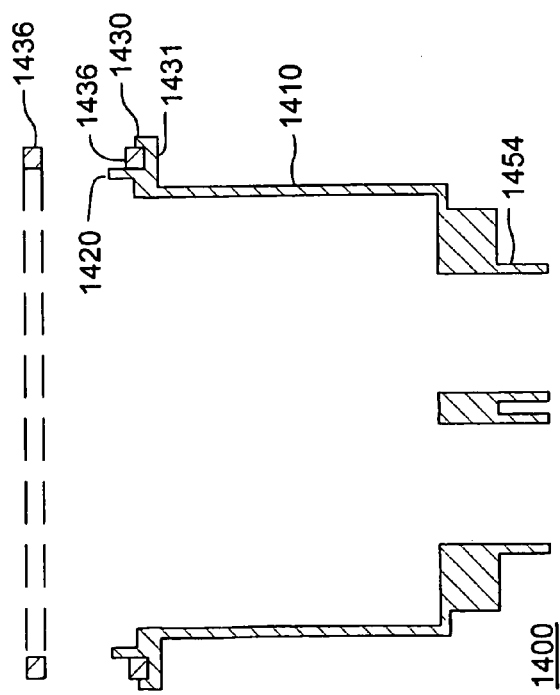

FIGS. 14A-14D are diagrams depicting a main drain fitting for preventing leakage in accordance with an exemplary embodiment of the present invention. FIG. 14A depicts the present main drain in a cross-sectional plan view and in an orthogonal view in FIG. 14B according to one exemplary embodiment. There, drain 1400 is similar to prior art drain 1300 having a generally cylindrically shaped body 1410 (although the body shape will not limit the practice of the present invention, it may be oval, square or rectangular, for instance), and includes seating ring 1420 for receiving strainer lid 1450 having a corresponding shape. Seating ring 1420 may have an external diameter different from the diameter of body 1410 as depicted, or may not. Also provided is one or more outlet couplings 1454.

In addition, drain 1400 also provides sealing structure 1430 generally surrounding seating ring 1420 and a slight offset downwardly from its upper surface, which is depicted in the figures as a U-shaped channel. The U-shaped channel design is merely exemplary and sealing structure 1430 may be fabricated in other shapes, such as a lateral flange protruding horizontally from seating ring 1420 without a riser (forming an "L" shape from inside to out). Also depicted is leave-out strip 1436 (shown above body 1410 and engaged with sealing structure 1430) which protects sealing surfaces 1431 of sealing structure 1430 from superfluous cement during installation. Leave-out strip 1436 may be formed from any material that provides a positive seal to sealing surfaces 1431, yet may be easily removed after cementing, such as weather-stripping foam tape. Alternatively, the adhesive foam may be die-cut to match the area of sealing surfaces 1431. A second, similar embodiment is depicted in FIGS. 14C and 14D in which the body portion of main drain 1400 is identical, but rather than employing leave-out strip 1436 comprising an adhesive foam tape, cover 1439 is used which includes make-up ring 1437 for engaging with and protecting sealing surfaces 1431 of sealing structure 1430 during cementing. With respect to either embodiment, the present invention reduces leakage by increasing the length of the seep path and providing a clean surface under the leave-out strip for plaster or for applying a permanent acrylic sealant. These improvements can be more readily understood from the discussion of installation of the fitting with respect to FIGS. 15A-15D.

Figures 15C, 15D:
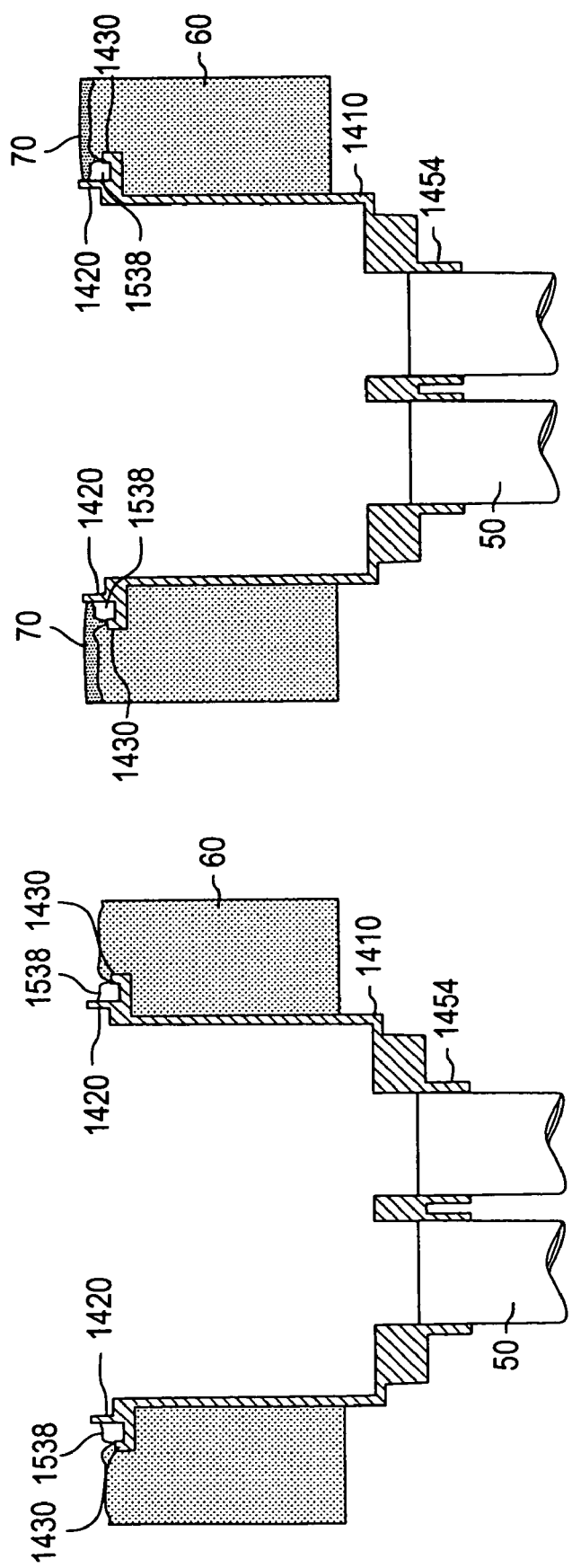

Each of FIGS. 15A-15D is a cross-sectional cutaway instance of main drain 1400 during a unique step of the installation process in accordance with exemplary embodiments of the present invention. FIG. 15A shows drain 1400 after coupling to outlet pipes 50 and cement 60 has been shot.

Notice leave-out strip 1436 is in position and is protecting sealing surfaces 1431 of sealing structure 1430 from superfluous cement 62. FIG. 15B shows the next step in which cement 62 covering leave-out strip 1436 has been removed and leave-out strip 1436 is detached from sealing structure 1430 leaving sealing surfaces 1431 free from cement contamination. Next, as depicted in FIG. 15C, sealant 1538 has been applied liberally onto sealing surfaces 1431 in a consistent manner leaving no opening for a seep channel to form. Sealant 1538 may be any type of sealant that firmly bonds to the surface of main drain 1400 (i.e., sealing surfaces 1431) and to new pool plaster, mastic, tile, grout or the like, and with a life expectancy of 20-30 years +. It should cure rigid in order to reduce cracking in the overlaying plaster. Various silicon-based and other acrylic sealants can be used. Typically, a good sealant takes up to 24 hours to cure properly. Therefore, subsequent plastering cannot be accomplished the same day that sealant 1538 is applied. After application of sealant 1538 on sealing surfaces 1531, plaster 70 can be applied over sealant 1538 to complete the bond (see FIG. 15D). If applied as described above, sealant 1538 creates a water impenetrable barrier between drain 1400 and both of plaster 70 and cement 60. It might not be possible for the pool contractor to delay plastering for the additional day to allow for sealant curing. If not, the layer of plaster 70 may be applied directly over sealing surfaces 1531 (not shown).

As discussed above, structure 1400 has been identified as a main drain type of fitting, but those having an ordinary skill level in the relevant art will readily recognize the applicability of the inventive features described above to alternative types of fittings. For example, structure 1400 may represent a light niche without departing from the scope of the presently described invention, which is typically mounted with the opening oriented in a vertical plane.

Figure 16A:
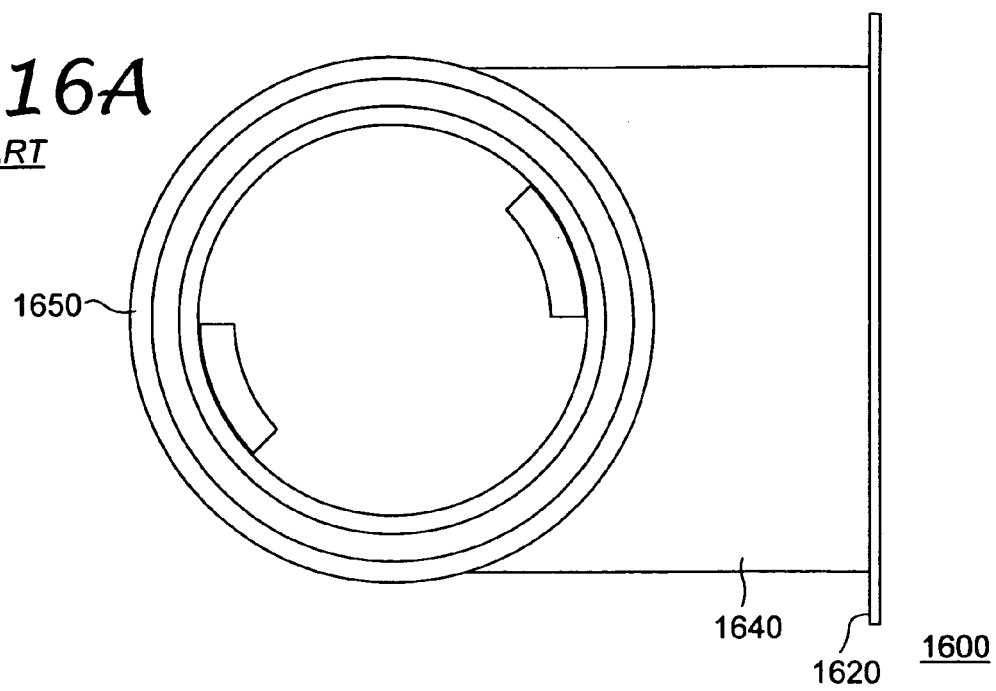
Figure 16B:
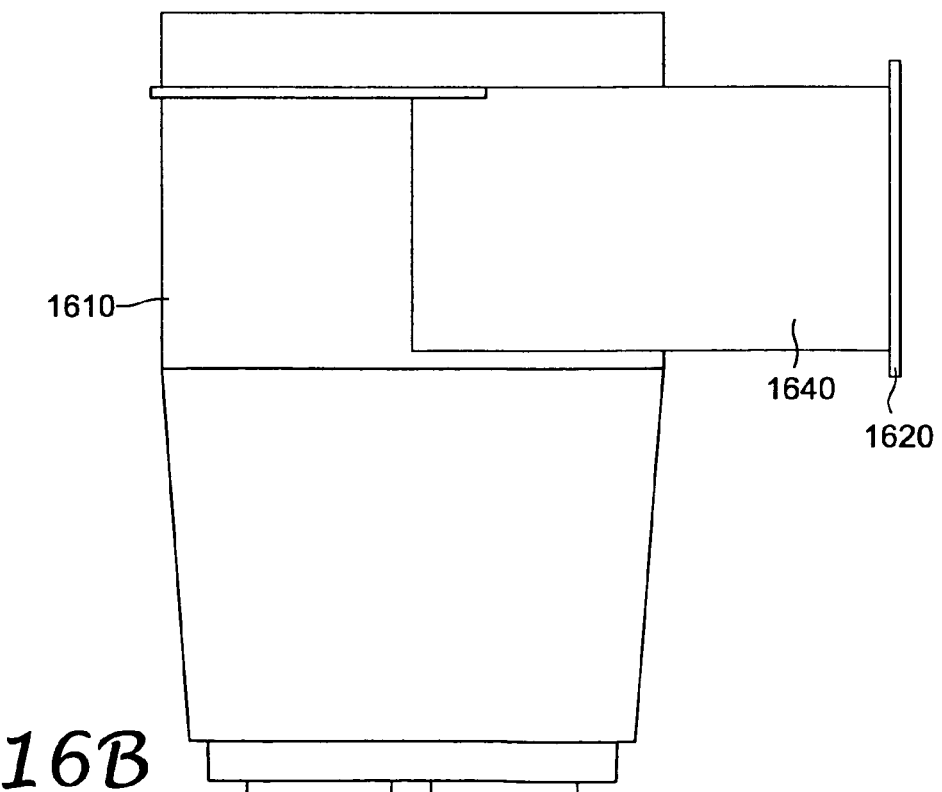
Figure 16C:
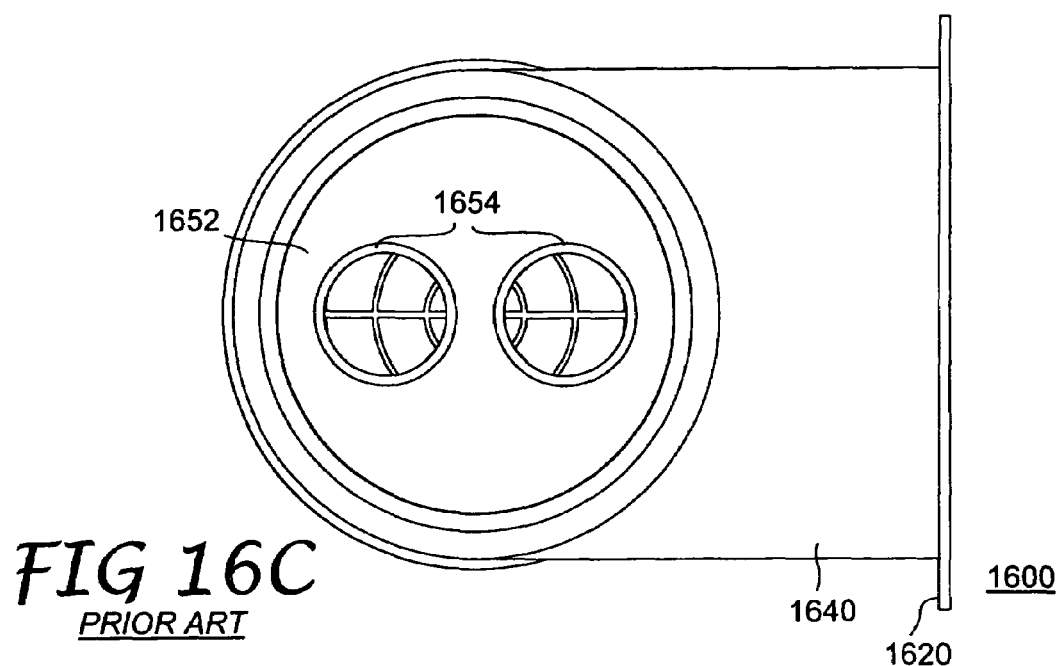
Figure 16D:
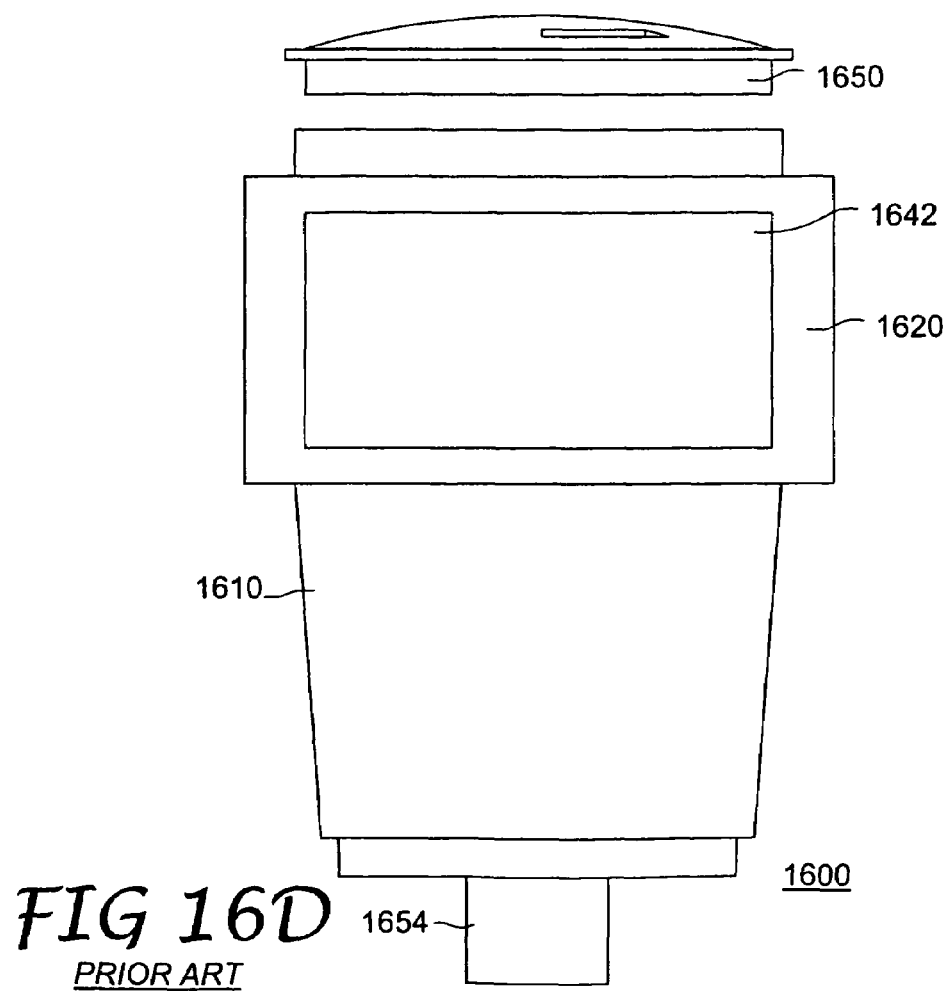

Another example of a fitting that is cemented in position during installation is a skimmer, such as prior art skimmer 1600 depicted in FIGS. 16A-16F in accordance with exemplary embodiments of the present invention (depicted in a plan view FIG. 16A, a side view in FIG. 16B, a bottom view in FIG. 16C, in a front view in FIG. 16D, a cross-sectional view in FIG. 16E and in an orthogonal view in FIG. 16F). Skimmer 1600 generally comprises cylindrically shaped body portion 1610, including bottom 1652 with one or more of outlet couplings 1654 for coupling to outlet pipes. Cover 1650 is also provided for covering the upper opening of body 1610 and a strainer basket contained therein (not shown). Connected to the upper portion of body 1610, at a position nearer the top of body 1610 than bottom 1652, is inlet box 1640 which includes inlet opening 1642 and provides a continuous path for water between opening 1642 and outlet couplings 1654. The distal end of inlet box 1640 terminates as box flange 1620.

Figure 17:
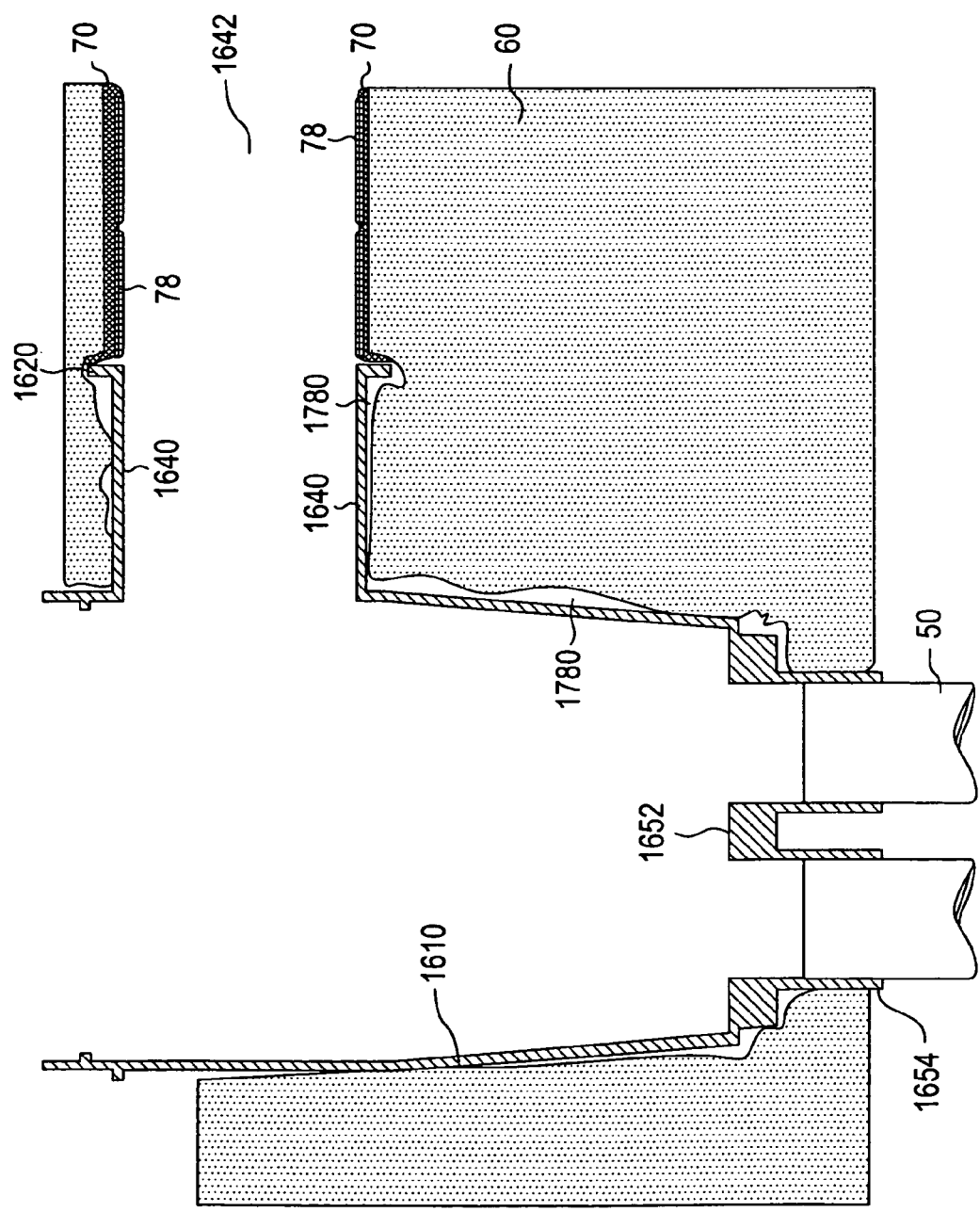
FIG. 17 depicts a cross-sectional view of a prior art skimmer after installation with leak channels in the cement and plaster.
Figure 18C:
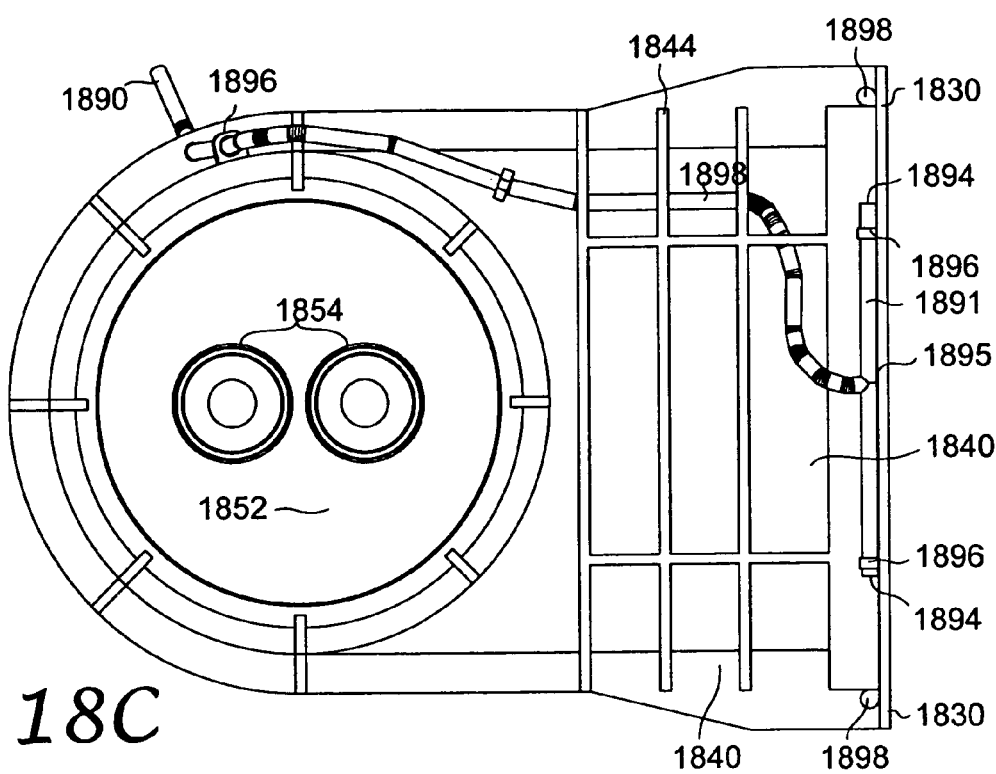
Figure 18D:
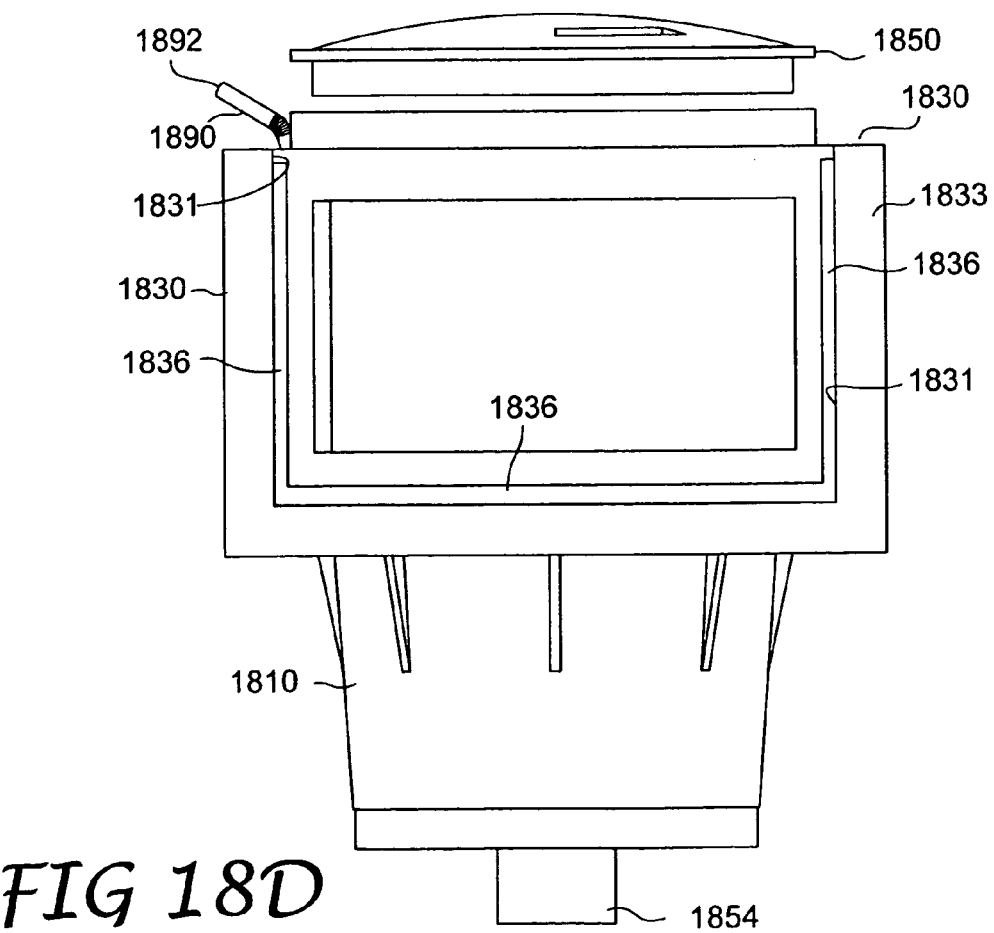
Figure 18E:
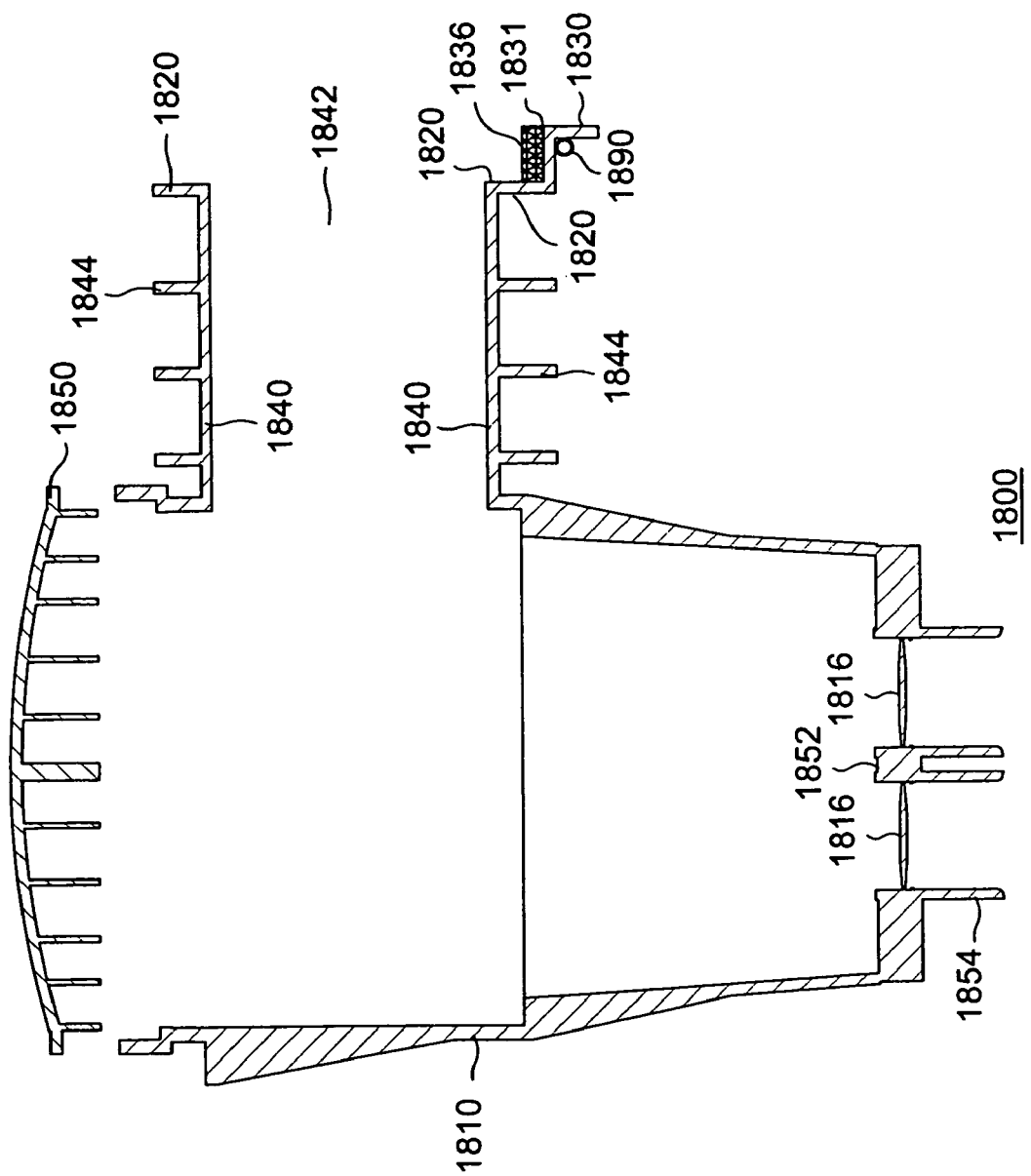

FIG. 17 is a cross-sectional diagram of an installed prior art skimmer 1600 in accordance to the prior art. Outlet couplings 1654 are connected to outlet pipes 50 and the entire structure of skimmer 1600 is secured in position by cement 60. Notice cement 60 extends under and around box 1640 and extends away from the skimmer forming a cement shell wall. During cementing, a box-shaped form covers inlet 1642 and protects a portion of flange 1620 and inlet 1642 from the cement. After the cement cures and the box is removed, an opening in cement 60 is formed adjacent to inlet 1642. The inner wall of that opening is covered in plaster 70, but more often tiles 78 are set over plaster 70 (or thin-set or mastic).

Notice cavity 1780 behind skimmer body 1610 and box 1640 which form as a water channel from inlet 1642 to the ground. Applicants have discovered that leaks, around and adjacent to skimmers, are extremely common for the reason discussed above, but sometimes difficult to detect. As mentioned above, box 1640 with its wide flat surfaces, makes bonding virtually impossible. Moreover, intermediate volume leaks can develop that are often undetectable. Remedial leak repair to a skimmer usually involves drilling one or more holes in the bottom surface of box 1640 and injecting a hydrobaric foam in the drill hole. This is a difficult process because of the confined spaces in inlet 1642 in which to drill and inject the foam. The foam will, upon contact with water, expand to many times its original volume and ideally seal the leak. The skimmer is then rechecked for leakage and the process is repeated as necessary. If the leakage cannot be stopped, the entire skimmer assembly must be removed and a new skimmer installed. Furthermore, many times this solution damages the skimmer when trapped foam expands behind one of the inlet box's wall. This usually results in damage to the skimmer, including cracks, crushing or "popping" the box out of alignment with the cement and tile inlet. In any case, if the skimmer must be removed, the cost to the pool owner increases exponentially. Removal and replacement of a skimmer is a major undertaking requiring the old skimmer to be extracted from the cement through a cement pool deck, usually with an air hammer for breaking the cement, re-plumbing the outlet pipes as necessary and the re-sealing and cementing of the new skimmer (along with repairing/replacing any tile, plaster and decking that was damaged in the process). Depending on whether or not a replacement skimmer is available with dimensions similar to the old skimmer, it may be necessary for the skimmer inlet in the shell wall to be reconfigured to match the replacement skimmer.

FIGS. 18A-18F are diagrams depicting a skimmer fitting for preventing leakage in accordance with an exemplary embodiment of the present invention. Skimmer 1800 is shown in a plan view FIG. 18A, a side view in FIG. 18B, a bottom view in FIG. 18C, in a front view in FIG. 18D, a cross-sectional view in FIG. 18E and in an orthogonal view in FIG. 18F. Skimmer 1800 is similar to skimmer 1600 in many regards, including having generally cylindrically shaped body portion 1810, with bottom 1852 and outlet couplings 1854, and having cover 1850. Box 1840 may also be connected to body 1810 in a similar manner as known in the prior art, providing a continuous path between opening 1842 and outlet couplings 1854.

The distal end of inlet box 1840 may also terminate in box flange 1820, as discussed above. However, according to one exemplary embodiment of the present invention, sealing structure 1830 is affixed to at least the lower side and portions of the two lateral sides of the outer extents of box flange 1820 as shown depicted in FIGS. 18A, 18C-18F. Typically, the uppermost portion of inlet 1842 and box 1840 is above the water line and thus not susceptible to leakage. Sealing structure 1830 generally comprises sealing surfaces 1831 and outer flange 1833 which provides additional support for the distal end of box 1840 (in a similar manner as flange 1620 in the prior art). Notice also that disposed along sealing surfaces 1831 is leave-out strip 1836. Here again, leave-out strip 1836 may be comprised of an adhesive foam tape or a removable cover (not shown). The function and benefits of leave-out strip 1836 were discussed above, but will be explained in greater specificity with regard to installing skimmer 1800 directly below.

Notice that unlike the prior art, skimmer 1800 comprises reinforcing rib supports 1844 that are interconnected to box 1840 and body 1810 in an interconnecting manner, forming chamber-like structures about the skimmer. It is expected that reinforcing rib supports 1844 will provide the additional reinforcing rigidity necessary to reduce the creation of a micro-annulus, provide additional bonding surfaces and obstacles for inhibiting water seeps and reduce the instances of skimmer damage during installation and remedial leak repair.

Attention is also directed to tubing 1890, commencing at inlet port opening 1892 (referred to herein alternatively as injection port opening 1892) proximate to body 1810, forms a "T" connection 1895 proximate to the lower rear surface of sealing structure 1830, forming cross-tube 1891, and terminates in one or more output openings 1894. The purpose of tubing 1890 is for providing an access channel for remedial application of hydrobaric foam if leakage develops over the life-time of the skimmer, thereby eliminating the necessity for drilling into skimmer box 1840. Therefore, tubing 1890 must be resilient enough to remain open during installation and cementing. If tubing 1890 is to be routed in place subsequent to the fabrication of skimmer 1800, tubing 1890 must be pliable enough for bending, but resilient to avoid kinking. Tubing 1890 may be composed of any resilient yet pliable material, such as vinyl. Alternatively, tubing 1890, or portions of tubing 1890, may be formed as an integral part of the casting of skimmer 1800 from PVC or ABS plastic, or a combination of injected plastic and vinyl. For example, the upper portion of tubing 1890 and inlet port 1892 may be formed from plastic with skimmer body 1810 in the fabrication process (not shown) with a downward facing coupler for connecting to the remaining portions of tubing 1890. Optimally, injection port 1892 will extend to a height along body 1810 above the decking level to allow access to inlet injection port 1892 for remedial leak repairs in the future. In any case, a crimping or plugging mechanism (not shown, see for example crimping mechanism 2202 in FIG. 22) may be provided for closing tubing 1890 proximate to injection port opening 1892 after injecting the hydrobaric foam. As discussed elsewhere above, a hydrobaric-type foam is extremely effective in sealing leaks because it expands when coming in contact with water, thereby chasing the water into water-filled cavities. However, some of the effectiveness is lost if the foam expands backward out of injection port opening 1892. Tubing 1890 may be temporarily closed, or crimped, thereby forcing the expanding foam in the cement. If, during curing, any deformation is noticed on box 1840 or body 1810, the mechanism can be removed, thereby allowing the expanding foam to egress at inlet port opening 1892 and relieve the pressure on skimmer 1800.

Openings 1894 on cross-tube 1891 are strategically located at the most optimal location(s) for foam insertion and may contain penetrable foam inserts (not shown, see foam inserts 2199 in FIG. 21) for keeping out the cement but permeable enough to allow delivery of the uncured hydrobaric foam into cracks and cavities in the cement. Additional openings may be perforated along cross-tube 1891 or further up on tube 1890 as necessary for expediting the delivery of foam into leakage channels. Alternatively, hydrobaric foam may be injected into inlet port 1892 immediately after the cement cures, however then tube 1890 will be clogged with foam and not available for remedially repairing any leaks that may form thereafter.

Notice also holes 1898 in reinforcing rib supports 1844. These holes provide two benefits; they present a path for routing tubing 1890 and cross-tube 1891, and path(es) for connecting one chamber with another for foam delivery. Additional tubing mounts 1996 may be affixed to body 1810, or wherever necessary to limit tubing movement during installation and avoid kinking. Mounts 1996 may be permanently cast in PVC or ABS plastic with the body or box of skimmer 1800, or may instead be mounted with adhesive as necessary on the structure.

Figure 19A:
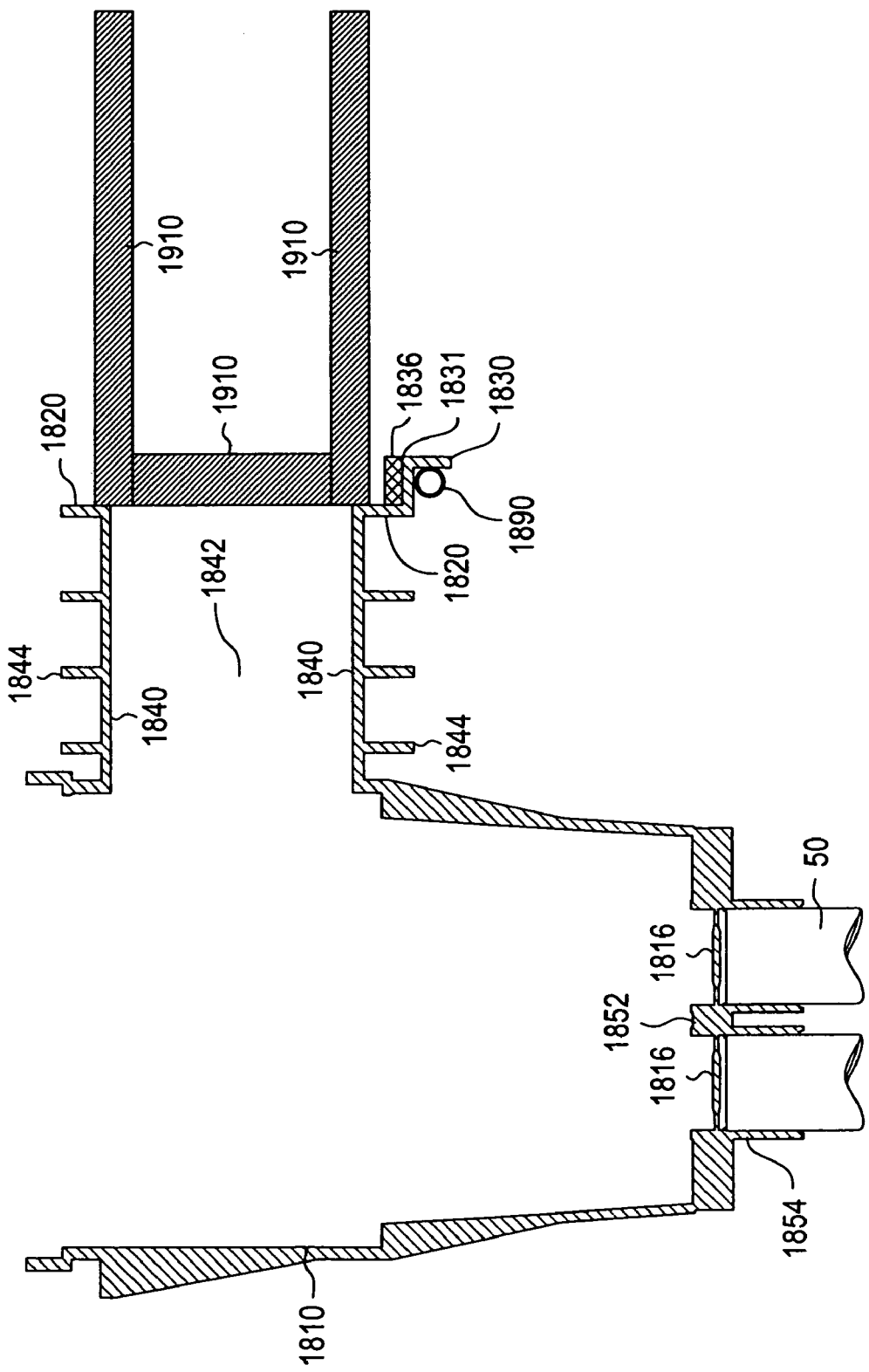
FIGS. 19A-19F depict exemplary embodiments of a skimmer fitting during stages of installation and remedial leak repair in accordance with an exemplary embodiment of the present invention.
Figure 19B:
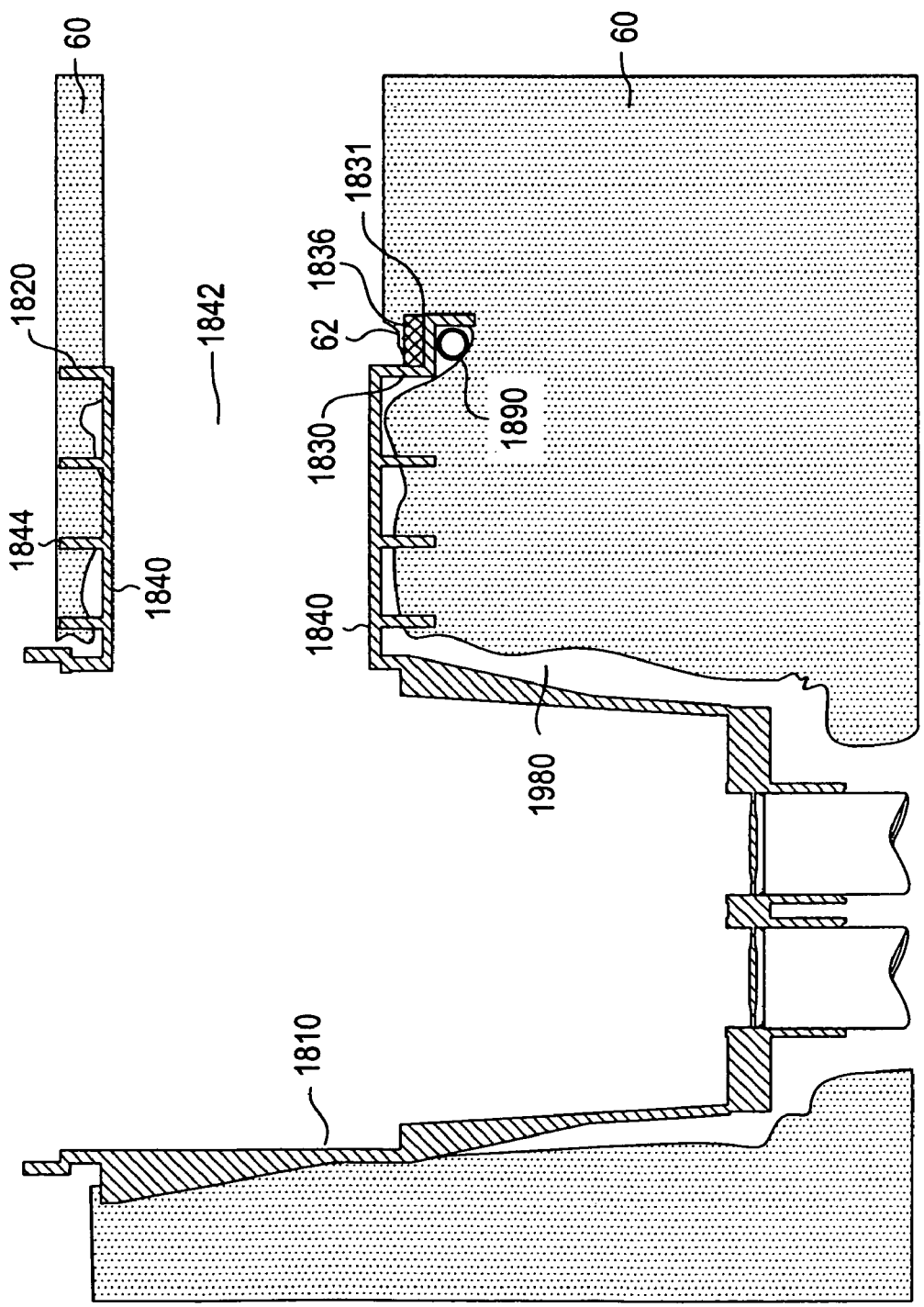
Figure 19C:
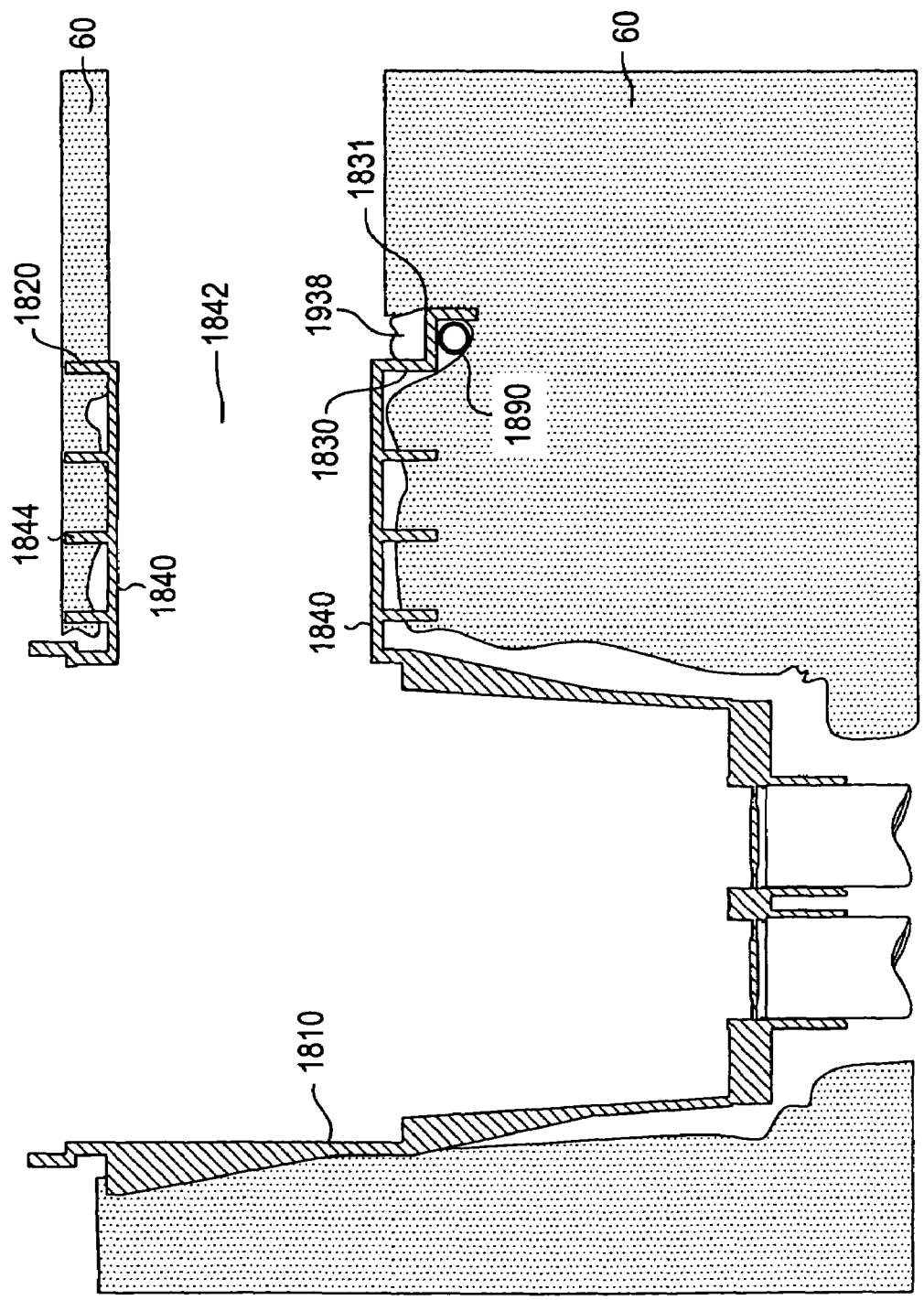

The advantages of the presently described invention will be more apparent with the description of the installation and repair processes described below in FIGS. 19A-19F, each of which are cross-sectional views of skimmer 1800 and tubing 1890 in accordance with exemplary embodiments of the present invention. FIG. 19A depicts skimmer 1800 at an installation stage just prior to cementing, with coupling 1854 connected to outlet pipes 50 and with flange 1820 abutting framing box 1910. A steel rebar cage may also be present around skimmer body 1810 (not shown). Injection port opening 1892 (not shown) is positioned above the level of the cement to avoid the cement from filling the tube during cementing, but its height must also allow for the deck height if injection port opening 1892 is to be accessible for remedial leak repair. Cement is then shot around the skimmer and after curing frames 1910 is removed to reveal cement 60 positioned over, under and behind skimmer body 1810, skimmer box 1840 and reinforcing rib supports 1844 as depicted in FIG. 19B. Notice also, however, that the cement may not, and usually does not, form a complete cohesive layer around the skimmer, leaving cavities 1980. Notice also that a small amount of superfluous cement 62 has leaked around frame 1910 and onto leave-out strip 1836. Typically, the amount of leakage is small and superfluous cement 62 can be eliminated by merely removing leave-out strip 1836. Typically, a small channel will result bounded by flange 1820 and cement 60, laterally, and below by sealing surface 1831. Next, as depicted in FIG. 19C, sealant 1938 is applied liberally into the channel and onto sealing surfaces 1831 in a consistent manner leaving no opening for a seep channel to form. As discussed above, sealant 1938 may be any type of sealant that firmly bonds to sealing surfaces 1831 of skimmer 1800 and to new pool plaster, mastic, tile, grout or the like, and with a long life expectancy. It should cure rigid in order to reduce cracking in the overlaying plaster and tile.

Figure 19D:
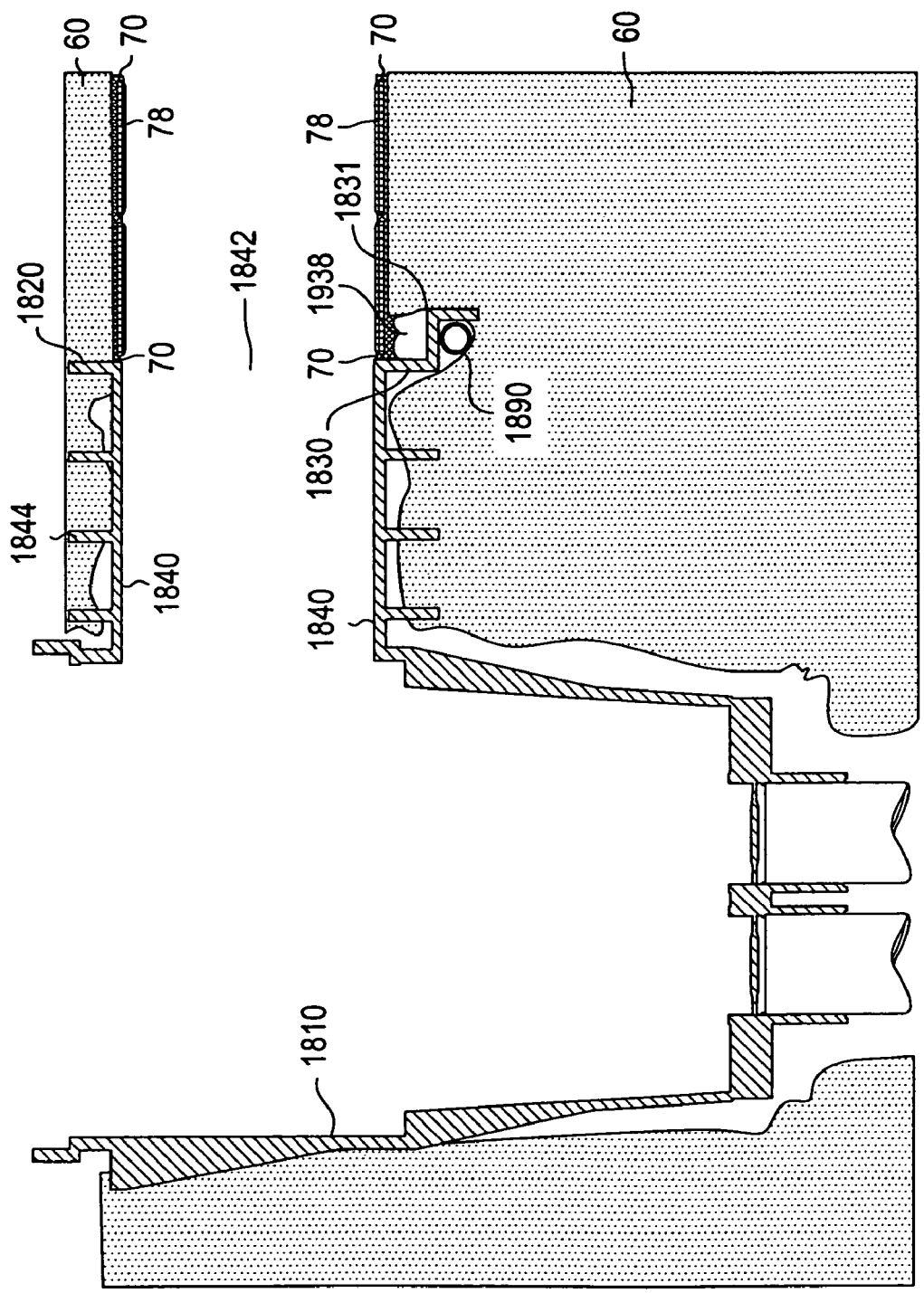

After application of sealant 1938 on sealing surfaces 1831, plaster (and/or mastic or thin-set) 70 and tiles 78 can be then applied over sealant 1938 to complete the leak-proof bond as shown in FIG. 19D. Sealant 1938 creates a water impenetrable barrier between skimmer 1800 and both of plaster 70 and cement 60. However, as discussed above with regard to the main drain embodiment, timing constraints may force the pool contractor to omit sealant 1938. In that case, the layer of mastic, thin-set and/or plaster 70 may be applied directly over sealing surfaces 1831 (not shown). A hydrobaric foam can then be injected into inlet port 1892 (not shown) to fill cracks, voids or cavities in cement 60.

Figure 19E:
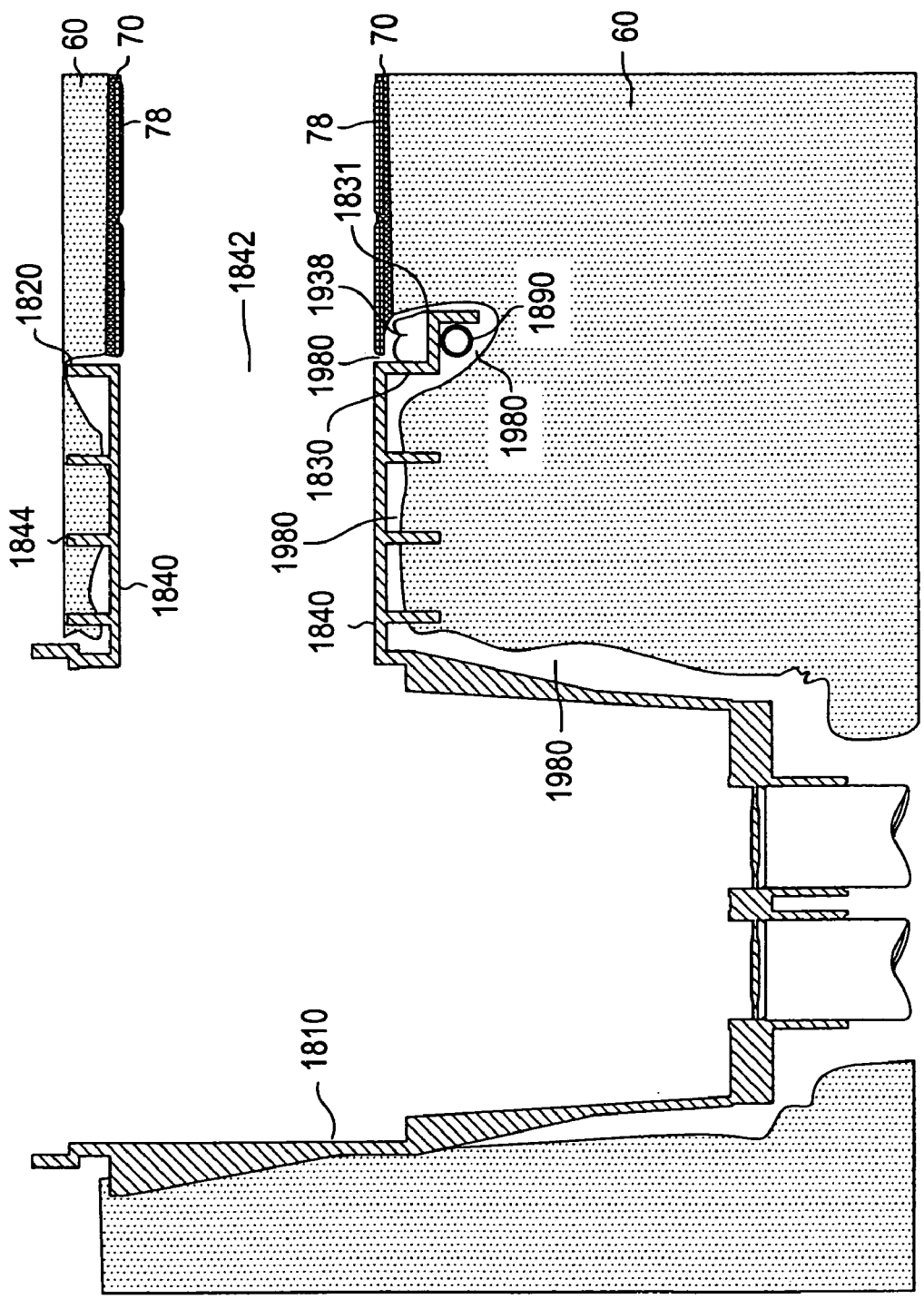
Figure 19F:
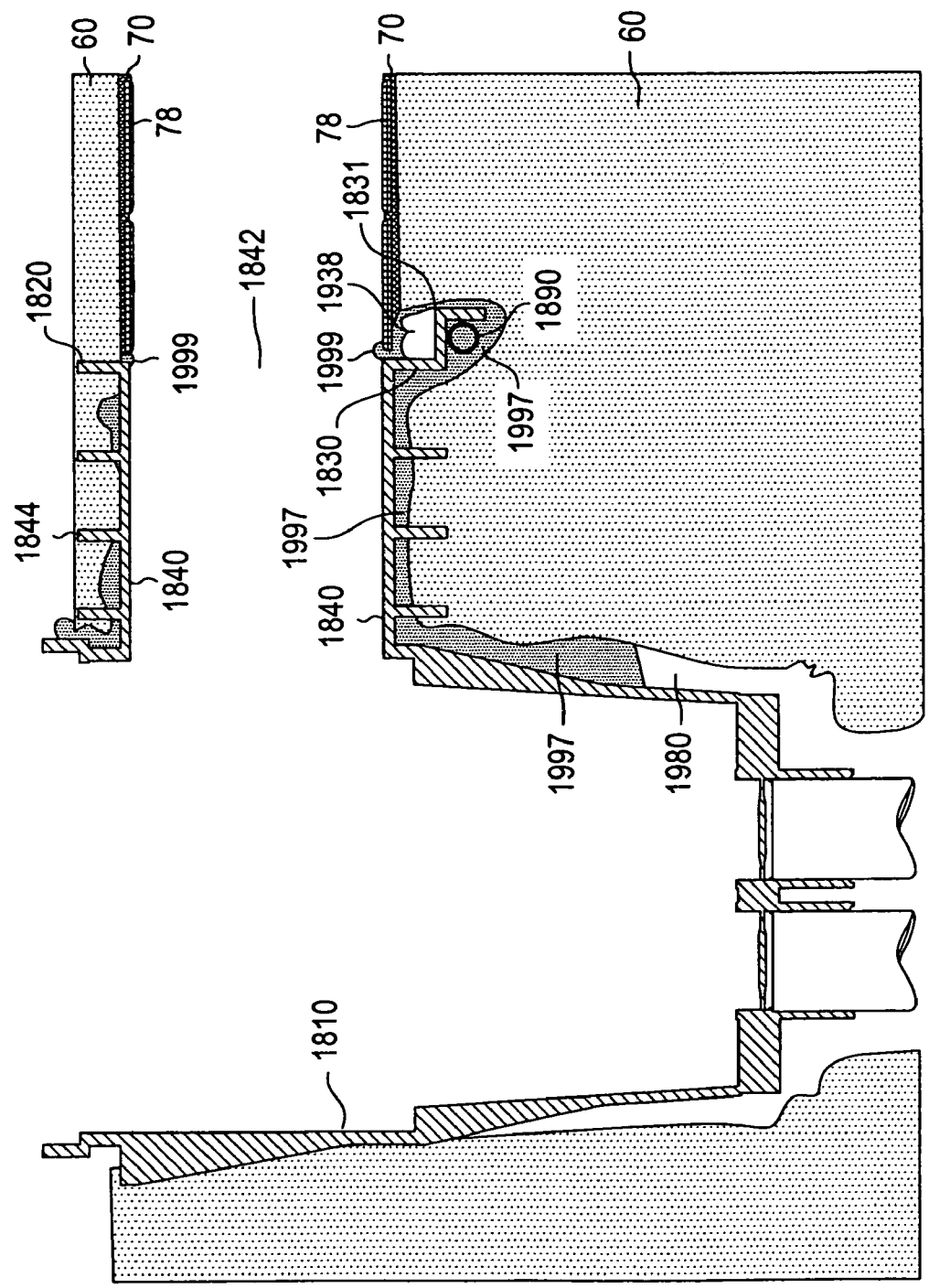

Alternatively, tubing 1890 may be left open for future remedial leak repairs if needed. If leakage does occur in the future through channels 1980, as depicted in FIG. 19E, hydrobaric foam can then be injected into inlet port 1892 (not shown). Advantageously though, because tubing 1890 has been pre-positioned with output opening(s) 1894 in the most strategic location(s) for foam insertion, repairing leakage may be accomplished with a minimum of difficulty and expense, perhaps by the pool owner. No drilling into box 1840 is necessary. The result is foam 1997 expands and fills cavity 1980 throughout the proximity of box 1840, and typically out-flows into inlet 1942 at the leak points as beads 1999 of foam that are easily trimmed with a sharpened cutting tool.

With regard to the problem of allotting time for curing the sealant applied to the sealing surfaces of either embodiments described above, a leak seal may be provided on the fitting for subsequent installation by the fitting manufacturer in accordance with still other exemplary embodiments of the present invention. These improvements are depicted on FIGS. 20A and 20B with regard to drain 1400 and skimmer 1800 discussed above, therefore, generally only the distinctions between the embodiments will be discussed, simultaneously, below. With respect to these exemplary embodiments, rather than providing a leave-out strip over sealing surfaces 1431 and 1832, seal(ant) 2038 is provided during manufacturing or assembly of the fittings. With regard to these embodiments, it expected that seal(ant) 2038 may be applied substantially as the sealant described above, or may instead be a pre-formed (or die-cut) silicon or acrylic seal fastened to sealing surfaces 1431 and 1832 with adhesive, for example. Optionally, leave-out strip 2036 may be applied over seal(ant) 2038 to protect the sealing surfaces of seal(ant) 2038 in a similar fashion to that described above with regard to sealing surfaces 1431 and 1831.

With further regard to the repairing of skimmer leaks, it is expected that certain brands of skimmers will persist in the industry essentially unmodified and without improvements discussed above for leak prevention. Injection molds for mechanisms the size of pool skimmers are extremely expensive and rarely updated unless a critical modification is necessary.

Figure 21:
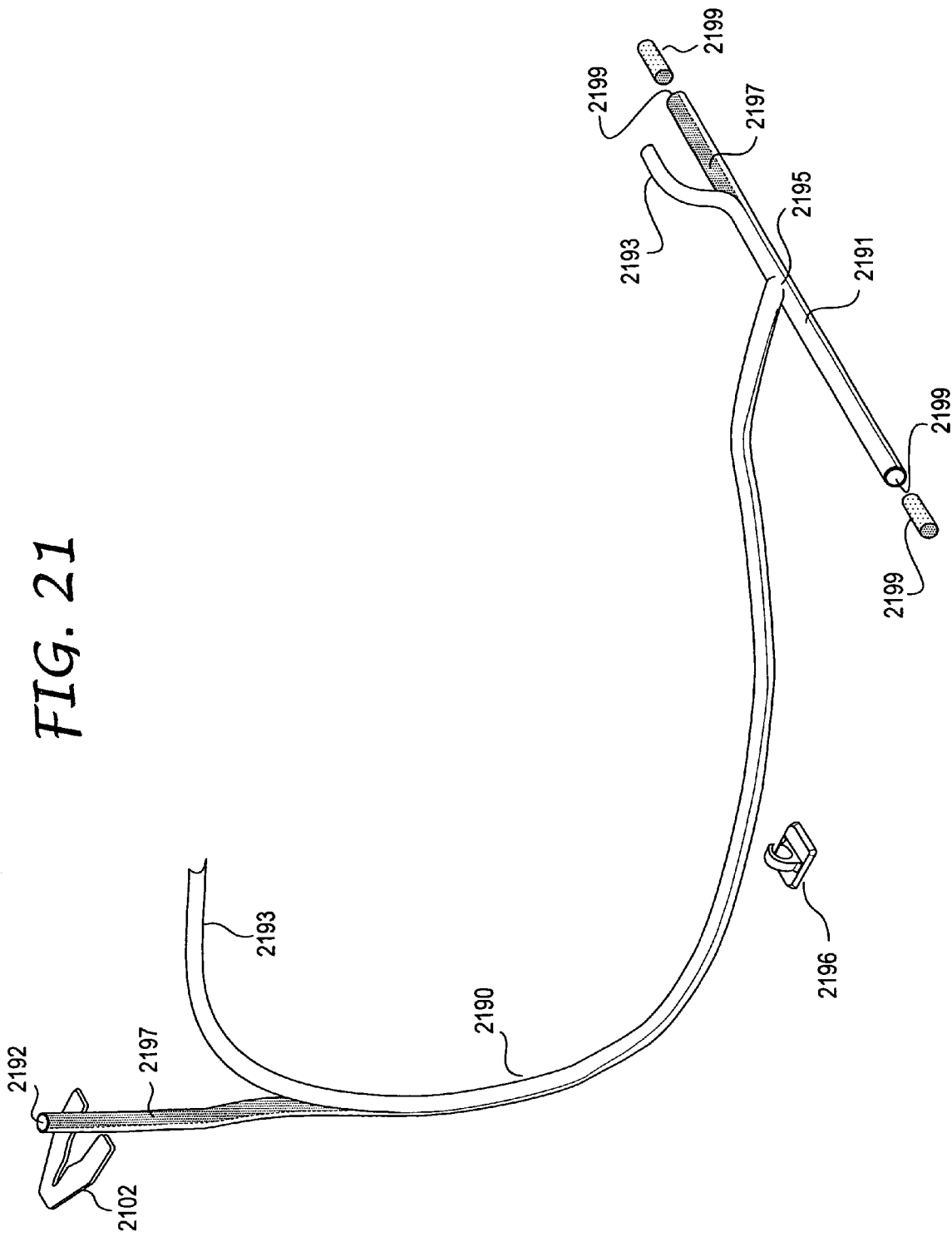
FIG. 21 depicts exemplary embodiments of an attachable injection tube for application with a prior art skimmer fitting for delivering sealing foam after installation in accordance with an exemplary embodiment of the present invention.

Therefore, in accordance with still another exemplary embodiment of the present invention an inexpensive solution for remedially repairing skimmer leakage is presented. FIG. 21 shows tubing 2190 as a component separate from the skimmer and therefore adaptable for retrofitting to prior art skimmers such as skimmer 1600 described in greater specificity above. Tubing 2190 originates at injection port opening 2192, proceeds until forming a "T" connection 2195 and disperses as cross-tube 2191, terminating in one or more output openings 2194. Clearly tubing 2190 may have any conceivable number of "T" connections and output openings, including being only a continuous tube with a single output opening 2194. Here again, tube 2190 may be composed of any resilient yet pliable material, such as vinyl. Additional openings may be perforated along cross-tube 2191 or further up on tube 2190 as necessary for expediting the delivery of foam into leakage channels. Openings 2194 on, for example, cross-tube 2191 may be fitted with foam inserts 2199 for keeping out the cement, yet are permeable enough to allow for delivery of the uncured hydrobaric foam into cracks and cavities in the cement adjacent to prior art skimmer 1600.

Figure 20A:
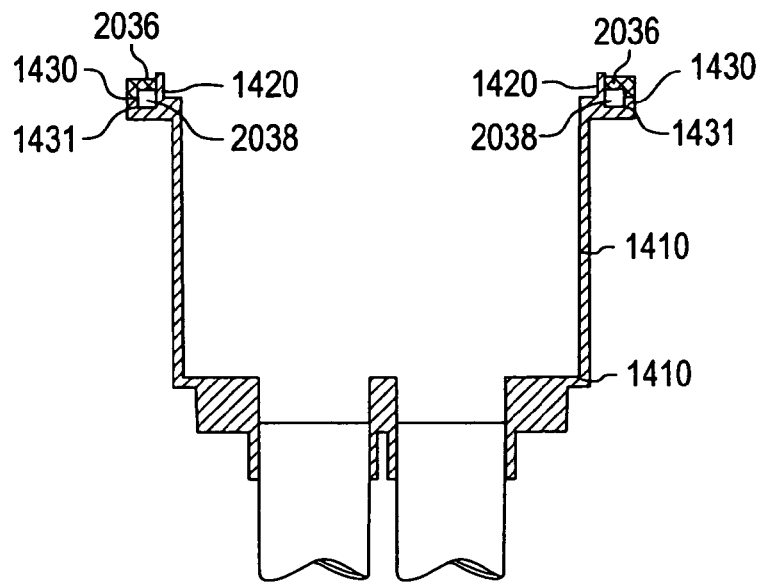
FIGS. 20A-20B depict exemplary embodiments of a drain fitting and a skimmer fitting, respectively, each with a permanent seal covering the sealing surface and leave-out strip covering the seal in accordance with an exemplary embodiment of the present invention.
Figure 20B:
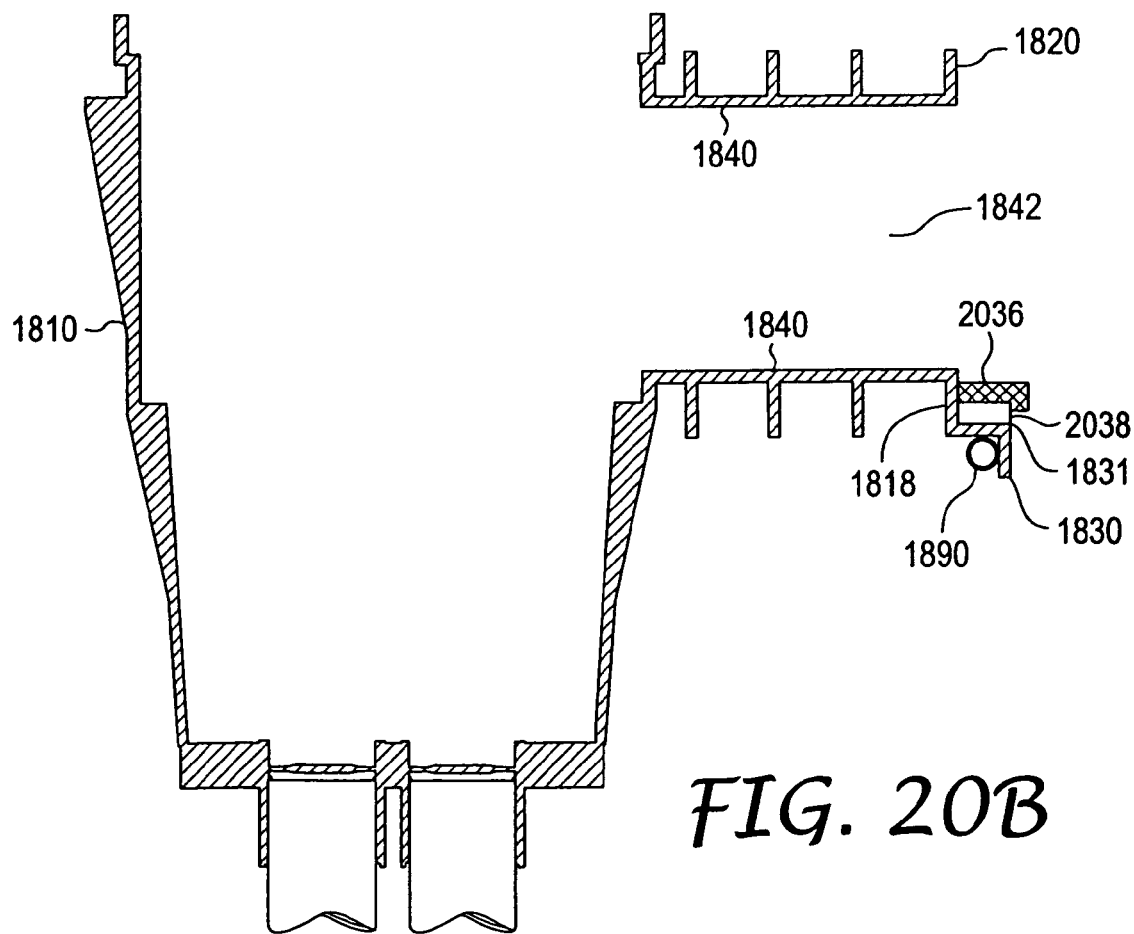

As can be seen in FIGS. 22A and 22B tubing 2190 and cross-tube 2191 (if present) may be fastened to prior art skimmer 1800 using one or more fastening mechanisms as depicted in FIGS. 20A and 20B. One particularly useful fastening mechanism is treating tubing 2190 and/or cross-tube 2191 with adhesive 2197 and protective sheathing 2193. Double sided adhesive tape may be a suitable substitute. Additionally, and/or in place of adhesive 2197, tubing mounts 2196 may be included for fastening tubing 2190 to body 1610, box 1640 or wherever necessary on prior art skimmer 1600 to limit tubing movement during installation and avoid kinking. Mounts 2196 may be provided with mounting adhesive for easy installation. Care must be taken during installation to position opening 2192 above the expected level of the cement to avoid cement filling the tube during cementing. After cementing, tubing 2190 may then be trimmed.

Finally, crimping mechanism 2102 may be provided for closing tubing 2190 proximate to inlet port opening 2192 after injecting the hydrobaric foam. As discussed elsewhere above, a hydrobaric-type foam is extremely effective in sealing leaks because it expands when coming in contact with water, thereby chasing the water into water-filled cavities. However, some of the effectiveness is lost if the foam expands backward out of injection port opening 2192. Tubing 2190 is temporarily crimped, using crimping mechanism 2102, thereby forcing the expanding foam in the cement. If, during curing, any deformation is noticed on box 1640 or body 1610, crimping mechanism 2102 can be removed, thereby allowing the expanding foam to egress at injection port opening 2192, thus relieving the pressure on skimmer 1600.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A fitting for installation in a cement shell wall comprising:
   a fitting body having an exterior surface, an interior cavity and further having a first opening and a second opening each connected to said interior cavity, said interior cavity of the body further comprises a threaded portion, said threaded portion being proximate to said second opening;
   a flange disposed around said fitting body, said flange having a first face and a second face; and
   a plurality of catches, each of said plurality of catches having a connecting edge, a distal edge having a catch body portion between the first and second edges, said connecting edges being connected to one of the first and second faces of the flange and arranged in concentric rings around said fitting body.

2. The fitting recited in claim 1 wherein said interior cavity of the fitting body further comprises a coupling mechanism, said coupler mechanism being proximate to said first opening.

3. The fining recited in claim 2, wherein said coupling mechanism being configured for cooperating with a pipe.

4. The fitting recited in claim 3, wherein said threaded portion being proximate to said second opening being configured for cooperating with an attachment.

5. The fitting recited in claim 1 wherein the catch body portion of the at least one catch further being generally parallel to said fitting body.

6. The fitting recited in claim 1 wherein the catch body portion of the at least one catch being generally coaxial with one of the flange and the fitting body.

7. The fitting recited in claim 1, wherein each catch body portion of each of said plurality of catches having a height dimension, said height dimension being approximately equivalent for each body portion of each of said plurality of catches and each of said plurality of catches being aligned with each other of said plurality of catches.

8. The fitting recited in claim 1, wherein each catch body portion of each of said plurality of catches having a height dimension, said height dimension being substantially unique for each catch bOdy portion of each of said plurality of catches and each of said plurality of catches being off-set from each other of said plurality of catches.

9. The fitting recited in claim 1, wherein said one face of said flange having a substantially conically-shaped surface.

10. The fitting recited in claim 1, wherein each catch body portion of each of said plurality of catches having a height dimension, said height dimension being approximately equivalent for each body portion of each of said plurality of catches and each of said plurality of catches being off-set from each other of said plurality of catches.

11. The fining recited in claim 1, wherein the first face of the flange is an anterior face and said flange being disposed around said fitting body.

12. The fitting recited in claim 1, wherein the second face of the flange is a posterior face and said flange being disposed around said fining body with an anterior face substantially coplanar with said second opening of said fining body.

13. A fitting for installation in a cement shell wall comprising:
   a fitting body having an exterior surface, an interior cavity and further having a first opening and a second opening each connected to said interior cavity, said interior cavity of the body further comprises a threaded portion, said threaded portion being proximate to said second opening;
   a flange disposed around said fitting body, said flange having a first face and a second face, wherein said one of the first and second faces of said flange having a substantially conically shaped surface; and
   a plurality of catches, each of said plurality of catches having a connecting edge, a distal edge having a catch body portion between the first and second edges, said connecting edges being connected to one of the first and second faces of the flange.

14. The fitting recited in claim 13, wherein said interior cavity of the fitting body further comprises a coupling mechanism, said coupler mechanism being proximate to said first opening; and
   wherein said coupling mechanism being configured for cooperating with a pipe.

15. The fitting recited in claim 14, wherein said threaded portion being proximate to said second opening being configured for cooperating with an attachment.

16. The fitting recited in claim 13, wherein the first face of the flange is an anterior face and said flange being disposed around said fitting body.

17. A fitting for installation in a cement shell wall comprising:
   a fitting body having an exterior surface, an interior cavity and further having a first opening and a second opening each connected to said interior cavity, said interior cavity of the body further comprises a threaded portion, said threaded portion being proximate to said second opening;
   a flange disposed around said fitting body, said flange having a first face and a second face, wherein said one face of said flange being substantially planar; and
   a plurality of catches, each of said plurality of catches having a connecting edge, a distal edge having a catch body portion between the first and second edges, said connecting edges being connected to one of the first and second faces of the flange, wherein each catch body portion of each of said plurality of catches having a height dimension, said height dimension being substantially unique for each catch body portion of each of said plurality of catches and each of said plurality of catches being off-set from each other of said plurality of catches.

18. The fitting recited in claim 13, wherein said interior cavity of the fitting body further comprises a coupling mechanism, said coupler mechanism being proximate to said first opening; and
   wherein said coupling mechanism being configured for cooperating with a pipe.

19. The fitting recited in claim 18, wherein said threaded portion being proximate to said second opening being configured for cooperating with an attachment.

20. The fitting recited in claim 17, wherein the first face of the flange is an anterior face and said flange being disposed around said fitting body.

21. The fining recited in claim 17, wherein the second face of the flange is a posterior face and said flange being disposed around said fitting body with an anterior face substantially coplanar with said second opening of said fitting body.

* * * * *